(12) United States Patent
Hinnah et al.

(10) Patent No.: US 11,249,295 B2
(45) Date of Patent: Feb. 15, 2022

(54) METHODS AND SYSTEMS FOR AUTOMATED IMAGING OF THREE-DIMENSIONAL OBJECTS

(71) Applicant: PERKINELMER CELLULAR TECHNOLOGIES GERMANY GMBH, Hamburg (DE)

(72) Inventors: S Chris Hinnah, Tangstedt (DE); Kaupo Palo, Tallinn (EE); Olavi Ollikainen, Tallinn (EE); Thomas Steinkamp, Tangstedt (DE); Hartwig Preckel, Hamburg (DE)

(73) Assignee: PERKINELMER CELLULAR TECHNOLOGIES GERMANY GMBH, Hamburg (DE)

( * ) Notice: Subject to any disclaimer, the term of this patent is extended or adjusted under 35 U.S.C. 154(b) by 0 days.

(21) Appl. No.: 17/012,578

(22) Filed: Sep. 4, 2020

(65) Prior Publication Data

US 2021/0096347 A1    Apr. 1, 2021

Related U.S. Application Data

(63) Continuation of application No. 16/458,147, filed on Jun. 30, 2019, now Pat. No. 10,871,640.

(60) Provisional application No. 62/806,170, filed on Feb. 15, 2019.

(51) Int. Cl.
| | |
|---|---|
| H04N 9/47 | (2006.01) |
| A62B 1/04 | (2006.01) |
| H04N 7/18 | (2006.01) |
| G02B 21/00 | (2006.01) |
| G02B 21/02 | (2006.01) |
| G02B 21/36 | (2006.01) |
| H04N 5/89 | (2006.01) |
| H04N 13/00 | (2018.01) |

(52) U.S. Cl.
CPC ....... *G02B 21/008* (2013.01); *G02B 21/0032* (2013.01); *G02B 21/0036* (2013.01); *G02B 21/02* (2013.01); *G02B 21/367* (2013.01)

(58) Field of Classification Search
USPC .......................... 348/63, 61, 65, 64, 42, 45
See application file for complete search history.

(56) References Cited

U.S. PATENT DOCUMENTS

2016/0261851 A1* 9/2016 Tian ........................ G06T 7/80
2017/0085860 A1* 3/2017 Zhang .................. H04N 13/204

* cited by examiner

*Primary Examiner* — Daquan Zhao
(74) *Attorney, Agent, or Firm* — Rhodes IP PLC; Christopher R Rhodes

(57) ABSTRACT

Certain configurations are described of methods and systems that can be used to image three-dimensional objects such as biological cells, biological tissues or biological organisms. The methods and systems can image the three-dimensional objects at reduced imaging times and with reduced data volumes.

20 Claims, 22 Drawing Sheets

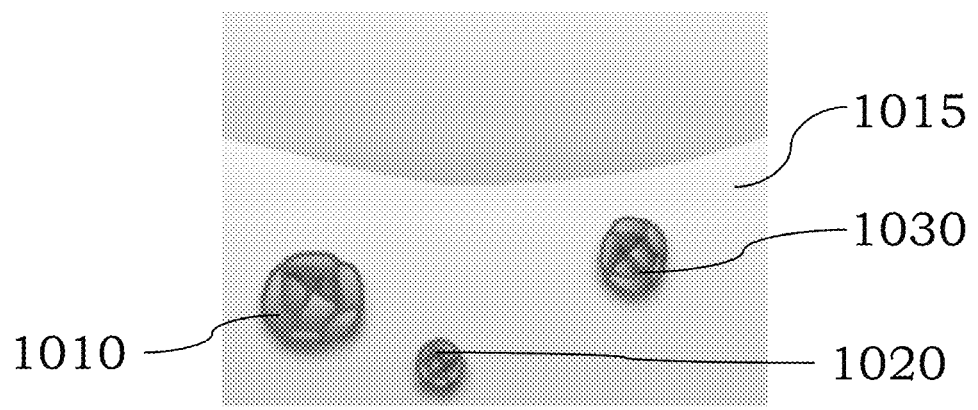
FIG. 10A
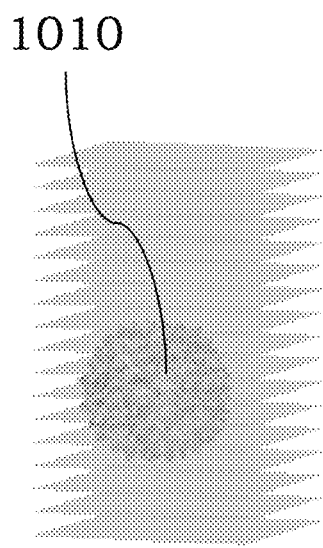 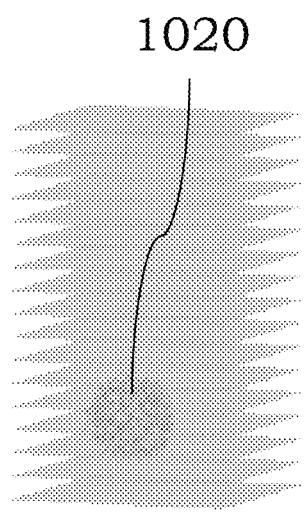 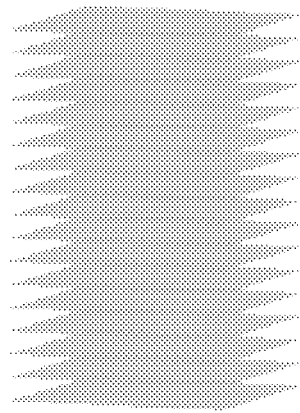
FIG. 10B     FIG. 10C     FIG. 10D

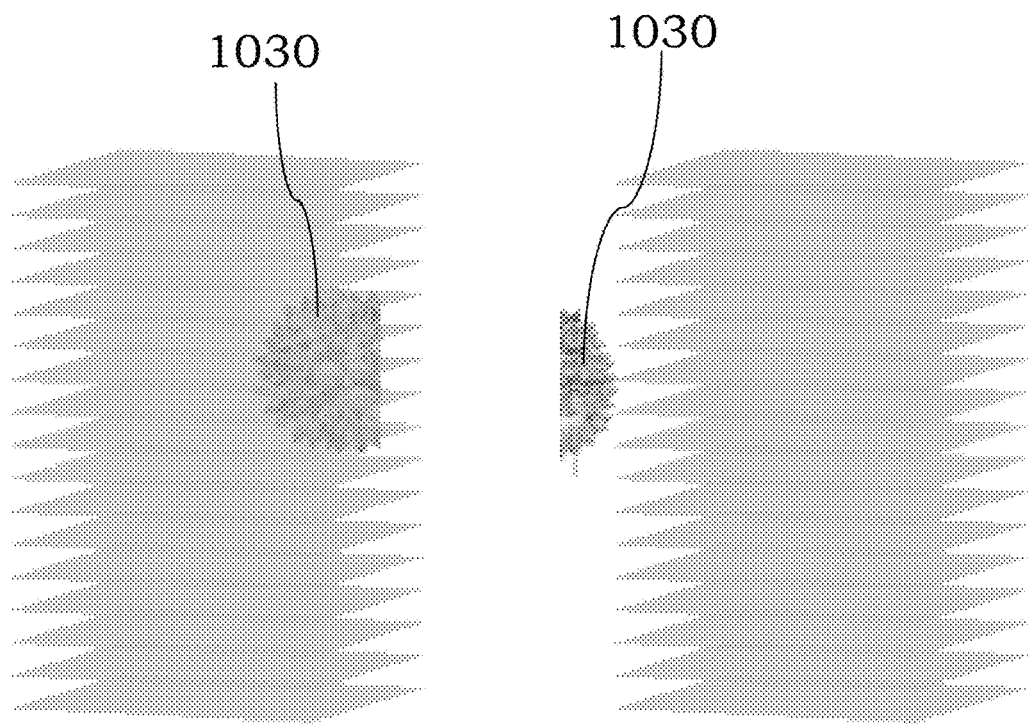
FIG. 10E
FIG. 10F
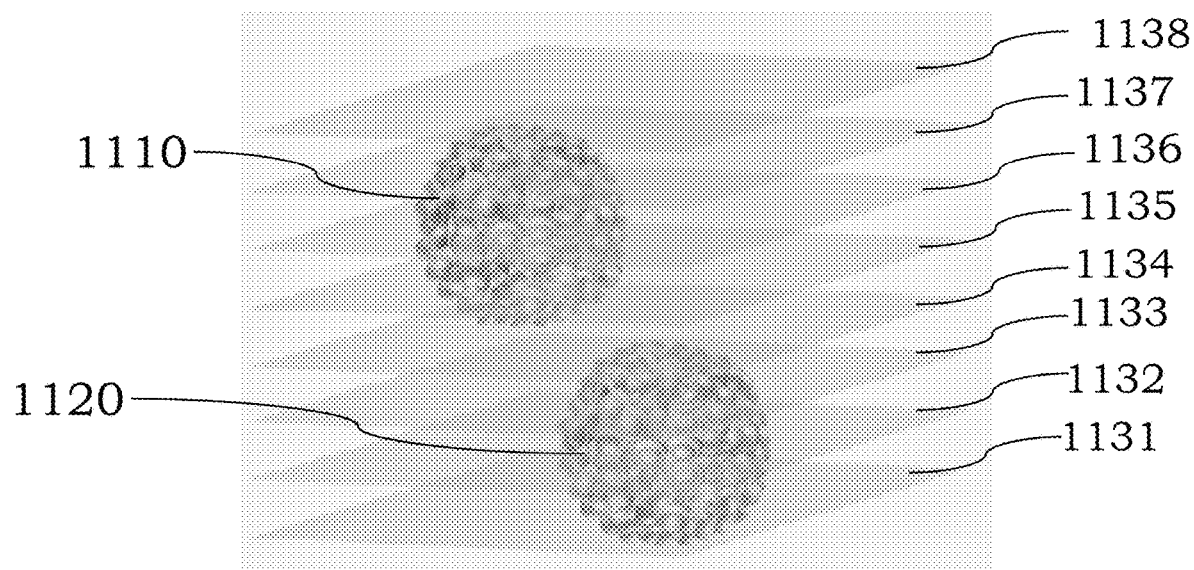
FIG. 11A

METHODS AND SYSTEMS FOR AUTOMATED IMAGING OF THREE-DIMENSIONAL OBJECTS

PRIORITY APPLICATIONS

This application is a continuation application of U.S. Ser. No. 16/458,147 filed on Jun. 30, 2019. U.S. Ser. No. 16/458,147 claims priority to U.S. Provisional Application No. 62/806,170 filed on Feb. 15, 2019.

TECHNOLOGICAL FIELD

Certain configurations are related to methods and systems that can be used to image three-dimensional objects. More particularly, certain methods and systems are described which can image three-dimensional objects such as biological cells in an automated and high throughput manner.

BACKGROUND

Imaging of three-dimensional objects is often performed to study the structure and function of the objects Imaging of the three-dimensional objects can be time consuming and may not provide usable results in a desired time frame, especially where the objects imaged include biological cells.

SUMMARY

In an aspect, a method of imaging a three-dimensional object present in a matrix using a microscope is described. In some embodiments, the method comprises pre-scanning the matrix using a first magnification objective to identify an x-y location of the three-dimensional object in the matrix and to identify a z-height for the three-dimensional object in the matrix. In other examples, the method also comprises scanning the identified three-dimensional object using a second magnification objective in a z-direction using the identified z-height of the identified three-dimensional object to provide a three-dimensional image of at least some portion of the three-dimensional object present in the matrix, wherein the second magnification objective is greater than or equal to the first magnification objective.

In certain examples, the pre-scanning comprises obtaining a plurality of individual z-plane images using the first magnification objective of the microscope to provide a first image set of discrete z-plane images used to identify the z-height. In other examples, the scanning comprises obtaining a plurality of discrete z-plane images of the identified three-dimensional object starting at the identified z-height of the three-dimensional object and using the second magnification objective of the microscope to provide a second image set. In some embodiments, the plurality of discrete z-plane images of the second image set are used to provide an entire three-dimensional image of the three-dimensional object in the matrix. In certain examples, image correction can be applied to the first image set to provide a corrected, first image set prior to scanning the identified three-dimensional objects using the second magnification objective. In other examples, corrected x-y locations of the three-dimensional object and a corrected z-height for the three-dimensional object obtained from the corrected, first image set are used in the scanning of the three-dimensional object using the second magnification objective to provide the second image set. In some embodiments, image correction can be applied to the second image set to provide a corrected, second image set that is used to provide the three-dimensional image of the three-dimensional object.

In certain examples, the pre-scanning using the first magnification objective is performed using an air objective, e.g., 5× or 10× air objective of the microscope, and the scanning using the second magnification objective is performed using a liquid immersion objective, e.g., a water immersion objective or an oil immersion objective of the microscope which can be a 40×, 50×, 60× power or more objective.

In some examples, a laser confocal scanning microscope is used to perform both the pre-scanning and the scanning. In certain embodiments, the three-dimensional object is a biological organism, a biological organ, a biological tissue, a biological cell or a component or organelle thereof. In additional examples, the pre-scanning and scanning of the biological organism, the biological organ, the biological tissue, the biological cell or the component or the organelle thereof is performed in a matrix comprising a hydrogel or in a matrix comprising a three-dimensional scaffold.

In certain examples, the method comprises pre-scanning the matrix using the first magnification objective of the microscope to identify an x-y location of each of a plurality of individual three-dimensional objects in the matrix and to identify a z-height for each of the identified plurality of three-dimensional objects in the matrix. The method may also comprise scanning each identified three-dimensional object using the second magnification objective in a z-direction using a respective identified z-height of each identified three-dimensional object to provide a three-dimensional image of at least some portion of each of the three-dimensional objects present in the matrix. Where multiple objects are imaged in a matrix, the pre-scanning using the first magnification objective can be performed using an air objective, e.g., 5× or 10× air objective of the microscope, and the scanning using the second magnification objective can be performed using a liquid immersion objective, e.g., a water immersion objective or an oil immersion objective of the microscope which can be a 40×, 50×, 60× power or more objective. Where multiple objects are imaged in a matrix, each of the three-dimensional objects is independently a biological organism, a biological organ, a biological tissue, a biological cell or a component or organelle thereof, and wherein the matrix comprises a hydrogel or a three-dimensional scaffold. The objects need not be the same type of cell, tissue, organism, etc.

In certain embodiments, the method comprises using the pre-scanning to identify a z-width of the identified three-dimensional object in the matrix and using the identified z-width to select a scan time or to select a data volume obtained from the scanning of the three dimensional object in the matrix.

In another aspect, a microscope system configured to image a three-dimensional object in a three-dimensional matrix is described. In some examples, the system comprises a sample holder configured to receive a sample comprising the three-dimensional object in the three-dimensional semi-solid or three-dimensional solid matrix, a first light source optically coupled to the sample holder and configured to illuminate at least some portion of the three-dimensional object in the three dimensional matrix that is received by the sample holder, wherein an wavelength provided by the first light source is selected to excite at least one species present in the three-dimensional object (or excite the entire three-dimensional object), at least one objective optically coupled to the light source and configured to receive a light emission from the at least one excited species present in the three-dimensional object in the three-dimensional matrix, a detector optically coupled to the at least one objective and configured to receive the light emission from the objective, and a processor electrically coupled to the detector. In certain configurations, the microscope system is configured to pre-scan the three-dimensional semi-solid or three-dimensional solid matrix using a first magnification objective to identify an x-y location of the three-dimensional object and to identify a z-height for the three-dimensional object, and wherein the microscope system is configured use a second magnification objective to scan the identified three-dimensional object in a z-direction using the identified z-height of the identified three-dimensional object to provide a three-dimensional image of at least some portion of the three-dimensional object.

In certain embodiments, the system comprises a first objective and a second objective, wherein first objective is used as the first magnification objective and the second objective is used as the second magnification objective, and wherein the second objective is different than the first objective and provides a magnification greater than or equal to a magnification of the first objective. In some examples, the first objective is an air objective and the second objective is a water immersion objective (or other liquid immersion objective).

In certain examples, the detector comprises at least one camera and the first light source comprises at least one laser. For example, the system can be configured to use the camera and the laser to perform laser scanning confocal microscopy during the pre-scan and scan of the three-dimensional object.

In some embodiments, the processor is configured to execute instructions to construct a three-dimensional image of the three-dimensional object in the three-dimensional matrix from an image set obtained from the scan step. In other embodiments, the processor is configured to execute instructions to apply image correction to the image set prior to constructing the image of the three-dimensional object.

In certain examples, the system applies the image correction using a second image set obtained from one or more images of a two-dimensional graphical pattern using the detector in a same fixed position(s) that was used to obtain the image set, wherein the two-dimensional graphical pattern comprises dots in a lattice, wherein the dots are at vertices that define one or more types of geometric shapes, wherein the lattice of dots is non-periodic, and wherein absolute positions of the imaged dots can be determined, and wherein the correction is applied to images of the image set using the one or more images of the two-dimensional graphical pattern to correct geometric distortions in the images of the image set.

In some configurations, the system comprises at least two separate light sources configured to provide different wavelengths of light to the sample on the sample holder.

In other configurations, the system comprises a confocal unit optically coupled to each of the at least two separate light sources and positioned between the at least two separate light sources and the sample holder.

In certain configurations, the system comprises at least two separate detectors configured to receive different wavelengths of light emitted by the sample on the sample holder. In other configurations, each of the at least two separate detectors comprises a camera.

In some embodiments, one of the at least two separate detectors is configured to detect light emissions during the pre-scan step and another of the at least two separate detectors is configured to detect light emission during the scan step.

In other embodiments, the system is configured to use the first magnification objective of the microscope to identify an x-y location of each of a plurality of individual three-dimensional objects in the matrix and to identify a z-height for each of the identified plurality of three-dimensional objects in the matrix, and wherein the system is configured to scan each identified three-dimensional object using the second magnification objective in a z-direction using a respective identified z-height of each identified three-dimensional object to provide a three-dimensional image of at least some portion of each of the three-dimensional objects present in the matrix.

In certain examples, the system comprises four independent light sources each configured to provide a different wavelength of light to the sample on the sample holder. The system may also comprise four independent cameras each configured to detect light emissions from the sample.

In other examples, the system is further configured to identify a z-width of the identified three-dimensional object in the matrix and use the identified z-width to select a scan time or to select a data volume obtained from the scan of the three dimensional object in the matrix.

In another aspect, a non-transitory computer readable medium having instructions stored thereon, wherein the instructions, when executed by a processor, cause the processor to: pre-scan a matrix comprising a three-dimensional object using a first magnification objective to identify an x-y location of the three-dimensional object in the matrix and to identify a z-height for the three-dimensional object in the matrix, and scan the identified three-dimensional object using a second magnification objective in a z-direction using the identified z-height of the identified three-dimensional object to provide a three-dimensional image of at least some portion of the three-dimensional object present in the matrix.

In some instances, the instructions cause the processor to select a magnification for the second magnification objective that is greater than or equal to a magnification of the first magnification objective.

In an additional aspect, a method of imaging a three-dimensional object present in a matrix using a laser confocal scanning microscope comprises pre-scanning the matrix using a first magnification objective to identify an x-y location of the three-dimensional object in the matrix and to identify a z-height for the three-dimensional object in the matrix and recording the identified x-y location and z-height as a first, image set, correcting imaging abnormalities from the pre-scanning step to provide a corrected, first image set, scanning the identified three-dimensional object using a second magnification objective in a z-direction using a corrected z-height and corrected x-y locations from the corrected, first image set to provide a second image set, correcting imaging abnormalities from the scanning step to provide a corrected, second image set, and constructing an image of the three-dimensional object in the matrix using the corrected, second image set.

In some examples, correcting the imaging abnormalities from the pre-scanning step comprises obtaining one or more images of a two-dimensional graphical pattern using a detector in a same fixed position(s) that was used to obtain the first image set, wherein the graphical pattern is a lattice comprising dots at vertices that define one or more types of geometric shapes, wherein the lattice of dots is non-periodic, and wherein absolute positions of the imaged dots can be determined, and automatically adjusting, by a processor, images of the first image set using the one or more images of the two-dimensional graphical pattern to correct geometric distortions in the images of the first image set. In other instances, the method comprises automatically adjusting, by a processor, images of the second image set using the one or more images of the two-dimensional graphical pattern (which can be the same images used to correct the pre-scan values) to correct geometric distortions in the images of the second image set.

In other examples correcting the imaging abnormalities from the scanning step comprises obtaining one or more images of a two-dimensional graphical pattern using a detector in a same fixed position(s) that was used to obtain the second image set, wherein the graphical pattern is a lattice comprising dots at vertices that define one or more types of geometric shapes, wherein the lattice of dots is non-periodic, and wherein absolute positions of the imaged dots can be determined, and automatically adjusting, by a processor, images of the second image set using the one or more images of the two-dimensional graphical pattern to correct geometric distortions in the images of the second image set.

In some examples, the pre-scanning comprises obtaining a plurality of individual z-plane images using the first magnification objective of the microscope to provide the first image. In other examples, the scanning comprises obtaining a plurality of discrete z-plane images of the identified three-dimensional object starting at a corrected, identified z-height of the three-dimensional object and using the second magnification objective of the microscope to provide the second image set. In further examples, the plurality of discrete z-plane images of the second image set, after image correction, are used to provide an entire three-dimensional image of the three-dimensional object in the matrix. In certain embodiments, the pre-scanning using the first magnification objective is performed using a 10× air objective of the microscope, and the scanning using the second magnification objective is performed using a 40× water immersion objective of the microscope.

In certain examples, a laser confocal scanning microscope is used to perform both the pre-scanning and the scanning when imaging correction is also performed. In some embodiments, the three-dimensional object is a biological organism, a biological organ, a biological tissue, a biological cell or a component or organelle thereof. In other embodiments, the pre-scanning and scanning of the biological organism, the biological organ, the biological tissue, the biological cell or the component or the organelle thereof is performed in a matrix comprising a hydrogel or in a matrix comprising a three-dimensional scaffold.

In some embodiments, the method comprises using the pre-scanning to identify a z-width of the identified three-dimensional object in the matrix and using the identified z-width to select a scan time or to select a data volume obtained from the scanning of the three dimensional object in the matrix. If desired, image correction can be applied to the identified z-width to provide a corrected z-width.

In another aspect, a microscope system configured to image a three-dimensional object in a three-dimensional matrix comprises a sample holder configured to receive a sample comprising the three-dimensional object in the three-dimensional matrix, a first light source optically coupled to the sample holder and configured to illuminate at least some portion of the three-dimensional object in the three dimensional matrix that is received by the sample holder, wherein an wavelength provided by the first light source is selected to excite at least one species present in the three-dimensional object, at least one objective optically coupled to the light source and configured to receive a light emission from the at least one excited species present in the three-dimensional object in the three-dimensional matrix, a detector optically coupled to the at least one objective and configured to receive the light emission from the objective, and a processor electrically coupled to the detector. In some configurations, the microscope system is configured to pre-scan the matrix using a first magnification objective to identify an x-y location of the three-dimensional object in the matrix and to identify a z-height for the three-dimensional object in the matrix and record the identified x-y location and z-height as a first image set, correct imaging abnormalities from the pre-scan to provide a corrected, first image set, scan the identified three-dimensional object using a second magnification objective in a z-direction using a corrected z-height and corrected x-y locations from the corrected, first image set to provide a second image set, and correct imaging abnormalities from the scan to provide a corrected, second image set.

In certain embodiments, the system comprises a first objective and a second objective, and wherein first objective is used as the first magnification objective and the second objective is used as the second magnification objective, and wherein the second objective is different than the first objective and provides a magnification greater than or equal to a magnification of the first objective. In some examples, the first objective is an air objective and the second objective is a water immersion objective. In other examples, the detector comprises at least one camera and the first light source comprises at least one laser, and wherein the system is configured to use the camera and the laser to perform laser scanning confocal microscopy during the pre-scan and scan of the three-dimensional object.

In certain embodiments, the processor is configured to execute instructions to construct a three-dimensional image of the three-dimensional object in the three-dimensional matrix from an image set obtained from the scan step. In other embodiments, the image correction is applied to the first image set using another image set obtained from one or more images of a two-dimensional graphical pattern using the detector in a same fixed position(s) that was used to obtain the image set, wherein the two-dimensional graphical pattern comprises dots in a lattice, wherein the dots are at vertices that define one or more types of geometric shapes, wherein the lattice of dots is non-periodic, and wherein absolute positions of the imaged dots can be determined, and wherein the correction is applied to images of the first image set using the one or more images of the two-dimensional graphical pattern to correct geometric distortions in the images of the first image set and provide the corrected, image set.

In other embodiments, the system comprises at least two separate light sources configured to provide different wavelengths of light to the sample on the sample holder. In certain examples, the microscope system comprises a confocal unit optically coupled to each of the at least two separate light sources and positioned between the at least two separate light sources and the sample holder. In some examples, the system comprises at least two separate detectors configured to receive different wavelengths of light emitted by the sample on the sample holder. In other examples, each of the at least two separate detectors comprises a camera. In certain configurations, one of the at least two separate detectors is configured to detect light emissions during the pre-scan step and another of the at least two separate detectors is configured to detect light emission during the scan step.

In certain examples, the system is configured to use the first magnification objective of the microscope to identify an x-y location of each of a plurality of individual three-dimensional objects in the matrix and to identify a z-height for each of the identified plurality of three-dimensional objects in the matrix, and wherein the system is configured to scan each identified three-dimensional object using the second magnification objective in a z-direction using a respective identified z-height of each identified three-dimensional object to provide a three-dimensional image of at least some portion of each of the three-dimensional objects present in the matrix.

In other configurations, the system comprises four independent light sources each configured to provide a different wavelength of light to the sample on the sample holder and four independent cameras each configured to detect light emissions from the sample.

In other embodiments, the system is further configured to identify a z-width of the identified three-dimensional object in the matrix and use the identified z-width to select a scan time or to select a data volume obtained from the scan of the three dimensional object in the matrix.

In another aspect, anon-transitory computer readable medium having instructions stored thereon, wherein the instructions, when executed by a processor, cause the processor to: pre-scan a matrix using a first magnification objective to identify an x-y location of a three-dimensional object in the matrix and to identify a z-height for the three-dimensional object in the matrix and record the identified x-y location and z-height as a first image set, correct imaging abnormalities from the pre-scan to provide a corrected, first image set, scan the identified three-dimensional object using a second magnification objective in a z-direction using a corrected z-height and corrected x-y locations from the corrected, first image set to provide a second image set, correct imaging abnormalities from the scan to provide a corrected, second image set, and construct an image of the three-dimensional object in the matrix using the corrected, second image set. In some examples, the instruction cause the processor to select a magnification for the second magnification objective that is greater than or equal to a magnification of the first magnification objective.

Additional aspects, embodiments, examples, configurations and features are described in more detail below.

BRIEF DESCRIPTION OF THE SEVERAL VIEWS OF THE DRAWINGS

Certain examples of methods and systems are described in reference to the accompanying figures in which:

FIG. 10A is an illustration of three spheroidal objects present in a hydrogel matrix, in accordance with some examples;

FIGS. 10B, 10C, 10D, 10E and 10F show various image fields of the objects shown in FIG. 10A, in accordance with some embodiments;

FIG. 11A shows pre-scan measurements in various x-y planes at different z-dimension values to identify the x-, y- and z-coordinates (or z-heights) of the two objects, in accordance with some examples;

It will be recognized by the person having ordinary skill in the art that the objects illustrated in the figures are provided as exemplary to facilitate a discussion of some of the aspects and features of the technology. No particular shape, size, dimensions, locations or materials are intended to be implied or required unless clear from the context in describing that particular illustration or example.

DETAILED DESCRIPTION

Certain illustrative configurations of methods and systems that can be used in an automated manner to image three-dimensional objects present in a matrix are described to facilitate a better understanding of some of the configurations and examples which the technology can adopt. Additional different configurations may also be produced and used by the person having ordinary skill in the art, given the benefit of this disclosure. The methods described herein are typically implemented in a system comprising a microscope such as a confocal scanning microscope to permit automated imaging of three-dimensional objects in a matrix. The methods can be used, however, in imaging systems that include components other than a microscope to provide similar attributes and benefits. The matrix may be a separate external material or, in the case of cells imaged within a living organism, the matrix may be other parts of the organism. Notwithstanding that the matrix may take many forms, the matrix desirably does not interfere with imaging of a selected cell, tissue, organism or other three-dimensional object.

In certain embodiments, it can be desirable to rapidly image three-dimensional objects such as biological cells to monitor metabolism and/or physiological responses of the cells to a stimulus. For example, to better predict the effects of drug candidates during preclinical screening, more physiologically relevant three-dimensional model systems are being deployed in high-content screening assays. In addition, imaging of nanosystems, nanostructures or other complex three-dimensional structures that are present in a semi-solid or solid matrix can provide information on the overall nature and structure of these materials.

Figure 1:
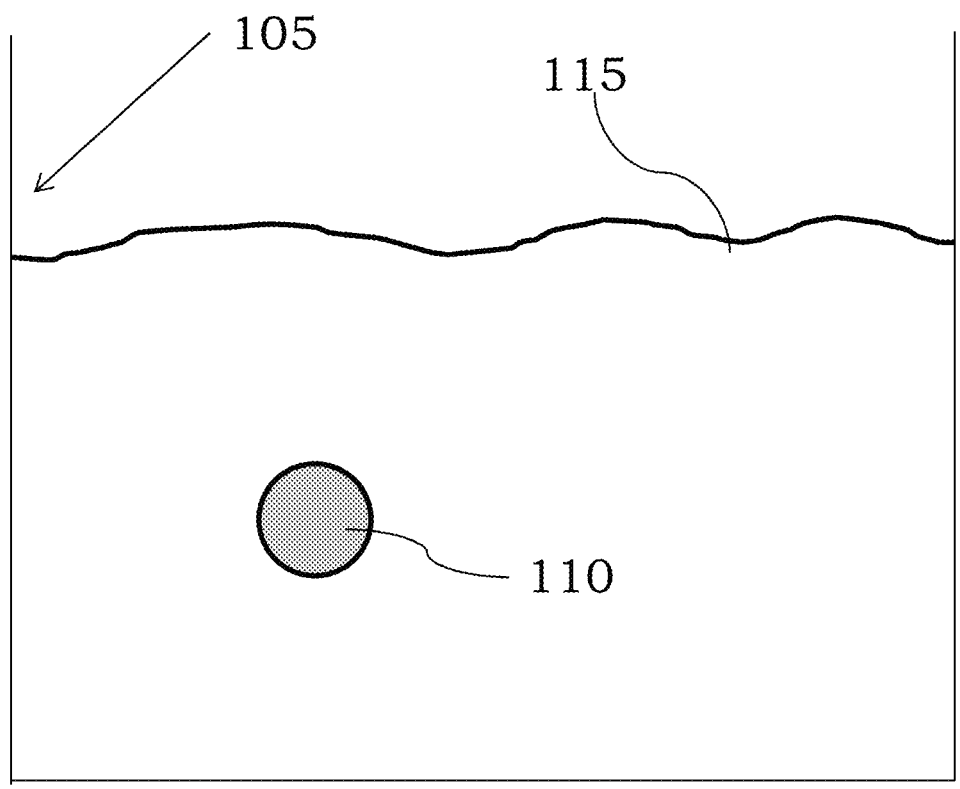
FIG. 1 is an illustration of a three-dimensional object in a matrix, in accordance with some examples.
Figure 2:
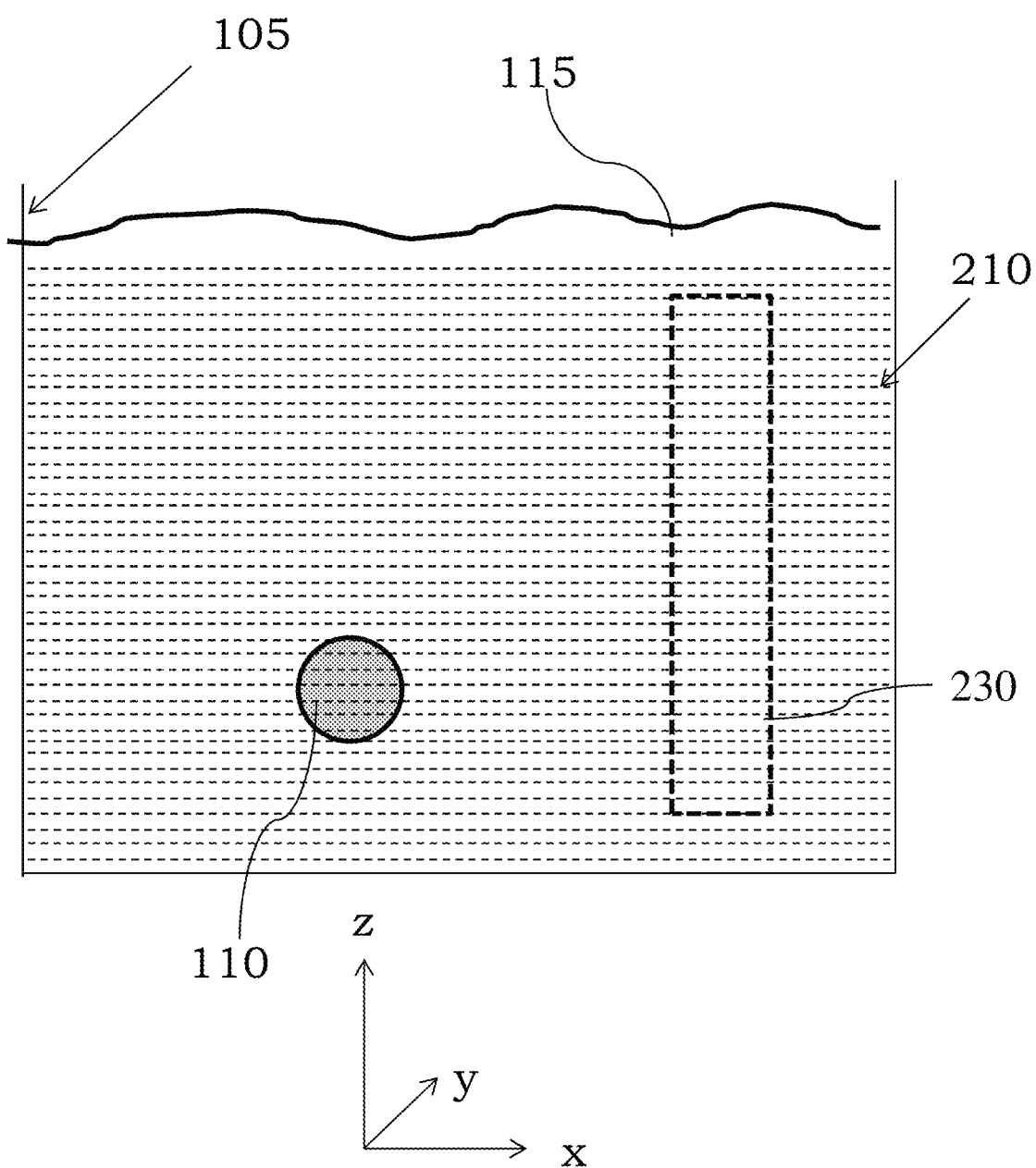
FIG. 2 is an illustration showing scanning of a well comprising a matrix and a three-dimensional object, in accordance with certain embodiments.

In certain examples, one drawback of imaging three-dimensional objects in a matrix is the large amounts of data obtained, especially if the three-dimensional objects are randomly distributed in a sample vessel as a considerable number of images will be empty, i.e., contain no portion of the three-dimensional object, or out of focus. This data volume presents several issues including the need to store all the data, at least temporarily, and the need to process all the data to construct an image of the three-dimensional object in the matrix. A simplified illustration of this problem is shown in FIG. 1 where a spherical object 110 is shown from a side view, e.g., in two-dimensions, as being present in a flat bottom well 105. While a flat bottom well 105 is used in various illustrations, other well shapes including, but not limited to, non-flat bottom wells such as rounded wells can also be used. Further, the side walls of the well 105 need not be orthogonal to the flat bottom but could instead be rounded, tapered or otherwise configured in a manner where a longitudinal axis of the side wall is not oriented ninety degrees from the flat bottom. The object 110 is in a matrix 115 in the well 105, though as noted herein, the object 110 could be adhered or suspended in the well 105 with the surrounding matrix being air or a liquid or the matrix comprising a liquid layer above a solid or semi-solid layer. For example, in the case of biological cells the matrix 115 can be a solid or semi-solid optionally with nutrient materials to support survival of the cells in the matrix 115 or other materials to promote a biological response by the cells in the matrix 115. To image the object 110 in the well 105 using microscopy, for example, the well 105 needs to be scanned at many different points across all three dimensions of the well 105 to provide an image map of the well 105 and the three-dimensional object 110 in it. For example and referring to FIG. 2, various scan lines (collectively 210) are shown which indicate scan points across the x-y dimensions of the well at different z-planes. For purposes of discussion herein, the z-dimension is the vertical dimension (up/down) of the figure, the x-dimension is the horizontal dimension (left/right) of the figure and the y-dimension is into/out of the page of the figure. Different scan lines are different scans in the z-dimension. By scanning across the well 105 in the x-y dimension and scanning at various heights in the z-dimension, enough data can be obtained and used to construct a three-dimensional image of the object 110. However, the scanning steps generate enormous amounts of data most of which is not relevant to construct an image of the object 110, e.g., a large amount of the scan data represents the matrix 115 without any object in it. For example, an image field 230 is shown that does not include any data for any three-dimensional object in the well 105. It takes a significant amount of time to scan the image field 230, and scanning this field 230 generates significant data that is not used to image the object 110. While the scan lines 210 are shown for illustration purposes, the exact number and spacing of scans in the z-direction may vary depending on the desired resolution. For illustration purposes, each data point is shown as a dash in FIG. 2, but for imaging three-dimensional objects such as biological cells, the z-distance spacing between scan lines is often 1 micrometer or less, which would result in significantly more scan lines and data points than what is shown in FIG. 2. These sequential scanning processes can generate enormous amounts of data which needs to be stored, at least temporarily, and/or processed into an image of the object 110. The data volumes can drastically slow imaging time and can increase costs due to the extra data storage and processing capabilities needed for imaging Real time imaging is also difficult due to the lengthy scan times.

Figure 3:
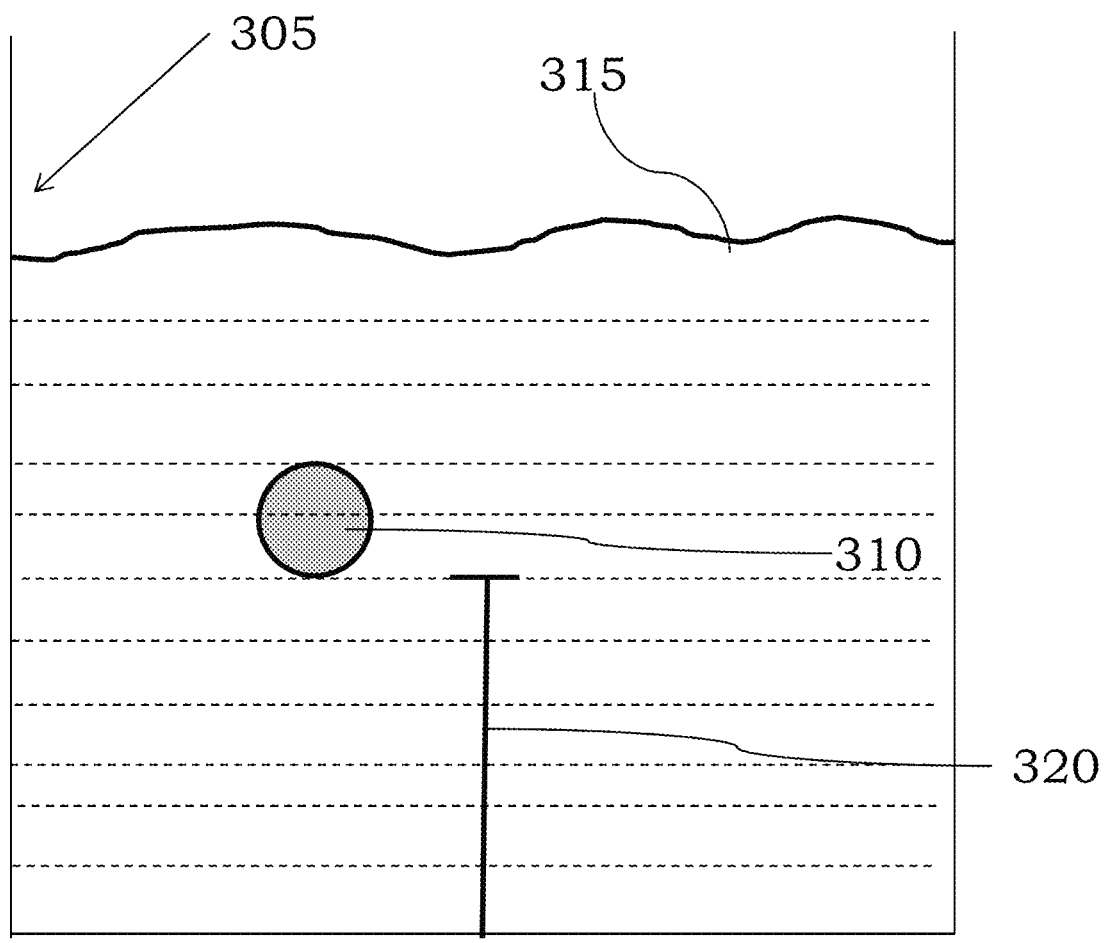
FIG. 3 is an illustration showing a pre-scan of a well comprising a matrix and a three-dimensional object, in accordance with certain examples.

In certain embodiments, to increase imaging speed while at the same time providing an image with a desired resolution, the methods and system described herein can use a pre-scan to determine a z-height and x-y coordinates for an object to be imaged. For example, rather than scan the entire well to image any three-dimensional objects in the matrix, a pre-scan may be performed to identify the x-y coordinates and the z-height of the object in the matrix. A simplified illustration is shown in FIG. 3. The pre-scan step uses a lower resolution scan than the scanning step to be able to rapidly distinguish the object 310 in the matrix 315 from space/areas in the matrix 315 of the well 305 that does not include any objects to be imaged. For example, pre-scanning can be performed using a low power objective, e.g., a 10× air objective, to provide a quick identification of the objects in the well 305. The x-y coordinates of the object 310 along with a z-height 320 can be identified with the pre-scan. In this illustration, the z-height 320 is the vertical distance from the bottom of the well 305 to the bottom of the object 310. The bottom of the well 305 can be used as a reference point, though if desired other regions or portions of the well could instead be used as a reference point. For example, where an objective of the microscope is positioned above the well 305, the z-height could instead be the distance from the top of the well 305 to the top of the object 310. The z-height 320 need not be exactly the distance from the bottom of the well 305 to the bottom of the object 310, e.g., can be lower or higher by 10-20% and still be used as an accurate enough measure of the z-height. Also and as noted in more detail below, a z-width, e.g., a z-direction height estimate of the three-dimensional object 310, can be determined in the pre-scan and used to select a particular scanning resolution based on desired scan speed and/or desired data volumes. Further, depending on the position of the objective, an x-distance, e.g., the x-direction distance from the left side of the well 305 to the left side of the object 310, could instead be used, or a y-distance, e.g., the y-direction distance from the side of the well 305 to a side of the object 310, could be used in place of the z-height or in addition to the z-height.

In certain embodiments, once the x-y coordinates and the z-height of the three-dimensional object 310 is determined using the pre-scan, the methods and systems described herein can then focus in on the identified x-y coordinates of the three-dimensional object and then scan starting at the identified z-height, e.g., scans can be performed in the identified x-y plane in different z-directions to provide image slices of the object 310. The other regions in the well can be ignored or otherwise not scanned during the high resolution scanning step to facilitate faster scan times and reduced data volume. For example and referring to FIG. 4, scanning using a high resolution objective, e.g., a 40× liquid immersion objective, across different x-y planes in the z-direction can be performed to provide data representative of the object 310. In this simplified illustration, eight x-y scan planes at different z-dimensions (collectively 410) are shown with the first x-y scan plane starting at the determined z-height 320 from the pre-scan, and successive x-y plane scans are performed in the z-direction above the z-height. For example, x-y plane scans above the z-height can be performed with 1 micron z-dimension distance separation to provide a plurality of image slices of the object 410. The resulting data can be stored and used to construct an image of the object 310 which can be displayed as desired.

Figure 4:
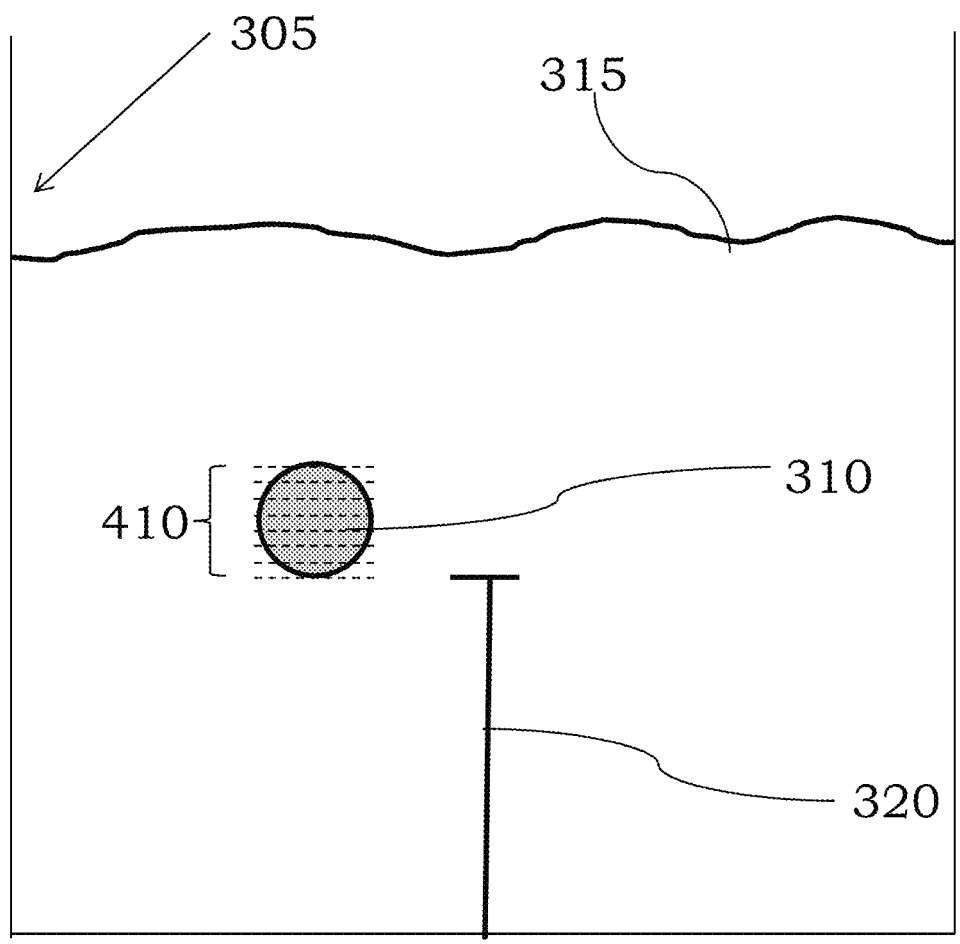
FIG. 4 is an illustration showing a scan of a three-dimensional object identified in a pre-scan, in accordance with some examples.

FIG. 4 illustrates that the combination of a lower resolution pre-scan to identify the x-y coordinates of the object 310 and the z-height 320 of the object 310 followed by higher resolution scan over the identified x-y coordinates in the z-direction starting from the z-height can reduce scan time and data volume drastically. Compared to the data volume obtained using the scanning shown in FIG. 2, the scanning shown in FIG. 4 permits the system to focus in and scan only the areas in the well 305 where the object 310 is present. The remainder of the matrix can be ignored (or otherwise not scanned) during the higher resolution scanning step. The reduction in data volume can decrease the time needed to image the object 310 in the well 305 and can permit for real time imaging or near real time imaging using reduced data volumes.

Figure 5:
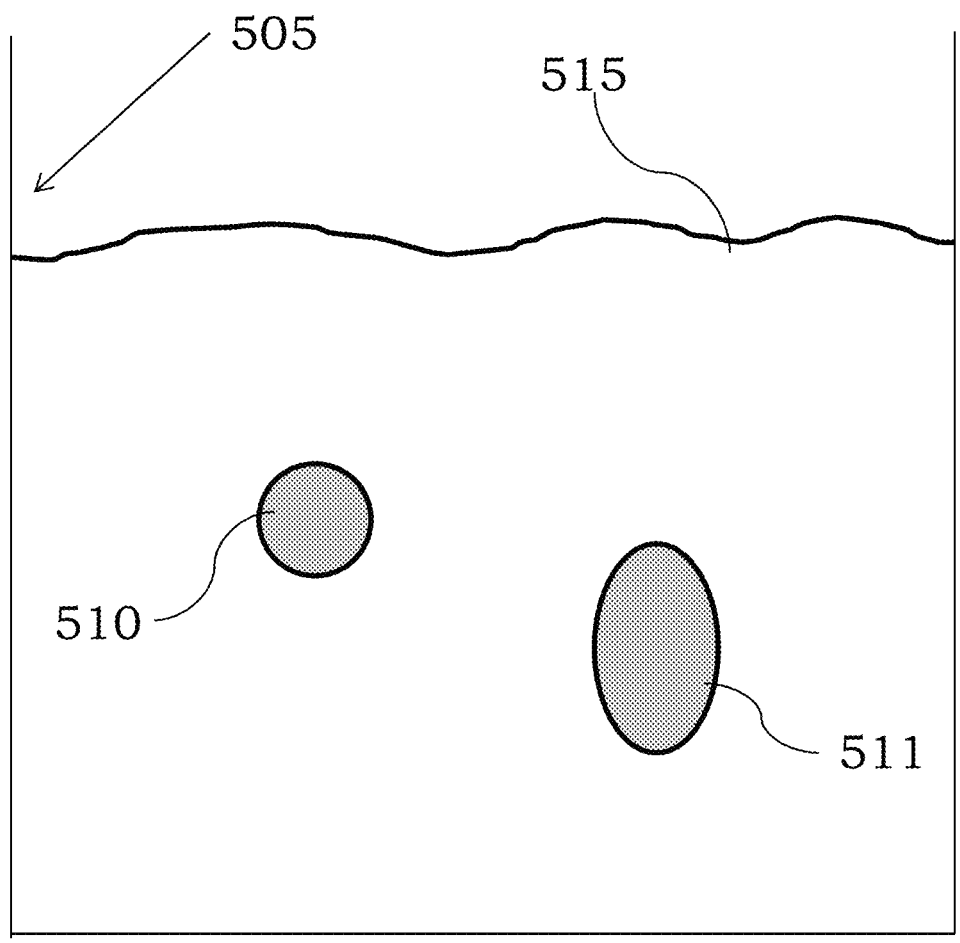
FIG. 5 is an illustration showing two three-dimensional objects of different sizes, in accordance with some embodiments.
Figure 6:
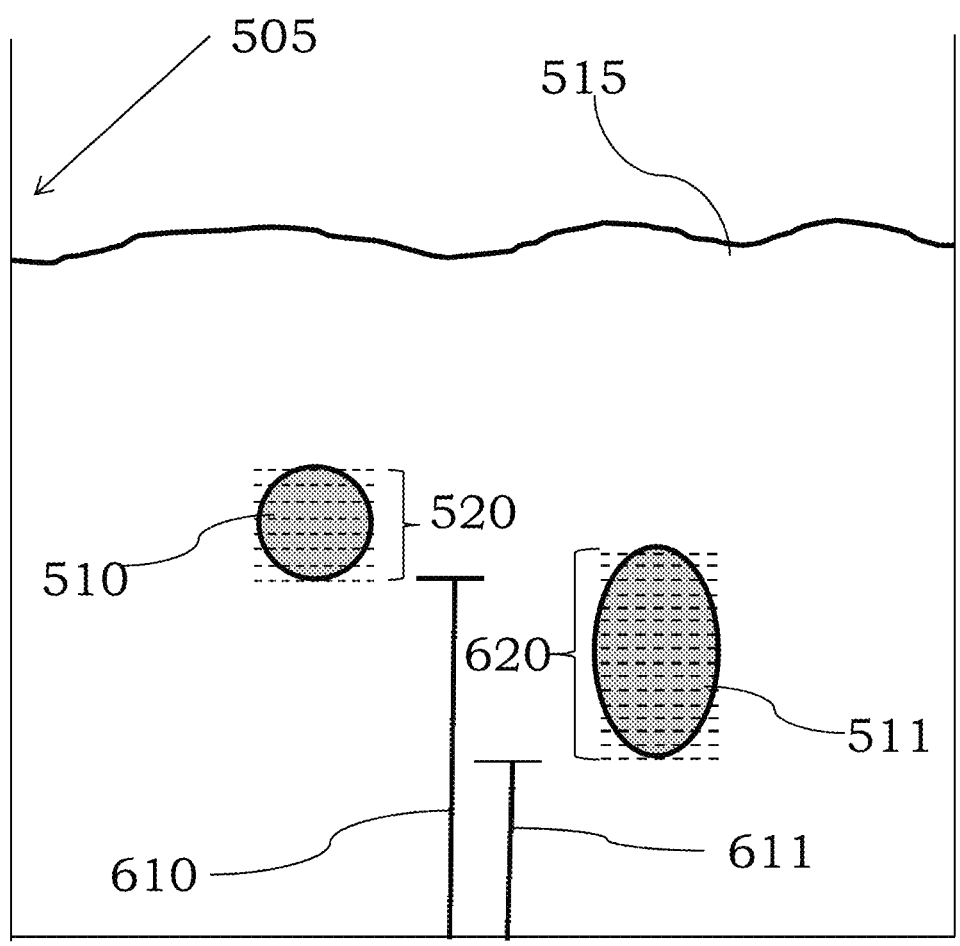
FIG. 6 is an illustration showing a scan of each of the three-dimensional objects of FIG. 5 after a pre-scan, in accordance with some examples.

In certain instances, more than a single object is often present in any one well or sample vessel. These objects can be located at different z-heights and may have different dimensions/shapes overall. Referring to FIG. 5, a side view is shown where a well 505 comprises a first object 510 and a second object 511 in a matrix 515. Objects 510, 511 have different sizes and shapes and are present in different areas of the matrix 515. A pre-scan step can be performed under low power magnification to identify the x-y coordinates for each of the objects 510, 511 and to identify a z-height for each of the objects 510, 511. The data obtained from the pre-scan can then be used to scan each of the objects 510, 511 using their identified respective x-y coordinates and z-heights. Referring to FIG. 6, a z-height 610 is shown for the object 510, and a z-height 611 is shown for the object 511. The object 510 can be scanned at high resolution by starting at the z-height 610 and scanning over the identified x-y coordinates for the object 510. Additional scans in the z-direction (over the identified x-y coordinates for the object 510) can be performed to provide image data for the object 510 that can be used to reconstruct a three-dimensional image of the object 510. Similarly, the object 511 can be scanned at high resolution by starting at the z-height 611 and scanning over the identified x-y coordinates for the object 511. Additional scans in the z-direction (over the identified x-y coordinates for the object 511) can be performed to provide image data for the object 511 that can be used to reconstruct a three-dimensional image of the object 511. The combination of a low power pre-scan to identify the x-y coordinates and the z-height for each of the objects 510, 511 followed by a higher resolution scanning using the identified x-y coordinates and z-height for each of the objects 510, 511 can permit more rapid imaging with reduced data volumes than is achieved with high resolution scanning of the entire well 505.

Figure 7:
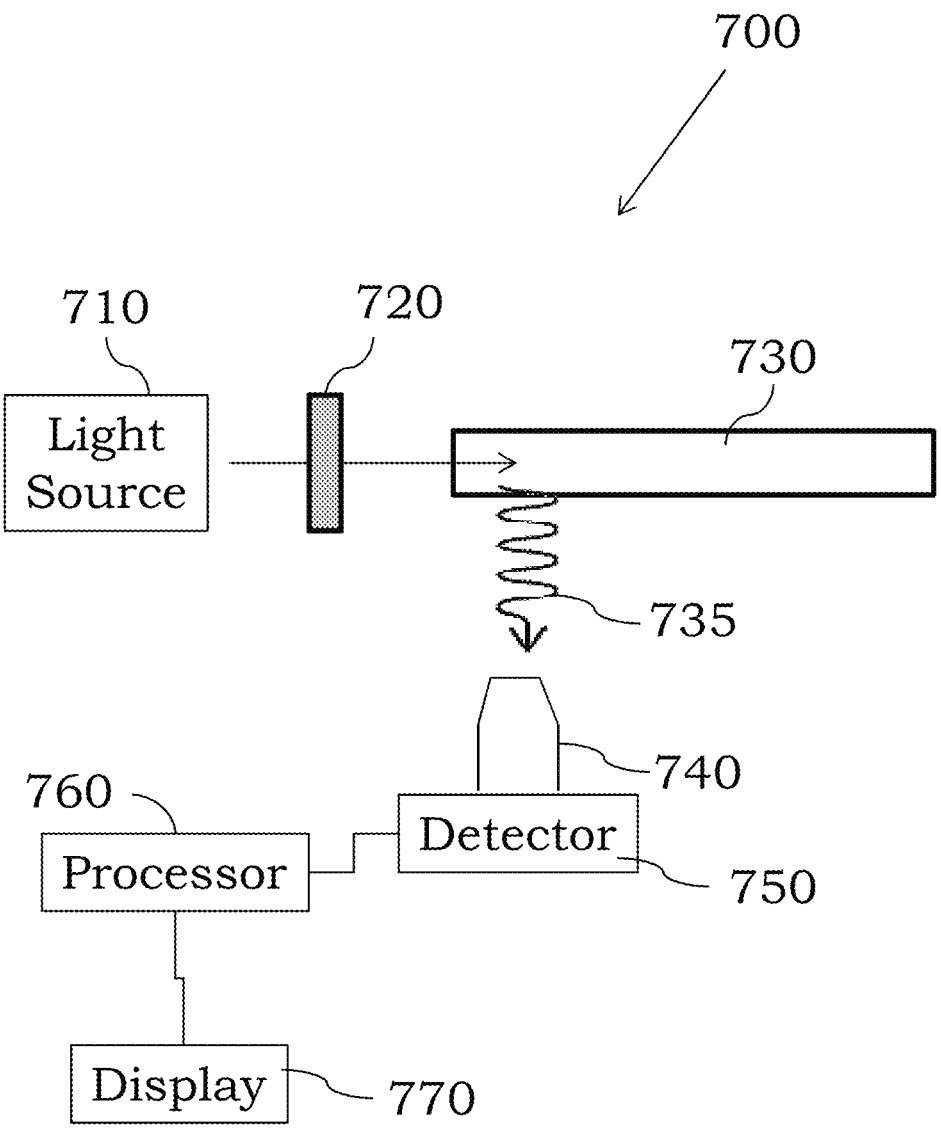
FIG. 7 is an illustration of a system that can be used to image three-dimensional objects, in accordance with some embodiments.

In certain instances, the methods described herein can be implemented using a system that includes an excitation source, optics, one or more objectives and a detector. A generalized illustration of a system is shown in FIG. 7. The system 700 includes an excitation source 710 optically coupled to optional system optics 720, which can be designed to pass the excitation light, filter it, pulse it or perform other optical operations on the excitation light. The excitation light from the source 710 is provided to a sample space 730, which can be designed to receive a sample in a vessel such as a tube, chamber, microwell plate or other devices that can hold a sample. The excitation light is incident on a certain area of the sample on the sample area holder 730. For example, the excitation light can be used to excite a lumiphore such as a fluorophore present in or on a three-dimensional object. The excited fluorophore can then emit the light as a fluorescence emission 735. The fluorescence emission 735 can be collected by an objective 740 and provided to a detector 750 optically coupled to the objective 740. While not shown, additional optics, e.g., a grating, a mirror, a spinning disk, a filter, a dichroic slider, a monochromator, etc. can be present between the objective 740 and the detector 750 to select certain wavelengths of light for detection or otherwise guide the light emission to a specific port of the detector 750. A position of the sample in the sample space 730 can be moved, e.g., in three dimensions, to alter the particular spot or region of the sample where the excitation light is incident. Alternatively, the excitation source 710 can be moved to alter the particular spot or region of the sample where the excitation light is incident. The scanning of the sample can be performed over the identified x-y coordinates and starting at the z-height to obtain a plurality of data values over the identified dimensions of the object. The detector 750 can be electrically coupled to a processor 760 which can store the fluorescence emissions at the various x, y and z dimensions and use them (along with the fluorescence emissions from the other scan measurements) to construct an image of the object in the sample. The image can be displayed on an optional display 770 or may be displayed in other formats, e.g., using a mobile device, tablet or other electronic devices either coupled to the processor 760 in a wired or wireless manner. The excitation source 710 can be configured as many different forms including a lamp, a laser, an arc, or other devices that can emit light. In some instances as noted below, more than a single excitation source can be present to provide different wavelengths of light to exit different lumiphores. For example, different fluorescent labels have different excitation wavelengths. The detector 750 can be many different types of detectors including, but not limited to, a photomultiplier tube, a camera, a complementary metal oxide semiconductor (CMOS) camera, a charged coupled device (CCD) camera, a scientific grade CMOS (sCMOS) camera, an electron multiplying CCD (EMCCD), a photodiode, an avalanche photodiode (APD), a microchannel plate (MCP) and other detectors which can detect a light emission of a particular wavelength from a lumiphore. The detector 750 typically detects a light emission that is red-shifted compared to a wavelength of the excitation source 710 and can be designed to detect a very narrow wavelength range, e.g., 10-50 nm, or may detect a wavelength range over a broad range, e.g., 400-800 nm. Optical filters such as bandpass filters can be used to filter out non-desired emission wavelengths to reduce background signals. While the light source 710 is shown as providing light at a direction about ninety degree to an aperture of the objective 940, the light can be provided at generally the same angle, e.g., parallel, or in a direction where the light impacts a top surface or bottom surface of the sample space 730.

In some examples, while the same system is typically used to perform the pre-scan and the scan steps described herein, if desired, separate detection systems could be used for the pre-scan and scan steps. For example, a low resolution system can be used for the pre-scan step and a higher resolution system can be performed for the scan step. The detector of the low resolution pre-scan system may be the same or different than the detector of the higher resolution scan system. For example, a less sensitive detector may be present in the pre-scan system to identify the x-y coordinates and the z-heights of the objects. A more sensitive detector can be present in the higher resolution scan system used in the imaging of the objects. In addition, the low resolution pre-scan system can include a low power air objective, and the higher resolution scan system can include a higher powered immersion objective. The two systems can share light source, optics, etc. or may include separate light sources, optics, etc. As noted herein, however, by using a single system to perform both the pre-scan and scan steps, significant data savings, decreased instrument complexity and footprint and higher scan speeds can be implemented using a single system.

Figure 8:
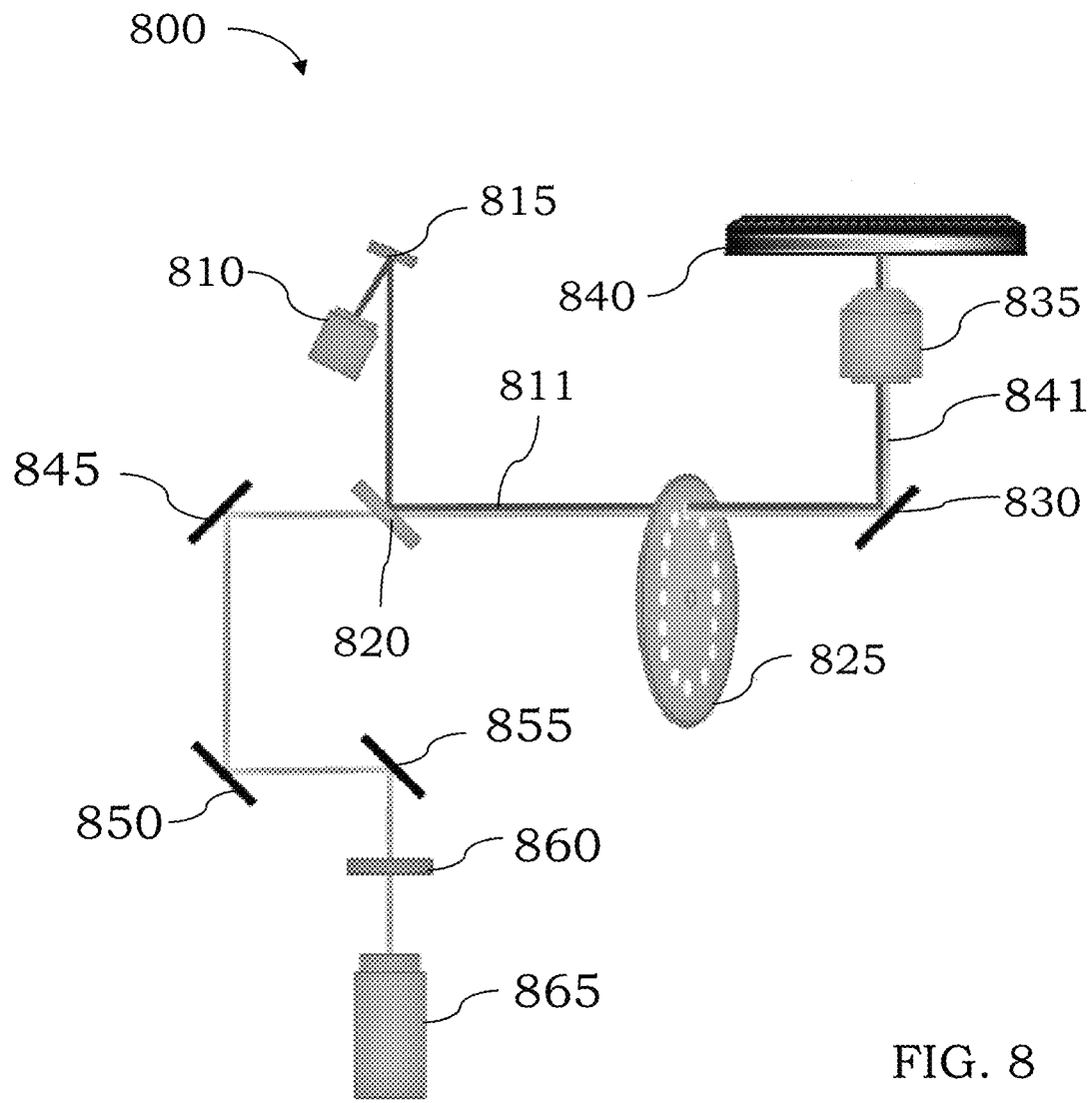
FIG. 8 is an illustration of another system that can be used to image three-dimensional objects, in accordance with certain embodiments.

In some configurations, to increase scan speed and provide for high throughput automated scanning, the objective used in the pre-scanning and scanning steps can be part of a confocal laser scanning microscope. One illustration of a confocal laser scanning microscope system is shown in FIG. 8. The system 800 comprises at least one laser 810 that is optically coupled to a mirror 815 or other optical element such as a grating. The mirror 815 reflects light from the laser 810 to a dichroic changer 820 as a beam 811. The beam 811 is incident on an optional confocal spinning disc 825, which typically comprises a plurality of pinholes or other apertures, and another mirror 830 and is provided through an objective 835 and onto a sample present in a sample holder 840. As noted herein, different powers and/or objective lenses can be used for the pre-scan and the higher resolution scanning steps as desired. Light emitted from the object being scanned is provided back through the objective 835 as a beam 841 and is incident on the mirror 830, the optional confocal spinning disk 825, the dichroic changer 820, the mirrors 845, 850 and 855 and can be filtered using the filter 860 before being provided to a detector 865 such as, for example, a camera or the other detectors described in reference to detector 770 of FIG. 7. In some examples, the laser 810 may comprise a light emitting diode or a plurality of light emitting diodes, e.g., two, three, four, five, six, seven, eight or more LEDs each with its own unique wavelength. If desired, any two of the sources can have similar wavelengths but may provide different powers and/or different pulse durations. The wavelength of the light from the laser 810 is typically selected such that any lumiphore (e.g., a fluorophore or phosphor) present in the object will be excited and can emit light by way of fluorescence or phosphorescence. In some examples, more than a single wavelength of light can be used in parallel with the confocal spinning disk 825 to simultaneously monitor emissions at different wavelengths and/or collect multiple scan points simultaneously to increase image processing even further. Further, where the confocal spinning disk 825 is present, photobleaching and phototoxicity can be reduced. While not shown in FIG. 8, a transmission light source can be positioned above the sample holder 840. If desired, more than a single detector can also be present in the system 800. The detector 865 can be many different types of detectors including, but not limited to, a photomultiplier tube, a camera, a complementary metal oxide semiconductor (CMOS) camera, a charged coupled device (CCD) camera, a scientific grade CMOS (sCMOS) camera, an electron multiplying CCD (EMCCD), a photodiode, an avalanche photodiode (APD), a microchannel plate (MCP) and other detectors which can detect a light emission of a particular wavelength from a lumiphore. Further, a first detector can be present and use for the pre-scan measurements and a second detector can be used for the higher resolution scanning measurements. Without wishing to be bound by any particular theory, detector response is often limits how fast scanning can be performed. By selecting a lower resolution detector with a faster response time for the pre-scan step, faster pre-scanning can be performed to permit quicker initiation of the higher resolution scan step. The initiation of higher resolution scanning sooner can permit visualization of ongoing metabolism of cells that may not otherwise be achievable with slower scanning speeds. The system 800 can be used to obtain optical responses over thin optical sections through the objects and then use the obtained optical response to construct an overall three-dimensional image of the object. Images can be constructed or displayed in real time, or near real time, using less data and using higher scan rates.

In some instances, the pre-scan step performed using the system 800 may use an air objective, whereas the scanning step may use a liquid (aqueous) immersion objective or other immersion objective, e.g., oil immersion. As noted herein, the low power objective used during the pre-scan step can typically be 5×, 10×, 15× or 20×. Using a low power air objective permits rapid identification of the x-y coordinates and the z-height (or z-coordinates) during the pre-scan step. Once these values are identified, the objective can be switched or changed to a higher power objective such as, for example, immersion objectives, e.g., 30×, 40× or higher power objectives can be used during the scanning step. In some instances, the system 800 includes three or more different objectives to provide the possibility of pre-scanning and/or scanning at different powers for different objects to be measured. The system 800 or a user can select the particular objectives to be used for the pre-scan and scan steps depending on a desired scan rate, a desired data volume, a desired resolution, and/or a desired image acquisition time. The system 800 can be used with different low power objectives to identify x-y coordinates and a z-height for each image present in each well or vessel of a sample on the sample holder 840. These coordinates and values can be stored and used to scan each three-dimensional object at a higher resolution (using the higher powered objective) while at the same time reducing overall data volume.

Figure 9:
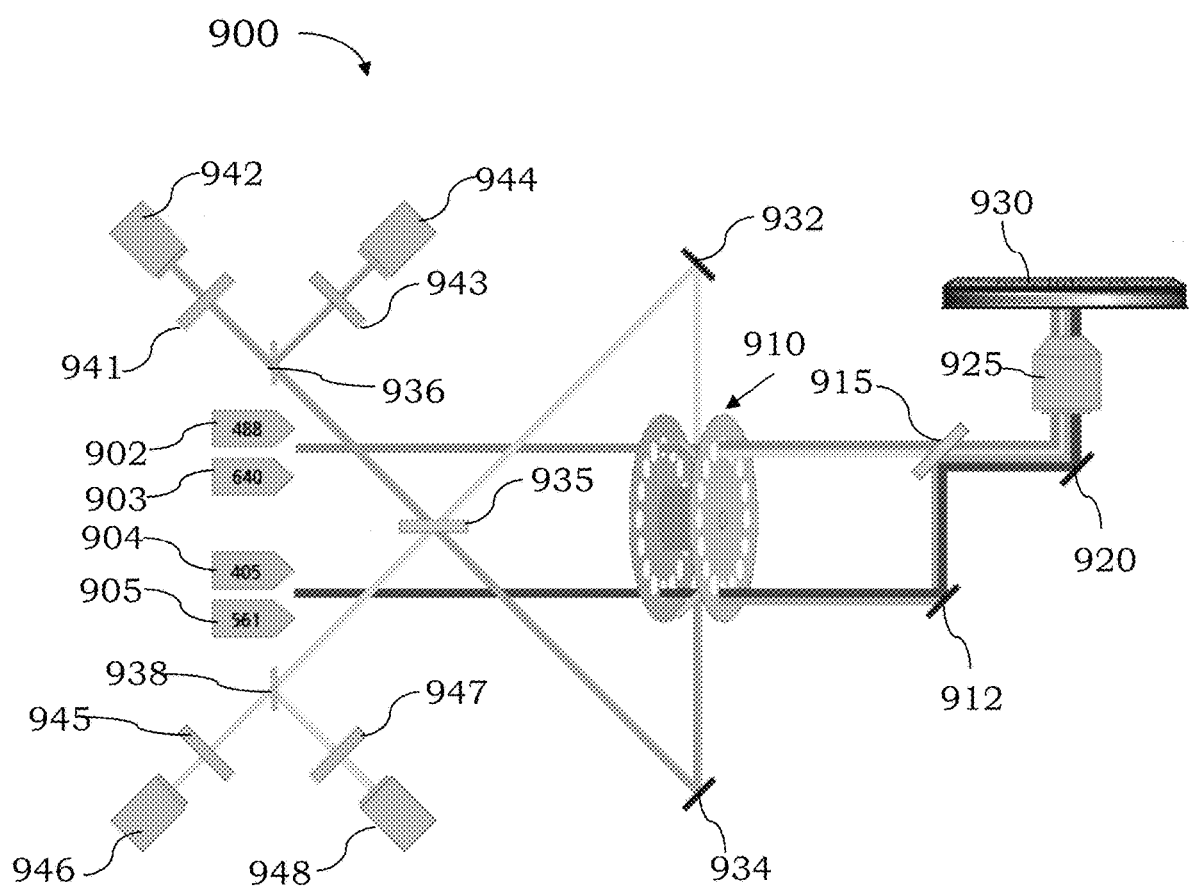
FIG. 9 is an illustration of an additional system that can be used to image three-dimensional objects, in accordance with certain embodiments.

In some examples, the systems described herein may comprise two or more separate detectors to permit simultaneous detection of different emission wavelengths by the different detectors. Referring to FIG. 9, a system 900 is shown that comprises four light sources 902, 903, 904 and 905. Each of the light sources 902-905 is typically a laser though non-laser sources, choppers, etc. can be used in place of lasers if desired. Light from one or more of the light sources 902-905 is incident on a confocal unit 910 comprising two spinning disks. Where light sources 904, 905 are used, the light passes through the confocal unit 910 and is incident on a mirror 912. The light from the light sources 902-905 is then incident on a dichroic slide 915 and then a mirror 920 before being provided to an objective 925. The light passes through the objective 925 and is incident on a sample in the sample holder 930. While not shown a transmission light source can be present above the sample holder 930. Light from the different light sources 902-905 can be incident on the same or different areas of the sample on the sample holder 930. Certain light is absorbed by lumiphores (e.g., fluorophores or phosphors) in the sample and can be emitted as a fluorescence or phosphorescence emission. The light emissions travel back through the objective 925, are incident on the mirror 920, the dichroic slide 915 and the confocal unit 910. The confocal unit 910 can select/guide certain light to the mirrors 932, 934, respectively. The light emissions are then provided to a dichroic slider 935. The light emissions can then be provided to a mirror 936 and a mirror 938. For example, the light emission reflected from the mirror 932 can be provided to the dichroic slider 935 and to the mirror 938. The light emission reflected from the mirror 934 can be provided to the dichroic slider 935 and to the mirror 936. The light emission reflected by the mirror 936 can be provided to filters 941, 943 and into the detectors 942, 944. The light emission reflected by the mirror 938 can be provided to the filters 945, 947 and into the detectors 946, 948. The various filters and other optical element sin the system 900 can be selected to minimize emission overlap from the sample so that different lumiphore emission signals from the sample can be simultaneously detected with rapid speed and high accuracy. The detectors 942, 944, 946 and 948 can be the same or can be different. For example, each of the detectors 942, 944, 946 and 948 can independently be a photomultiplier tube, a camera, a complementary metal oxide semiconductor (CMOS) camera, a charged coupled device (CCD) camera, a scientific grade CMOS (sCMOS) camera, an electron multiplying CCD (EMCCD), a photodiode, an avalanche photodiode (APD), a microchannel plate (MCP) and other detectors which can detect a light emission of a particular wavelength from a lumiphore.

In some instances, the pre-scan step performed using the system 900 may use an air objective, whereas the scanning step may use a liquid (aqueous) immersion objective or other immersion objective, e.g., oil immersion. As noted herein, the low power objective used during the pre-scan step can typically be 5×, 10×, 15× or 20×. Using a low power air objective permits rapid identification of the x-y coordinates and the z-height during the pre-scan step. Once these values are identified, the objective can be switched or changes to a higher power immersion objective, e.g., 30×, 40× or higher, that is used during the scanning step. Since many of the scanned samples may include living biological cells or living biological organisms, liquid immersion objectives can be used to scan the cells or organisms without destroying or altering the ongoing metabolism and cellular activities. Where the three-dimensional object to be imaged using the system 900 is a non-biological particle, colloid, nanostructure or nanosystem or even a dead cell or dead organism, oil immersion could instead be used during the scan step, though liquid immersion could also be used for these and other non-biological three-dimensional objects. In some instances, the system 900 includes three or more different objectives to provide the possibility of pre-scanning and/or scanning at different powers for different objects to be measured. The system 900 or a user can select the particular objectives to be used for the pre-scan and scan steps depending on a desired scan rate, a desired data volume, a desired resolution, and/or a desired image acquisition time. As noted herein, the system 900 can be used to identify x-y coordinates and a z-height for each image present in each well or vessel of a sample on the sample holder 930. These coordinates and values can be stored and used to scan each three-dimensional object at a higher resolution while at the same time reducing overall data volume.

In certain embodiments, the methods and systems described herein can be used to provide a three-dimensional image of an object present in a solid or semi-solid matrix such as, for example, a gel, a hydrogel, a three-dimensional scaffold or a three-dimensional network. Referring to FIG. 10A, three three-dimensional spheroids 1010, 1020 and 1030 are shown as being present in a hydrogel matrix 1005. To cover all the spheroids 1010, 1020, 1030 in the well, extensive z-direction scans must be obtained at each field across the well. Many fields may not contain any three-dimensional spheroids at all or may contain only a partial three-dimensional object. For example, five field are shown in FIGS. 10B-10F. In the field of FIG. 10B, the spheroid 1010 is shown as being imaged. While the z-direction scans capture the entire object 1010, many scans in the z-direction above the object are also obtained even though there are no objects there. This scanning increases scan time and data volume. Referring to FIG. 10C, the field scan captures the spheroidal object 1020 but also scans a significant amount of open space above the object 1020. The field of FIG. 10D simply scans a region of the hydrogel matrix that does not include any objects at all. In the field of FIG. 10E, only a portion of the object 1030 is scanned. In the field of FIG. 10F, the object 1030 lies outside the scan field and is missed entirely.

Figure 11B:
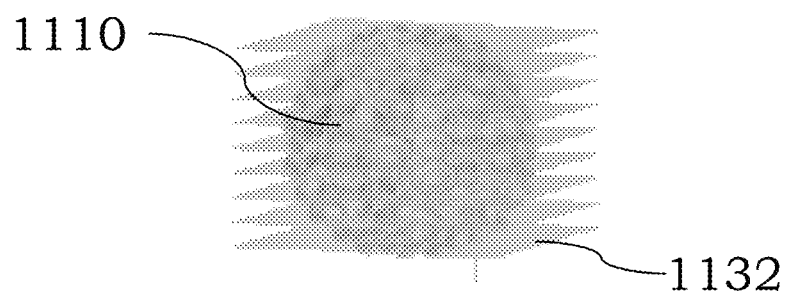
FIG. 11B shows a higher resolution scan using the pre-scan measurements from FIG. 11A, in accordance with certain examples.

In certain examples, to reduce the amount of data and accelerate the production of the three-dimensional images of the objects, a pre-scan can be performed to identify the x, y and z positions of objects of interest from a single color low magnification pre-scan with a low z sampling rate. This positional information can then be used to acquire high magnification/resolution z-stacks of centered objects in a re-scan experiment. The re-scan experiment can be set up with the minimal number of planes needed to capture the objects of interest. This methodology can reduce the number of planes, can prevent the acquisition of empty images or partially imaged three-dimensional objects and reduces the amount of data that needs to be acquired and analyzed. Furthermore, the identified objects of interest will be centered in the re-scan field of view. Referring to FIG. 11A, a pre-scan with a low magnification objective can identify the x, y and z positions of objects 1110, 1120 present in a hydrogel matrix. In this illustration, eight z-plane scans 1131-1138 are obtained and used to identify the x and y positions of each of the objects 1110, 1120. As noted herein, the z-plane scans can be used to determine z-height of each of the objects 1110, 1120. These z-heights can be used as an initial start position (in the z-direction) for the objects 1110, 1120 during the high resolution scan step. Referring to FIG. 11B, a z-height 1132 of the object 1110 can be used as a starting point for scans. A scan over an x-y plane can be performed in incremental z-direction planes to image the object 1110 at high resolution. For example, a liquid immersion objective can be used to image the object 1110 at high resolution by sequentially scanning the image in the z-direction at each x-y plane. The pre-scan and scan steps together can reduce data volumes by 20×, 30×, 40× or 50× or more to permit faster image scanning and construction.

Figure 12A:
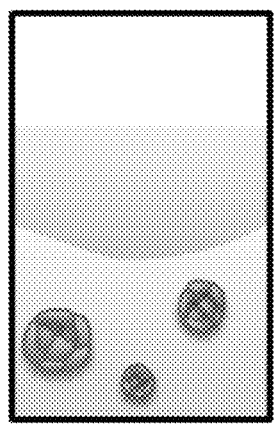
FIGS. 12A, 12B, 12C, 12D, 12E and 12F are illustrations of various samples and sample arrangements that can be imaged using the methods and systems described herein.
Figure 12B:
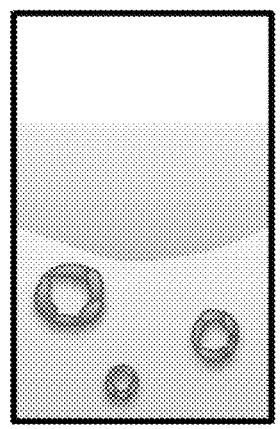
Figure 12C:
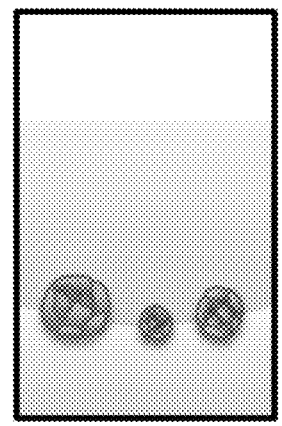
Figure 12D:
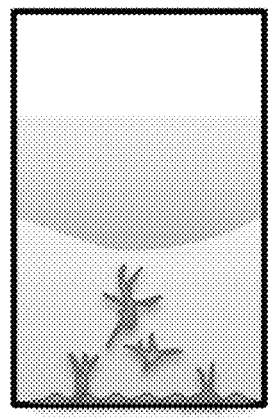
Figure 12E:
Figure 12F:
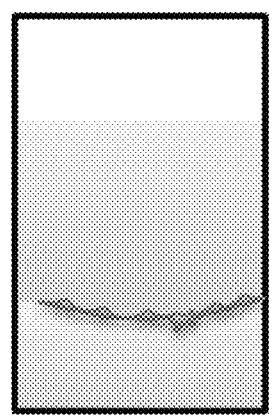

In certain embodiments, the methods and systems described herein can be used to image many different types of cells, tissues, organs, organisms, etc. For example, FIG. 12A is an illustration with spheroidal objects present in a hydrogel, FIG. 12B is an illustration of hollow objects (e.g., cysts in a hydrogel), and FIG. 12C is an illustration showing spheroids on top of a hydrogel, e.g., in an aqueous layer comprising a culture medium or other material that is present on top of a hydrogel. The methods and systems can also be used for monitoring cellular activity and cell status. For example, imaging of a cell invasion assay (FIG. 12D), cells seeded in a hydrogel (FIG. 12E) or cells seeded on top of a hydrogel (FIG. 12F) may be performed using the methods and systems described herein. Where an entire tissue, organ or organisms is imaged, the matrix surrounding the object to be imaged desirably does not interfere with (or can be distinguished from) the pre-scanning and scanning of the object(s) of interest.

Figure 13:
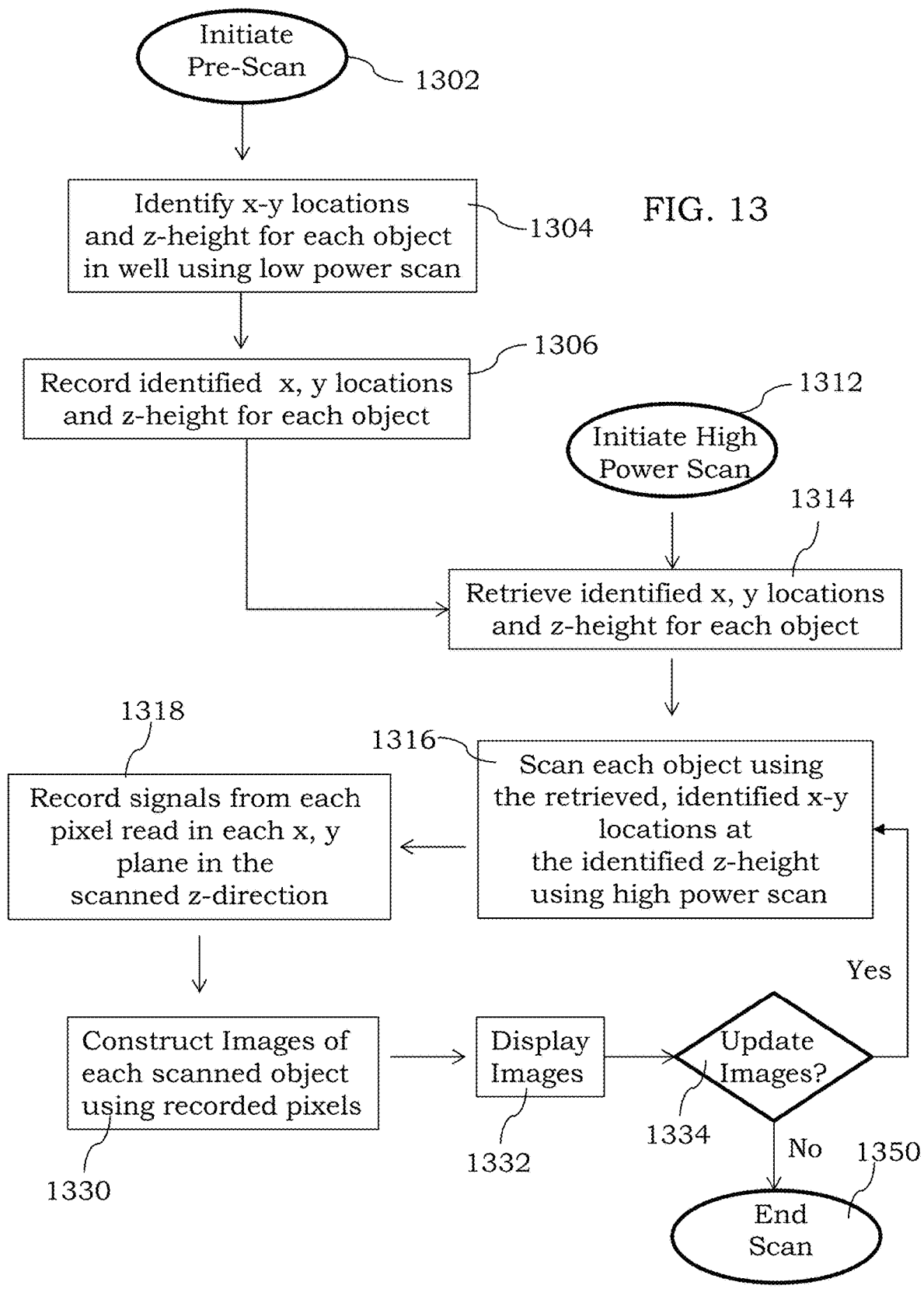
FIG. 13 is a flow chart showing a method of pre-scanning and scanning to image three-dimensional objects, in accordance with certain examples.

In certain embodiments, the methods described herein can be implemented in the form of a software package or executable code that can be used in combination with an imaging system that includes a processor. Various processors and associated components are described in more detail below. In some examples, a software package can be downloaded from a remote website or otherwise installed from a non-transitory computer readable medium having executable code, e.g., instructions stored thereon. Referring to FIG. 13, the instructions, when executed by a processor, cause the processor to initiate a pre-scan at a step 1302. The pre-scan identifies the x-y locations and z-height for each object in a well (or other sample vessel) using a low power scan at a step 1304. Low power imaging can be performed using a low power objective, e.g., a 10× air objective. The processor then stores the recorded, identified x-y locations and z-heights for each object at a step 1306. The processor can then initiate a high power scan at a step 1312. Once initiated, the high power scan retrieves the recorded, identified x,y locations and z-heights of each object from the pre-scan at a step 1314 and then uses that information to scan each object using a high power objective at a step 1316. For example, a high power scan can be initiated at the z-height over a x-y plane formed by the x,y coordinates using a 40× liquid immersion objective. As each pixel is read in that particular x-y plane at the z-height, the values can be stored at a step 1318. The processor can then repeat the high power scan in a z-direction above the z-height, e.g., 1 micron above the z-height, in the z-direction. The pixel values read in the x-y plane of this new z-dimension can also be stored. The processor can repeat this process until enough data from different z-stacks is obtained to form an image of the entire three-dimensional object. These recorded pixel values can be used by the processor to construct a three-dimensional image of the scanned object at a step 1330, and the constructed image can be displayed at a step 1332. If it is desired to update the images so real time viewing of the images can be visualized, or updating of the images at some later time is desired, then the processor can reinitiate the high power scan at step 1316 and the process can repeat. If only a single image of the objects is desired, then the processor can end the scan at a step 1350. A single pre-scan can be used to identify the x-y locations and the z-height even where multiple high power scan/image construction iterations are performed, or, if desired, the pre-scan steps 1302-1306 can be repeated periodically to ensure the cells or other objects have not changed their initial positions identified in the pre-scan. In other configurations, the pre-scan and scan steps can be coupled so a lower power pre-scan is performed prior to each high power scan. In such configurations, the imaging process can return from the decision step 1334 to the pre-scan step 1304 (instead of the scan step 1316), and the entire process can repeat.

Figure 14:
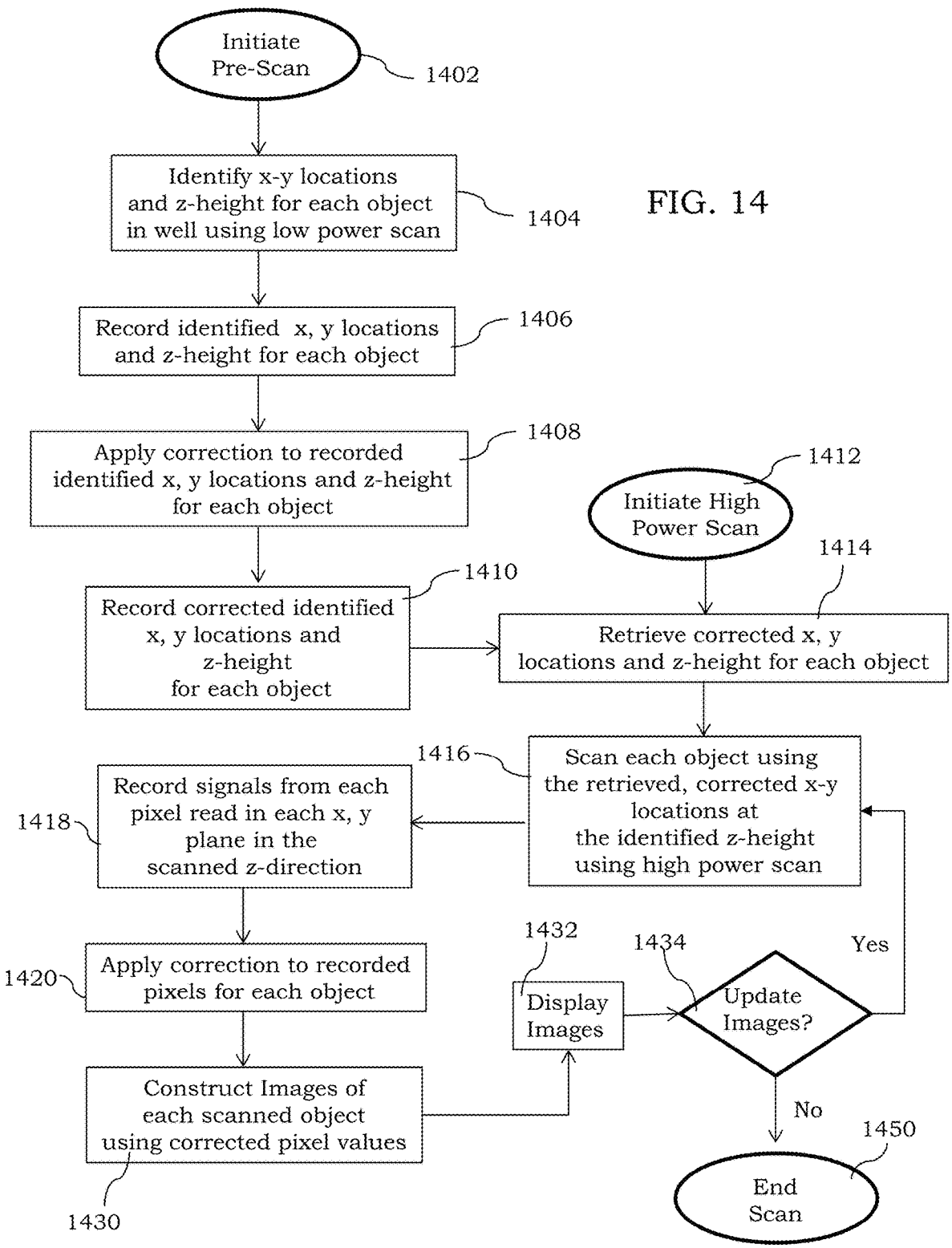
FIG. 14 is a flow chart showing a method of pre-scanning and scanning that also uses image correction to image three dimensional objects, in accordance with certain embodiments.

In other embodiments, the methods described herein can be implemented along with image correction to account for imaging aberrations and abnormalities. For example, a software package that includes the image correction capability can be downloaded from a remote website or otherwise installed from a non-transitory computer readable medium having executable code, e.g., instructions stored thereon. Referring to FIG. 14, the instructions, when executed by a processor, cause the processor to initiate a pre-scan at a step 1402. The pre-scan identifies the x-y locations and z-height for each object in a well (or other sample vessel) using a low power scan at a step 1404. Low power imaging can be performed using a low power objective, e.g., a 10× air objective. The processor then stores the recorded, identified x-y locations and z-heights for each object at a step 1406. The processor can then apply a correction to the recorded, identified x-y locations and z-heights to account for any imaging abnormalities or anomalies at a step 1408. The processor can then store the corrected, identified x,y locations and z-heights for each object at a step 1410. The processor can then initiate a high power scan at a step 1412. Once initiated, the high power scan retrieves the recorded, corrected, identified x,y locations and z-heights of each object from the pre-scan at a step 1414 and then uses that information to scan each object using a high power objective at a step 1416. For example, a high power scan can be initiated at the z-height over a x-y plane formed by the x,y coordinates using a 40× liquid immersion objective. As each pixel is read in that particular x-y plane at the z-height, the values can be stored at a step 1418. The processor can then repeat the high power scan in a z-direction above the z-height, e.g., 1 micron above the z-height, in the z-direction. The pixel values read in the x-y plane of this new z-dimension can also be stored. The processor can repeat this process until enough data from different z-stacks is obtained to form an image of the entire three-dimensional object. Correction can be applied to each pixel as it is scanned or correction can be applied to a data set comprising a plurality of pixels, e.g., an image, at a step 1420. The correction, as discussed in more detail below, can be used to account for imaging abnormalities. The corrected, recorded pixel values (or corrected image sets) can be used by the processor to construct a three-dimensional image of the scanned object at a step 1430, and the corrected, constructed image can be displayed at a step 1432. If it is desired to update the images so real time viewing of the images can be visualized, or updating of the images at some later time is desired, then the processor can reinitiate the high power scan at step 1416 and the process can repeat. If only a single image of the objects is desired, then the processor can end the scan at a step 1450. A single pre-scan can be used to identify the x-y locations and the z-height even where multiple high power scan/image construction iterations are performed, or, if desired, the pre-scan steps 1402-1410 can be repeated periodically to ensure the cells or other objects have not changed their initial positions identified in the pre-scan. In other configurations, the pre-scan and scan steps can be coupled so a lower power pre-scan is performed prior to each high power scan. In such configurations, the imaging process can return from the decision step 1434 to the pre-scan step 1404 (instead of the scan step 1416), and the entire process can repeat.

In certain embodiments, the various emission signals obtained for the scanned three-dimensional objects can be used to construct a three-dimensional image of each scanned object in the sample, e.g., the scan information can be used to register an image. While the exact methodology used to construct the image from the optical signals can vary, methods similar to those described in U.S. Pat. No. 9,582,864 can be used for the date obtained in all three dimensions. In some examples, it may be desirable to correct the image values to account for any distortions or abnormalities. For example, geometric distortions often result as the optical signal is provided through the matrix and into the objective. The use of an air objective in the pre-scan step may result in distortions and chromatic aberrations as the emitted light passes through the air space between the sample and the objective. These distortions/aberrations can be compensated by automatic correction of the z-values of the individual objectives. For example, a z-correction can correct the shift between the z-position of the upper plate bottom as determined with an infrared autofocus laser and the z-position of the upper plate bottom as it is determined with a visible wavelength. The values can vary due to incomplete correction of chromatic aberration between infrared and visible wavelengths. The values also vary for different objectives. Since measurements are performed in the visible range, this shift can be corrected for in order to determine correct object positions relative to a common reference point (i.e., the upper plate bottom as detected with the laser-based autofocus system). If the z-offsets of both objectives are corrected, then the correct object z-heights can be obtained prior to initiation of the higher resolution scanning step.

In certain embodiments, a pentapattern with a z-stack can be measured and used to correct for image abnormalities. In one instance, a pentapattern is measured with a z-stack (using the desired visible wavelength), the sharpest plane of the pattern is determined and this z-height information is used for the z-correction of the individual objectives with respect to the z-height found at the autofocus laser wavelength. The differences in refractive index between pentapattern measurement and sample measurement are taken into account in the calculation. This z-correction can also correct additional variables contributing to the offset such as, for example, autofocus laser collimation. These variables may change over time and/or are subject to adjustments, so this correction can be implemented for each pre-scan measurement to ensure the higher resolution scanning is initiated at the proper z-height.

In some examples, the methods and systems can adjust one or more images of a sample to correct geometric distortions and/or to properly align the one or more images. This image correction can be performed for one or both of the pre-scan and scanning steps to obtain corrected images representative of the actual three-dimensional objects. In certain examples, the sample is a microtiter plate of wells containing three-dimensional biological cells, organelles or components thereof. In one instance, an artificial pattern of dots that allow for image adjustment and registration over a variety of magnifications can be used. For example, one or more images of a pattern of dots is acquired, and for each image, the expected distortion-free dot positions (in x, y and z-directions) can be determined and compared to their positions in the image(s). In some embodiments, a geometric transformation is performed that moves (or otherwise alters the position of) the centers of the imaged dots to their expected positions. These expected positions can then be stored and use, e.g., in the higher resolution scanning step. The transformation values can be stored and retrieved prior to the higher resolution scanning step. Then, for each three-dimensional object sample to be imaged, a set of images of the object is acquired using the same detector set-up that is used to obtain the image(s) of the pattern of dots. The stored geometric transformation that is determined using the pattern of dots is applied to the image(s) of the sample to perform the correction/registration, and the corrected image(s) is/are stored and/or displayed.

In certain embodiments, an exact dot pattern used in the image correction process may vary. For example, a set of one or more images of a quasiperiodic grid pattern using a similar camera or similar set of cameras (or other detectors) as used for obtaining images of a three-dimensional object is obtained. The identical camera adjustment(s) and identical relative positioning of the fields of view can be used in obtaining the images of the grid pattern as are used in obtaining images of the three-dimensional object. When obtaining images of the sample and images of the grid pattern, it is assumed that images obtained using the same camera (or other detector) are made under similar (or substantially the same) optical conditions and/or relative alignment of different cameras, and it is assumed that relative displacements of the image fields are kept constant.

In some embodiments, the true geometry of the acquired images can be reconstructed using known properties of the quasiperiodic grid. This step eliminates geometric distortions induced by the optical system. In some embodiments, an approach involves using the local uniqueness of the imaged pattern to identify dots in the pattern and to determine their true positions from the known design of the grid pattern. In another approach, geometrical properties of the quasiperiodic grid can be used to derive the true geometry from known relative positioning constraints, e.g., quantized nearest neighbor positions and quantized angles, used in creating the pattern. From the knowledge of the true geometry, transformations are derived and can be applied that eliminate geometric distortions.

In certain configurations where images from different cameras are obtained, the images from different cameras can be correlated with each other using known unique positions of the imaged dots identified in the pattern. The relative positions of image fields are derived if unique positions of the imaged dots are known, or the relative positions of image fields may be determined if the fields capture partially overlapping areas. In some embodiments, the geometric transformations derived in the steps described herein may be applied to images of the three-dimensional objects obtained using the same detector (e.g., the same camera(s)) and the same optical arrangement as used in obtaining images of the quasiperiodic grid pattern. This image correction can be applied to only the pre-scan measurements, only the higher resolution scanning measurements or both. Application of image correction to the pre-scan measurements, which can correct the identified x-y coordinates and the identified z-height to account for abnormalities, may be particularly desirable to ensure the higher resolution scanning is initiated at the correct z-height and over the correct x-y planes for each three-dimensional object.

Without wishing to be bound by any one particular geometric pattern or shape, the use of a quasiperiodic lattice offers a number of benefits over the use of a periodic lattice. For example, errors of registration by a grid period can be avoided by use of a quasiperiodic lattice, while at the same time average grid density can be preserved and defined (e.g., quantized) geometric characteristics such as nearest neighbor length and angles can be preserved.

In some embodiments, the pattern used in the image correction can be a grid comprising a pentagonal symmetry. One way of obtaining such a lattice is to provide a Penrose tiling and associate structural elements of the pattern (dots) with the tile positions or the vertices. In one approach, the pattern starts with a pentagon subdivided into two kinds of triangles, which are hierarchically subdivided in Golden Section which results in new triangles of the same shape. The dots of decreasing sizes are associated at newly created vertices. In some embodiments, a non-periodic grid (e.g., a grid that is not replicated by translation of its points) ca be used to avoid false matching of dots. For example, the procedure for adjusting one or more images of a sample to correct geometric distortions and/or to properly align the one or more images desirably uses a unique location that can be determined for a given dot. In some examples, it can be desirable that the dots of the pattern uniformly populate the field of interest so that the entire field can be corrected. A hierarchy of dot sizes can be used simultaneously at different scales (e.g., different resolutions/magnifications). Certain configurations of a quasiperiodic grid pattern can provide some or all of these desired properties mentioned above, among others. One suitable pattern of a quasiperiodic grid is similar to Penrose tiling. For example, a Golden Section triangulation of a pentagon can produce a pattern with the desired properties. At each step of grid refinement, the size of the dot located at the vertices can be reduced.

In certain embodiments, the pattern can be slightly rotated to avoid parallel alignments with image borders (and to avoid any resulting distortions). For example, the image may be rotated by from 1 to 30 degrees (e.g., by 9 degrees). In some embodiments, the image may be rotated by 1-5 degrees, 3-10 degrees, 5-15 degrees, 10-15 degrees, 10-20 degrees, 15-25 degrees, 25-30 degrees. In some embodiments, the image may be rotated by any suitable degree. The exact rotational dimension of the image can vary as desired.

In some examples, an image analysis function can be used to determine a desired plane of focus in the pre-scan step, which can be tailored to the three-dimensional object being measured. For example, an image analysis function can comprise segmentation of the pre-scan images and subsequent identification and quantitation of the x-y coordinates and the z-heights. These values can be corrected as described herein prior to initiation of the higher resolution scanning steps. In some examples, the image analysis function can comprise the determination of features like spatial texture, morphology, bioactivity, etc. as required by the biological application. This can be realized either by providing a selection of predefined image analysis functions to the user or by enabling the users to define or program their own custom image analysis function.

In certain configurations, image correction can generally be performed by acquiring a set of images of the pattern. For each image, the expected distortion free dot positions can be determined. A geometric transformation can then be calculated to alter the dot centers to expected positions. The transformation can then be stored. For each three-dimensional object being scanned, a set of images can be acquired and for each image the geometric transformation can be applied and the resulting corrected images can be stored and used to construct a corrected image of each three-dimensional object.

In other configuration, determining an expected distortion-free dot positions can be achieved by geometric reconstruction. For example, for each image in a pattern image set, the process can involve segmenting the image to determine all dots, calculating the dot centers, and selecting an arbitrary dot in the middle of the image and assume its position to be precise. While not necessarily true in all instances, nearest neighbor dots are generally expected at 36 degree angles and at distances that are having ratios 1, $\varphi$, $\varphi^2$, where $\varphi$ is the Golden Section $\varphi=1.618$. Based on this geometric relationship, expected positions can be assigned to each of the neighboring dots. For each neighboring dot identified in the prior step, an expected position can be assigned until there or no more dots in the image. Dots that are at a relative position to its nearest neighbor that exceed a given tolerance from expected positions can be discarded. In some examples, a common reference dot is selected (e.g., arbitrarily) across all pattern images to have the same expected position and an appropriate shift is applied to the expected dot centers. The angle at which the nearest neighbor is expected to be positioned is selected (e.g., arbitrarily), and the expected coordinates of the dots are rotated accordingly. The base length at which the nearest neighbor is expected to be positioned is selected (e.g., arbitrarily), and the expected coordinates of the dots are scaled accordingly. After these steps, the expected positions of all correctly identified dots should coincide. The values for the actual and expected dot position can then be stored. In some embodiments, an alternative approach may be to identify the pattern image position in the expected dot position table used for pattern production. The expected dot positions can be translated to image coordinates by similar steps as descried herein.

In other embodiments, geometric transformation can be calculated taking the dot centers to expected positions. In some embodiments, the geometric transformation can be performed as follows: for each table of expected and actual positions corresponding to a pattern image: (1) calculate the shifts required for each individual dot to move it to the expected position. The set of shifts, together with the positions they are applied to, is referred to herein as a shift field; (2) Extend the shift field to the full image by approximating the determined shift field by a continuous model (e.g., second order polynomials). It can be achieved by least squares fitting or other suitable approximations; and (3) Store the polynomial coefficients for use on sample images. Then, in some embodiments, the geometric transformations can be applied on the three-dimensional object images, for example, as follows: For each image in the set of a sample: (A) From the found polynomials, calculate shifts corresponding to each pixel of the image, and (B) Apply the shifts to image raster data.

It will be recognized by the person having ordinary skill in the art, given the benefit of this disclosure, that other image correction processes and systems can also be used to provide image correction (or data correction) for the various images obtained during the pre-scan and higher power scan measurements. For example, different kinds of artificial objects or printed patterns could be used for image correction and/or registration, e.g., a square pattern drawn by lines, an uneven line pattern, a random collection dots, a sparse sample of randomly located beads or quantum dots etc. An approximate microscope table location can be determined by using an intrinsic positioning system. Thereafter, one can correct further by either identifying certain landmarks of the calibration pattern or objects, or alternatively correlating the portions of different images from different cameras, filter settings, different objectives and other imaging conditions with each other. From such data parameters, other geometric image registration models and corrections processes can be derived and used. While not required, a pentapattern can serve as a robust and intrinsically simple method to achieve absolute and exact positioning of the full image field and individual portions of the image.

Figure 15:
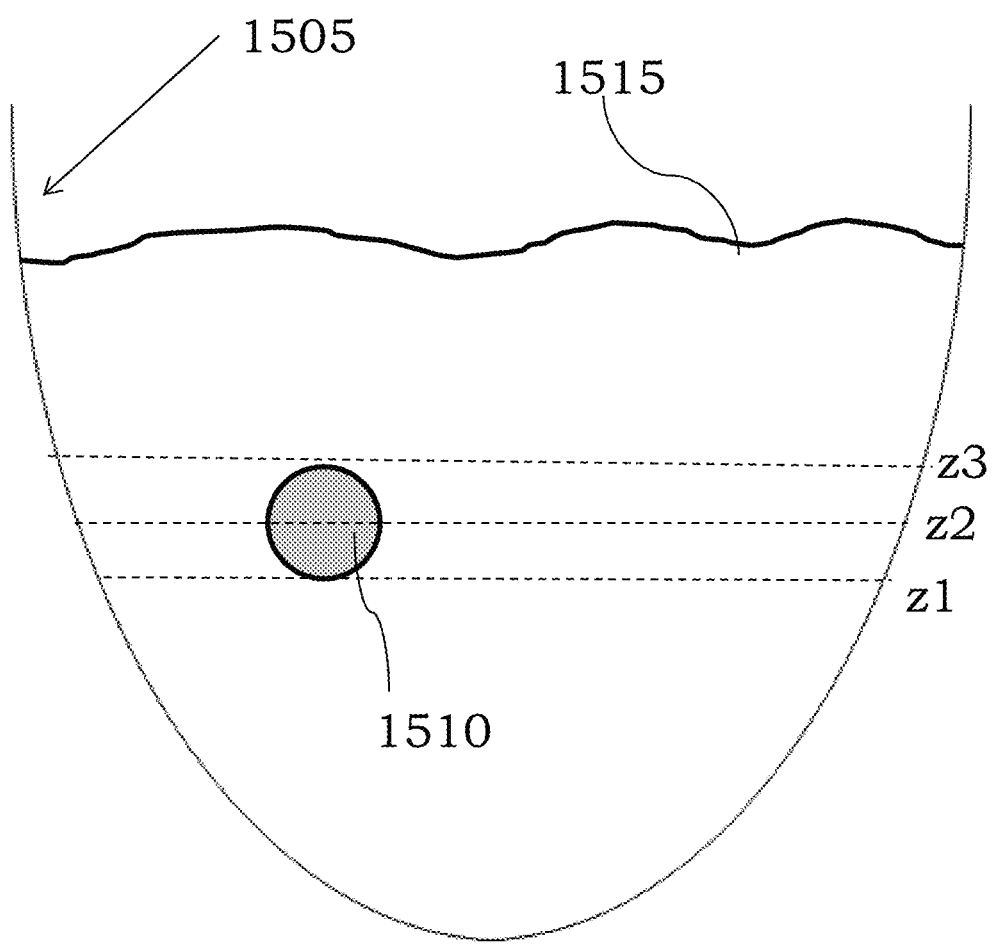
FIG. 15 is an illustration showing determination of a z-width for an object in a matrix, in accordance with some examples.

In certain embodiments, the pre-scan measurements described herein can be used to determine a z-width for each three-dimensional object. The z-width generally is the z-dimension distance occupied by the three-dimensional object, e.g., the z-distance from top to bottom of the object. The z-width need not be exact and can be estimated to select a scan speed, scan resolution, data volumes, etc., that can be used or obtained in the higher power scan. Referring to FIG. 15, a simplified illustration showing three z-stack pre-scans z1, z2 and z3 is shown. While the well 1505 is shown as comprising a round bottom, flat bottoms or other shapes can also be used in determining z-widths of various objects. As noted herein, the z-dimension distance from the bottom of the well 1505 to the z-plane z1 can be considered the z-height. The z-width of the object 1510 in the matrix 1515 is the z-dimension distance between z1 and z3. This distance can be determined or estimated and used to select scan resolution and/or scan speed for the higher power scan. For example, many high power scans may use 1 micron or less z-distance separation between different scans. While this scanning resolution can provide high resolution images, the overall time to perform the scan of the object 1510 may be too slow to capture certain metabolic events or cellular changes. To capture these events at a lower resolution, the z-width can be used by the system to select a particular z-dimension scan spacing and/or overall scan time to permit viewing of desired physiological or chemical changes that the object 1510 undergoes. For example, instead of using a 1 micron z-distance spacing at the higher power scan, the z-distance spacing may be altered to 2 or 3 microns to provide fewer images but permit monitoring of the cellular activity by providing an overall faster scan time. Further, the z-width can also be used to select an upper limit for the data volume. For example, based on the z-width and desired data volume, the z-distance scan spacing can be selected to provide no more than the desired data volume that will be obtained from the higher power pre-scan. The z-width can be determined in the same pre-scan used to determine the z-height or may be determined in a separate pre-scan.

In certain examples and as noted above, the systems and methods described herein may comprise or use a processor to control some aspects of the systems or processes. In particular, a processor may receive and store the emission signals as an image, apply an image correction as desired and then display the corrected image on a display to permit an end user to view the three-dimensional object. The processor can be part of the system or instrument or present in an associated device, e.g., computer, laptop, mobile device, etc. used with the instrument. For example, the processor can be used to control the position of the sample, detector parameters, image correction and other operations performed by the system. Such processes may be performed automatically by the processor without the need for user intervention or a user may enter parameters through user interface. For example, the processor can use signal intensities and fragment peaks along with one or more calibration curves to determine an identity and how much of a particular lumiphore is present in each individual cell. The processor can also color code different labels present in the cell to provide easier visualization of different cellular components. In certain configurations, the processor may be present in one or more computer systems and/or common hardware circuitry including, for example, a microprocessor and/or suitable software for operating the system, e.g., to control the sample introduction device, ionization source, mass analyzer, detector, etc. In some examples, the detector itself may comprise its own respective processor, operating system and other features to permit detection of various emission signals. The processor can be integral to the systems or may be present on one or more accessory boards, printed circuit boards or computers electrically coupled to the components of the system. The processor is typically electrically coupled to one or more memory units to receive data from the other components of the system and permit adjustment of the various system parameters as needed or desired. The processor may be part of a general-purpose computer such as those based on Unix, Intel PENTIUM-type processor, Motorola PowerPC, Sun UltraSPARC, Hewlett-Packard PA-RISC processors, or any other type of processor. One or more of any type computer system may be used according to various embodiments of the technology. Further, the system may be connected to a single computer or may be distributed among a plurality of computers attached by a communications network. It should be appreciated that other functions, including network communication, can be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs, calibration curves, chemical or physical properties, and data values during operation of the systems. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the system. For example, computer control can be implemented to control pre-scan speed, scan speed, which objective is used for imaging, etc. The processor typically is electrically coupled to a power source which can, for example, be a direct current source, an alternating current source, a battery, a fuel cell or other power sources or combinations of power sources. The power source can be shared by the other components of the system. The system may also include one or more input devices, for example, a keyboard, mouse, trackball, microphone, touch screen, manual switch (e.g., override switch) and one or more output devices, for example, a printing device, display screen, speaker. In addition, the system may contain one or more communication interfaces that connect the computer system to a communication network (in addition or as an alternative to the interconnection device). The system may also include suitable circuitry to convert signals received from the various electrical devices present in the systems. Such circuitry can be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth, Wi-Fi, Near Field Communication or other wireless protocols and/or interfaces.

In certain embodiments, the storage system used in the systems described herein typically includes a computer readable and writeable nonvolatile recording medium in which codes of software can be stored that can be used by a program to be executed by the processor or information stored on or in the medium to be processed by the program. The medium may, for example, be a hard disk, solid state drive or flash memory. The program or instructions to be executed by the processor may be located locally or remotely and can be retrieved by the processor by way of an interconnection mechanism, a communication network or other means as desired. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The system may comprise a general-purpose computer system that is programmable using a high-level computer programming language. The systems may be also implemented using specially programmed, special purpose hardware. Various data values corresponding to the different x-y planes and z-heights or z-dimension values from the pre-scan can also be stored in the storage system and retrieved and used in the scan measurements for each three-dimensional object to be scanned.

In the systems, the processor is typically a commercially available processor such as the well-known Pentium class processors available from the Intel Corporation. Many other processors are also commercially available. Such a processor usually executes an operating system which may be, for example, the Windows 95, Windows 98, Windows NT, Windows 2000 (Windows ME), Windows XP, Windows Vista, Windows 7, Windows 8 or Windows 10 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system. Further, the processor can be designed as a quantum processor designed to perform one or more functions using one or more qubits.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. Various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the systems may comprise a remote interface such as those present on a mobile device, tablet, laptop computer, wearable device or other portable devices which can communicate through a wired or wireless interface and permit operation of the systems remotely as desired.

In certain examples, the processor may also comprise or have access to a database of information about fluorophores, biological cells and other common information. For example, the database may store excitation and emission wavelengths for different fluorophores, and the processor can retrieve and use that information based on user selection of the particular fluorophores being used in the experiment. The instructions stored in the memory can execute a software module or control routine for the system, which in effect can provide a controllable model of the system. The processor can use information accessed from the database together with one or software modules executed in the processor to determine control parameters or values for different components of the systems, e.g., different detector values, different scan rates, general z-boundaries for particular cells, etc. Using input interfaces to receive control instructions and output interfaces linked to different system components in the system, the processor can perform active control over the system. For example, the processor can control the detector(s), optical elements such as the confocal units, mirrors, dichroic sliders, etc., the objectives, sample holder position and other components of the system.

In certain embodiments, the exact three-dimensional objects that can be imaged using the methods and systems described herein can vary. The objects can be non-living objects or living objects or components of the living objects, e.g., organelles such as mitochondria. Entire cells, tissues, organs, and organisms can be imaged as desired.

In some embodiments, biological cells are imaged using the methods and systems described herein. In some examples, the cells may be prokaryotic cells. For example, drug discovery methods using potential antibiotics may be implemented to determine how much of a particular antibiotic is taken up by the individual bacterial cells and to determine the phenotype of the cells, e.g., alive or dead, to assess the efficacy of a particular antibiotic candidate. Where the cell is a bacterial cell, the bacterial cell may be a cell from one or more of the Acidobacteria, Actinobacteria, Aquificae, Armatimonadetes, Bacteroidetes, Caldiserica, Chlamydiae, Chlorobi, Chloroflexi, Chrysiogenetes, Cyanobacteria, Deferribacteres, Deinococcus-Thermus, Dictyoglomi, Elusimicrobia, Fibrobacteres, Firmicutes, Fusobacteria, Gemmatimonadetes, Lentisphaerae, Nitrospirae, Planctomycetes, Proteobacteria, Spirochaetes, Synergistetes, Tenericutes, Thermodesulfobacteria, Thermotogae or Verrucomicrobia phyla. Illustrative classes, orders and/or families of bacterial cells that can be analyzed include, but are not limited to, those from Acidobacteria, Blastocatellia, Holophagae, Rubrobacteria, Thermoleophilia, Coriobacteriia, Acidimicrobiia, Nitriliruptoria, Actinobacteria, Aquificales, Aquificaceae, Hydrogenothermaceae, Desulfurobacteriales, Desulfurobacteriaceae, Thermosulfidibacter, Fimbriimonadia, Armatimonadia, Chthonomonadetes, Rhodothermia, Rhodothermales, Balneolia, Balneolales, Cytophagia, Cytophagales, Sphingobacteria, Sphingobacteriales, Chitinophagia, Chitinophagales, Bacteroidia, Bacteroidales, Flavobacteriia, Flavobacteriales, Caldisericaceae, Chlamydiales, Chlamydiaceae, Candidatus, Clavichlamydiaceae, Parachlamydiales, Criblamydiaceae, Parachlamydiaceae, Simkaniaceae, Waddliaceae, Candidatus Piscichlamydia, Candidatus Actinochlamydiaceae, Candidatus Parilichlamydiaceae, Candidatus Rhabdochlamydiaceae, Ignavibacteria, Ignavibacteriales, Ignavibacteriaceae, Ignavibacterium, Melioribacter, Chlorobea, Chlorobiales, Chlorobiaceae, Ancalochloris, Chlorobaculum, Chlorobium, Chloroherpeton, Clathrochloris, Pelodictyon, Prosthecochloris, Thermoflexia, Dehalococcoidia, Anaerolineae, Ardenticatenia, Caldilineae, Ktedonobacteria, Thermomicrobia, Chloroflexia, Chrysiogenetes, Chrysiogenales, Chrysiogenaceae, Chroococcales, Chroococcidiopsidales, Gloeobacterales, Nostocales, Oscillatoriales, Pleurocapsales, Spirulinales, Synechococcales, Incertae sedis, Deferribacterale, Deferribacteraceae, Deinococcales, Deinococcaceae, Trueperaceae, Thermales, Thermaceae, Dictyoglomales, Dictyoglomaceae, Elusimicrobia, Endomicrobia, Blastocatellia, Chitinispirillia, Chitinivibrionia, Fibrobacteria, Bacilli, Bacillales, Lactobacillales, Clostridia, Clostridiales, Halanaerobiales, Natranaerobiales, Thermoanaerobacterales, Erysipelotrichia, Erysipelotrichales, Negativicutes, Selenomonadales, Thermolithobacteria, Fusobacteriia, Fusobacteriales, Leptotrichiaceae, Sebaldella, Sneathia, Streptobacillus, Leptotrichia, Fusobacteriaceae, Cetobacterium, Fusobacterium, Ilyobacter, Propionigenium, Psychrilyobacter, Longimicrobia, Gemmatimonadetes, Oligosphaeria, Lentisphaeria, Nitrospiria, Nitrospirales, Nitrospiraceae, Phycisphaerae, Planctomycetacia, Alphaproteobacteria, Betaproteobacteria, Hydrogenophilalia, Gammaproteobacteria, Acidithiobacillia, Deltaproteobacteria, Epsilonproteobacteria and Oligoflexia, Spirochaetia, Brachyspirales, Brachyspiraceae, Brevinematales, Brevinemataceae, Leptospirales Leptospiraceae, Spirochaetales, Borreliaceae, Spirochaetaceae, Sarpulinaceae, Synergistia, Synergistales, Synergistaceae, Mollicutes, Thermodesulfobacteria, Thermodesulfobacteriales, Thermodesulfobacteriaceae, Thermotogae, Kosmotogales, Kosmotogaceae, Mesoaciditogales, Mesoaciditogaceae, Petrotogales, Petrotogaceae, Thermotogales, Thermotogaceae, Fervidobacteriaceae, Candidatus Epixenosoma, Lentimonas, Methyloacida, Methylacidimicrobium, Methylacidiphilales, Spartobacteria, Opitutae or Verrucomicrobiae. Various genera and species within these classes, orders and families can be selected for analysis using the methods and systems described herein.

In other embodiments, the cells may be eukaryotic cells including both "normal" eukaryotic cells which are present in properly functioning tissue and "aberrant" eukaryotic cells which are present in a cancerous or abnormal condition. In addition, the eukaryotic cells may originate from protozoa, fungus, animals, plants, algae or other eukaryotic cells. The methods and systems may be particularly desirable for use in investigating treatment of abnormal cellular metabolism, fungal infections, efficacy of cancer treatment, efficacy of pesticide treatment, tissue repair status and other states that can be monitored based on how much of a particular material is present within a cell or transported into a cell.

Where the cell is a fungal cell, the fungal cell may be from one or more of Blastocladiomycota, Chytridiomycota, Glomeromycota, Microsporidia, Neocallimastigomycota, Dikarya (inc. Deuteromycota), Ascomycota, Pezizomycotina, Saccharomycotina, Taphrinomycotina, Basidiomycota Agaricomycotina, Pucciniomycotina, Ustilaginomycotina, Entomophthoromycotina, Kickxellomycotina, Mucoromycotina, or Zoopagomycotina phyla and subphyla. Illustrative classes, orders and/or families of fungal cells that can be analyzed include, but are not limited to, those from Blastocladiomycetes, Blastocladiales Blastocladiaceae, Catenariaceae, Coelomomycetaceae, Physodermataceae, Sorochytriaceae, Chytridiomycetes, Chytridiales, Cladochytriales, Rhizophydiales, Polychytriales, Spizellomycetales, Rhizophlyctidales, Lobulomycetales, Gromochytriales, Mesochytriales, Synchytriales, Polyphagales, Monoblepharidomycetes, Monoblepharidales, Harpochytriales, Hyaloraphidiomycetes, Hyaloraphidiales, Glomeromycetes, Archaeosporales, Diversisporales, Glomerales, Paraglomerales, Nematophytales, Metchnikovellea, Metchnikovellida Amphiacanthidae, Metchnikovellidae, Microsporea, Cougourdellidae, Facilisporidae, Heterovesiculidae, Myosporidae, Nadelsporidae, Neonosemoidiidae, Ordosporidae, Pseudonosematidae, Telomyxidae, Toxoglugeidae, Tubulinosematidae, Haplophasea, Chytridiopsida, Chytridiopsidae, Buxtehudiidae, Enterocytozoonidae, Burkeidae, Hesseidae, Glugeida, Glugeidae, Gurleyidae, Encephalitozoonidae, Abelsporidae, Tuzetiidae, Microfilidae, Unikaryonidae, Dihaplophasea, Meiodihaplophasida, Thelohanioidea, Thelohaniidae, Duboscqiidae, Janacekiidae, Pereziidae, Striatosporidae, Cylindrosporidae, Burenelloidea, Burenellidae, Amblyosporoidea, Amblyosporidae, Dissociodihaplophasida, Nosematoidea, Nosematidae, Ichthyosporidiidae, Caudosporidae, Pseudopleistophoridae, Mrazekiidae Culicosporoidea, Culicosporidae, Culicosporellidae, Golbergiidae, Spragueidae Ovavesiculoidea, Ovavesiculidae, Tetramicridae, Rudimicrospora, Minisporea, Minisporida, Metchnikovellea, Metchnikovellida, Polaroplasta, Pleistophoridea, Pleistophorida, Disporea, Unikaryotia, Diplokaryotia, Neocallimastigomycetes, Neocallimastigales, Neocallimastigaceae, Pezizomycotina, Arthoniomycetes, Coniocybomycetes, Dothideomycetes, Eurotiomycetes, Geoglossomycetes, Laboulbeniomycetes, Lecanoromycetes, Leotiomycetes, Lichinomycetes, Orbiliomycetes, Pezizomycetes, Sordariomycetes, Xylonomycetes Lahmiales, Itchiclahmadion, Triblidiales, Saccharomycotina, Saccharomycetes, Taphrinomycotina Archaeorhizomyces, Neolectomycetes, Pneumocystidomycetes, Schizosaccharomycetes, Taphrinomycetes, Arthoniomycetes, Coniocybomycetes, Dothideomycetes, Eurotiomycetes, Geoglossomycetes, Laboulbeniomycetes, Lecanoromycetes, Leotiomycetes, Lichinomycetes, Orbiliomycetes, Pezizomycetes, Sordariomycetes, Xylonomycetes, Lahmiales, Medeolariales, Triblidiales, Saccharomycetales, Ascoideaceae, Cephaloascaceae, Debaryomycetaceae, Dipodascaceae, Endomycetaceae, Lipomycetaceae, Metschnikowiaceae, Phaffomycetaceae, Pichiaceae, Saccharomycetaceae, Saccharomycodaceae, Saccharomycopsidaceae, Trichomonascaceae, Archaeorhizomycetes, Neolectomycetes, Pneumocystidomycetes, Schizosaccharomycetes, Taphrinomycetes, Agaricomycotina, Pucciniomycotina, Ustilaginomycotina, Wallemiomycetes, Tremellomycetes, Dacrymycetes, Agaricomycetes, Agaricostilbomycetes, Atractiellomycetes, Classiculomycetes, Cryptomycocolacomycetes, Cystobasidiomycetes, Microbotryomycetes, Mixiomycetes, Pucciniomycetes, Tritirachiomycetes, Exobasidiomycetes, Ceraceosorales, Doassansiales, Entylomatales, Exobasidiales, Georgefischeriales, Microstromatales, Tilletiales, Ustilaginomycetes, Urocystales, Ustilaginales, Malasseziomycetes, Malassezioales, Moniliellomycetes, Moniliellales, Basidiobolomycetes, Neozygitomycetes, Entomophthoromycetes, Asellariales, Dimargaritales, Harpellales, Kickxellales, Mortierellomycetes, Mortierellales, Mucoromycetes, Mucorales, or Endogonales. Various genera and species within these classes, orders and families can be selected for analysis using the methods and systems described herein.

Where the cell is a plant cell, the plant cell may be from one or more of Nematophytes, Chlorophyta, Palmophyllales, Prasinophyceae, Nephroselmidophyceae, Pseudoscourfieldiales, Pyramimonadophyceae, Mamiellophyceae, Scourfieldiales, Pedinophyceae, Chlorodendrophyceae, Trebouxiophyceae, Ulvophyceae, Chlorophyceae, Streptophyta, Chlorokybophyta, Mesostigmatophyta, Klebsormidiophyta, Charophyta, Chaetosphaeridiales, Coleochaetophyta, Zygnematophyta, or Embryophyta phyla and subphyla. Illustrative classes, orders, families and genera of plant cells that can be analyzed include, but are not limited to, those from Nematothallus, Cosmochlaina, Nematophytaceae, Nematoplexus, Nematasketum, Prototaxites, Ulvophyceae, Trebouxiophyceae, Chlorophyceae, Chlorodendrophyceae, Mamiellophyceae, Nephroselmidophyceae, Palmophyllales, Pedinophyceae, Prasinophyceae, Pseudoscourfieldiales, Pyramimonadophyceae, Scourfieldiales, Palmoclathrus, Palmophyllum, Verdigellas, Prasinococcales, Prasinophyceae incertae sedis, Pseudoscourfieldiales, Pyramimonadales, Nephoselmis, Pycnococcaceae, Scourfieldiaceae, Pedinomonas, Resultor, Marsupiomonas, Chlorochtridion tuberculatum, Chlorellales, Prasiolales, Trebouxiales, Bryopsidales, Cladophorales, Dasycladales, Oltmannsiellopsidales, Scotinosphaerales, Trentepohliales, Ulotrichales, Ulvales, Chaetopeltidales, Chaetophorales, Chlamydomonadales, Chlorococcales, Chlorocystidales, Microsporales, Oedogoniales, Phaeophilales, Sphaeropleales, Tetrasporales, Chlorokybus, Mesostigmatophyceae, Entransia, Hormidiella, Interfilum, Klebsormidium, Mesostigmatophyceae, Klebsormidiophyceae, Zygnematophyceae, ZygnematalesDesmidiales, Charophyceae, Charales, Chlorokybophyceae, Coleochaetales, Polychaetophora, Chaetosphaeridium, Coleochaetophyceae, Zygnematales, Desmidiales, Bryophytes, Marchantiophyta, Bryophyta, Anthocerotophyta, Horneophytopsida, Tracheophytes, Rhyniophyta, Zosterophyllophyta, Lycopodiophyta, Trimerophytophyta, Pteridophyta, Spermatophytes, Pteridospermatophyta, Pinophyta, Cycadophyta, Ginkgophyta, Gnetophyta, or Magnoliophyta. Various species within these classes, orders, families and genera can be selected for analysis using the methods and systems described herein.

In some examples, one or more structures within a plant organelle can be imaged using the methods and systems described herein. For example, a plant organelle can include, but is not limited to, plant cell nucleus, nuclear membrane, a nuclear membrane, endoplasmic reticulum, ribosome, mitochondria, vacuole, chloroplast, cell membrane or cell wall. The plant organelle may be separated from the other material of the cell so the metabolism and/or function of the isolated plant organelle can be monitored during the imaging.

Where the cell is an animal cell, the animal cell may be an embryonic stem cell, an adult stem cell, a tissue-specific stem cell, a mesenchymal stem cell, an induced pluripotent stem cells, an epithelial tissue cell, a connective tissue cell, a muscle tissue cell, or a nervous tissue cell. The animal cell can be derived from ectoderm, endoderm or mesoderm. Ectoderm derived cells include, but are not limited to, skin cells, anterior pituitary cells, peripheral nervous system cells, neuroendocrine cells, teeth, eye cells, central nervous system cells, ependymal cells and pineal gland cells. Endoderm derived cells include, but are not limited to, respiratory cells, stomach cells, intestine cells, liver cells, gallbladder cells, exocrine pancreas cells, Islets of Langerhans cell, thyroid gland cells and urothelial cells. Mesoderm derived cells include, but are not limited to, osteochondroprogenitor cells, myofibroblast, angioblasts, stromal cells, Macula densa, cells, interstitial cells, telocytes, podocytes, Sertoli cells, Leydig cells, Granulosa cells, Peg cells, germ cells, hematopoietic stem cells, lymphoid cells, myeloid cells, endothelial progenitor cells, endothelial colony forming cells, endothelial stem cell, angioblast/mesoangioblast cells, pericyte cells and mural cells.

In some examples, the animal cell is typically a mammalian cell such as, for example, a human cell, a canine cell, an equine cell, a feline cell, a bovine cell, and other animal cells in one or more of the following mammalian orders Artiodactyla, Carnivora, Cetacea, Chiroptera, Dermoptera, Edentata, Hyracoidae, Insectivora, Lagomorpha, Morasupilia, Monotremata, Perissodactyla, Pholidata, Pinnipedia, Primates, Proboscidea, Rodentia, Sirenia, and Turbulidentata. In some examples, the mammalian cell may be from a Prosimian family or a Simian family. In other examples, the mammalian cell may be from one or more Adapiformes, Lemuriformes, Omomyiformes and Tarsiiformes. In additional examples, the mammalian cell may be from one or more Haplorhini's or Simiiformes. In some examples, the mammalian cell may be from the family Hominidae or the genus Homo, e.g., human cells.

In some instances, cancerous animal cells may also be imaged using the methods and systems described herein to assess efficacy of treatment with a particular agent or material. While the exact agent may vary with the specific type of cancer to be treated, the agent desirably causes death of the cancer cells in some manner Illustrative types of cancer whose cells can be imaged include, but are not limited to, Acute Lymphoblastic Leukemia (ALL), Acute Myeloid Leukemia (AML), Adrenocortical Carcinoma, AIDS-Related Cancers Kaposi Sarcoma (Soft Tissue Sarcoma), AIDS-Related Lymphoma (Lymphoma), Primary CNS Lymphoma (Lymphoma), Anal Cancer, Appendix Cancer, Astrocytomas, Atypical Teratoid/Rhabdoid Tumors, Basal Cell Carcinoma of the Skin, Bile Duct Cancer, Bladder Cancer, Bone Cancer, Brain Tumors, Breast Cancer, Bronchial Tumors, Burkitt Lymphoma, Carcinoid Tumor, Carcinoma of Unknown Primary, Cardiac (Heart) Tumors, Atypical Teratoid/Rhabdoid Tumor, Embryonal Tumors, Germ Cell Tumor, Primary CNS Lymphoma, Cervical Cancer, Childhood Cancers, Cholangiocarcinoma, Chordoma, Chronic Lymphocytic Leukemia (CLL), Chronic Myelogenous Leukemia (CML), Chronic Myeloproliferative Neoplasms, Colorectal Cancer, Craniopharyngioma, Cutaneous T-Cell Lymphoma, ductal carcinoma, Endometrial Cancer, Uterine Cancer), Ependymoma, Esophageal Cancer, Esthesioneuroblastoma, Ewing Sarcoma, Extracranial Germ Cell Tumor, Extragonadal Germ Cell Tumor, Eye Cancer, Intraocular Melanoma, Retinoblastoma, fallopian tube cancer, fibrous histocytoma of bone, gallbladder cancer, stomach cancer, Gastrointestinal Carcinoid Tumor, Gastrointestinal Stromal Tumors, Germ Cell Tumors, Childhood Extracranial Germ Cell Tumors, Extragonadal Germ Cell Tumors, Ovarian Germ Cell Tumors, Testicular Cancer, Gestational Trophoblastic Disease, Hairy Cell Leukemia, Head and Neck Cancer, Hepatocellular (Liver) Cancer, Histiocytosis, Hodgkin Lymphoma, Hypopharyngeal Cancer, Head and Neck Cancer, Intraocular melanoma, islet cell tumors, Kaposi sarcoma, renal cell cancer, Langerhans Cell Histiocytosis, Laryngeal Cancer, Leukemia, Lip and Oral Cavity Cancer, Liver Cancer, Lymphoma, Male Breast Cancer, Malignant Fibrous Histiocytoma of Bone and Osteosarcoma, Melanoma Childhood Melanoma, Merkel Cell Carcinoma, Mesothelioma, Metastatic Cancer, Metastatic Squamous Neck Cancer with Occult Primary (Head and Neck Cancer), Midline Tract Carcinoma With NUT Gene Changes, Mouth Cancer (Head and Neck Cancer), Multiple Endocrine Neoplasia Syndromes, Multiple Myeloma/Plasma Cell Neoplasms, Mycosis Fungoides (Lymphoma), Myelodysplastic Syndromes, Myelodysplastic/Myeloproliferative Neoplasms, Myelogenous Leukemia, Chronic (CML), Myeloid Leukemia, Acute (AML), Myeloproliferative Neoplasms, Nasal Cavity and Paranasal Sinus Cancer (Head and Neck Cancer), Nasopharyngeal Cancer (Head and Neck Cancer), Neuroblastoma, Non-Hodgkin Lymphoma, Non-Small Cell Lung Cancer, Oral Cancer, Lip and Oral Cavity Cancer and Oropharyngeal Cancer, Osteosarcoma and Malignant Fibrous Histiocytoma of Bone, Ovarian Cancer, Pancreatic Cancer Pancreatic Neuroendocrine Tumors (Islet Cell Tumors), Papillomatosis, Paraganglioma Paranasal Sinus and Nasal Cavity Cancer, Parathyroid Cancer, Penile Cancer, Pharyngeal Cancer (Head and Neck Cancer), Pheochromocytoma, Pituitary Tumor, Plasma Cell Neoplasm/Multiple Myeloma, Pleuropulmonary Blastoma, Primary Central Nervous System (CNS) Lymphoma, Primary Peritoneal Cancer, Prostate Cancer, Rectal Cancer, Recurrent Cancers, Renal Cell Cancer, Retinoblatoma, Rhabdomyosarcoma, Salivary Gland Cancer, Childhood Rhabdomyosarcoma, Childhood Vascular Tumors, Ewing Sarcoma (Bone Cancer), Kaposi Sarcoma (Soft Tissue Sarcoma), Osteosarcoma (Bone Cancer), Uterine Sarcoma, Sézary Syndrome (Lymphoma), Skin Cancer, Small Cell Lung Cancer, Small Intestine Cancer, Soft Tissue Sarcoma, Squamous Cell Carcinoma of the Skin, Squamous Neck Cancer with Occult Primary, Metastatic (Head and Neck Cancer), Stomach (Gastric) Cancer, T-Cell Lymphoma, Testicular Cancer, Nasopharyngeal Cancer, Oropharyngeal Cancer, Hypopharyngeal Cancer, Thymoma and Thymic Carcinoma, Thyroid Cancer, Transitional Cell Cancer of the Renal Pelvis and Ureter, uretal and renal pelvis cancer, urethral cancer, uterine cancer, uterine sarcoma, vaginal cancer, vascular tumors, vulvar cancer, Wilms Tumor and other forms of cancer.

In some instances, an organelle of an animal cell can be isolated from other components of the animal cell and then the phenotype of the organelle and material content of the animal organelle can be determined using the imaging methods and systems described herein. The organelle phenotype (or a biological response of the organelle) can then be correlated to a particular material or component of the organelle if desired. For example, the isolated organelle can include, but is not limited to, cell nucleus, nuclear membrane, microtubules, microfilaments, endoplasmic reticulum, sarcoplasmic reticulum, ribosome, mitochondria, vacuole, lysosome, cell membrane or other organelles present in an animal cell.

In some examples, the methods and systems described herein can also be used to image viruses, which may be present within a cell or outside of a cell or both. For example, the efficacy of an anti-viral agent to bind to a virus protein coat may be assessed using the imaging methods and systems described herein. Where viruses are analyzed, the virus may be, for example, a double stranded DNA virus, a single stranded DNA virus, a double stranded RNA virus, a positive sense single stranded RNA virus, a negative sense single stranded RNA virus, a single stranded RNA-reverse transcribing virus (retrovirus) or a double stranded DNA reverse transcribing virus. Various specific viruses include, but are not limited to, Papovaviridae, Adenoviridae, Herpesviridae, Herpesvirales, Ascoviridae, Ampullaviridae, Asfarviridae, Baculoviridae, Fuselloviridae, Globuloviridae, Guttaviridae, Hytrosaviridae, Iridoviridae, Lipothrixviridae, Nimaviridae, Poxviridae, Tectiviridae, Corticoviridae, Sulfolobus, Caudovirales, Corticoviridae, Tectiviridaea, Ligamenvirales, Ampullaviridae, Bicaudaviridae, Clavaviridae, Fuselloviridae, Globuloviridae, Guttaviridae, Turriviridae, Ascovirus, Baculovirus, Hytrosaviridae, Iridoviridae, Polydnaviruses, Mimiviridae, Marseillevirus, Megavirus, Mavirus virophage, Sputnik virophage, Nimaviridae, Phycodnaviridae, pleolipoviruses, Plasmaviridae, Pandoraviridae, Dinodnavirus, Rhizidiovirus, Salterprovirus, Sphaerolipoviridae, Anelloviridae, Bidnaviridae, Circoviridae, Geminiviridae, Genomoviridae, Inoviridae, Microviridae, Nanoviridae, Parvoviridae, Spiraviridae, Amalgaviridae, Birnaviridae, Chrysoviridae, Cystoviridae, Endornaviridae, Hypoviridae, Megabirnaviridae, Partitiviridae, Picobirnaviridae, Quadriviridae, Reoviridae, Totiviridae, Nidovirales, Picornavirales, Tymovirales, Mononegavirales, Bornaviridae, Filoviridae, Mymonaviridae, Nyamiviridae, Paramyxoviridae, Pneumoviridae, Rhabdoviridae, Sunviridae, Anphevirus, Arlivirus, Chengtivirus, Crustavirus, Wastrivirus, Bunyavirales, Feraviridae, Fimoviridae, Hantaviridae, Jonviridae, Nairoviridae, Peribunyaviridae, Phasmaviridae, Phenuiviridae, Tospoviridae, Arenaviridae, Ophioviridae, Orthomyxoviridae, Deltavirus, Taastrup virus, Alpharetrovirus, Avian leukosis virus; Rous sarcoma virus, Betaretrovirus, Mouse mammary tumor virus, Gammaretrovirus, Murine leukemia virus, Feline leukemia virus, Bovine leukemia virus, Human T-lymphotropic virus, Epsilonretrovirus, Walleye dermal sarcoma virus, Lentivirus, Human immunodeficiency virus 1, Simian and Feline immunodeficiency viruses, Spumavirus, Simian foamy virus, Orthoretrovirinae, Spumaretrovirinae, Metaviridae, Pseudoviridae, Retroviridae, Hepadnaviridae, or Caulimoviridae. Various species within these classes, orders, families and genera can be selected for analysis using the methods and systems described herein.

In certain configurations, the imaging methods and systems may detect one or more labels present on an antibody that binds specifically to a site on the individual cell. The antibody is generally a polypeptide which comprises a plurality of amino acids coupled to each other through peptide bonds. An antibody may comprise an immunoglobin chain or fragment thereof, comprising at least one immunoglobulin variable domain sequence. The term antibody includes, for example, a monoclonal antibody (including a full length antibody which has an immunoglobulin Fc region), a polyclonal antibody and other polypeptides that can specifically bind to one or more sites on a cell. In one embodiment, an antibody molecule comprises a full length antibody, or a full length immunoglobin chain. In another embodiment, an antibody molecule comprises an antigen binding or functional fragment of a full length antibody, or a full length immunoglobulin chain. The amino acids of the antibody may be natural or synthetic, and includes both an amino functionality and an acid functionality and is capable of being included in a polymer of naturally-occurring amino acids. Exemplary amino acids include naturally-occurring amino acids; analogs, derivatives and congeners thereof; amino acid analogs having variant side chains; and all stereoisomers of any of any of the foregoing. Both the D- or L-optical isomers of amino acids and peptidomimetics can be used. The term antibody also includes intact molecules as well as functional fragments thereof. Constant regions of the antibodies can be altered, e.g., mutated, to modify the properties of the antibody (e.g., to increase or decrease one or more of: Fc receptor binding, antibody glycosylation, the number of cysteine residues, effector cell function, or complement function).

If desired, the antibody can be produced using a conservative amino acid residue substitution where an amino acid residue is replaced with an amino acid residue having a similar side chain Families of amino acid residues having similar side chains will be selected by the person of skill in the art, given the benefit of this disclosure. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), nonpolar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine). The exact length of the antibody may vary as desired. In some instances, synthetic polypeptides can be coupled to each other to form an antibody. The antibody may be linear or branched, it may comprise modified amino acids, and it may be interrupted by non-amino acids. The antibody may be modified, for example, with disulfide bond formation, glycosylation, lipidation, acetylation, phosphorylation, or any other manipulation, such as conjugation with a label or labeling component. The polypeptide can be isolated from natural sources, can be a produced by recombinant techniques from a eukaryotic or prokaryotic host, or can be a product of synthetic procedures.

The antibody can be expressed in a host system by insertion of suitable nucleic acid sequences into the host organism. The terms "nucleic acid," "nucleic acid sequence," "nucleotide sequence," or "polynucleotide sequence," and "polynucleotide" are used interchangeably. These terms generally refer to a polymeric form of nucleotides of any length, either deoxyribonucleotides or ribonucleotides, or analogs thereof. The polynucleotide may be either single-stranded or double-stranded, and if single-stranded may be the coding strand or non-coding (antisense) strand. A polynucleotide may comprise modified nucleotides, such as methylated nucleotides and nucleotide analogs. The sequence of nucleotides may be interrupted by non-nucleotide components. A polynucleotide may be further modified after polymerization, such as by conjugation with a labeling component. The nucleic acid may be a recombinant polynucleotide, or a polynucleotide of genomic, cDNA, semisynthetic, or synthetic origin which either does not occur in nature or is linked to another polynucleotide in a non-natural arrangement.

The antibody can be isolated from a host or other expression or production organism. The term "isolated," as used herein, refers to material that is removed from its original or native environment (e.g., the natural environment if it is naturally occurring). For example, a naturally-occurring polynucleotide or polypeptide present in a living animal is not isolated, but the same polynucleotide or polypeptide, separated by human intervention from some or all of the co-existing materials in the natural system, is isolated. Such polynucleotides could be part of a vector and/or such polynucleotides or polypeptides could be part of a composition, and still be isolated in that such vector or composition is not part of the environment in which it is found in nature.

In one configuration, the antibody molecule binds to an animal cell, e.g., a mammalian cell. For example, the antibody molecule binds specifically to an epitope, e.g., linear or conformational epitope, (e.g., an epitope as described herein) on the mammalian cell. In some embodiments, the antibody molecule binds to one or more extracellular Ig-like domains present on the mammalian cell, e.g., the first, second, third or fourth extracellular Ig-like domain of a specific epitope.

In an embodiment, an antibody molecule is a monospecific antibody molecule and binds to a single epitope, e.g., a monospecific antibody molecule having a plurality of immunoglobulin variable domain sequences, each of which binds the same epitope.

In another embodiment, an antibody molecule is a multi-specific antibody molecule, e.g., it comprises a plurality of immunoglobulin variable domains sequences, wherein a first immunoglobulin variable domain sequence of the plurality has binding specificity for a first epitope and a second immunoglobulin variable domain sequence of the plurality has binding specificity for a second epitope. In an embodiment, the first and second epitopes are on the same antigen, e.g., the same protein (or subunit of a multimeric protein). In other instances, the first and second epitopes overlap. In an embodiment, the first and second epitopes do not overlap. In another embodiment, the first and second epitopes are on different antigens, e.g., the different proteins (or different subunits of a multimeric protein). In an additional embodiment, a multi-specific antibody molecule comprises a third, fourth or fifth immunoglobulin variable domain. In an embodiment, a multi-specific antibody molecule is a bispecific antibody molecule, a tri-specific antibody molecule, or tetra-specific antibody molecule.

In some examples, a multi-specific antibody molecule can be a bispecific antibody molecule. A bispecific antibody has specificity for no more than two antigens or two binding sites. A bispecific antibody molecule is characterized by a first immunoglobulin variable domain sequence which has binding specificity for a first epitope and a second immunoglobulin variable domain sequence that has binding specificity for a second epitope. In another embodiment, the first and second epitopes are on the same antigen, e.g., the same protein (or subunit of a multimeric protein). In one embodiment, the first and second epitopes overlap. In another embodiment, the first and second epitopes do not overlap. In an embodiment, the first and second epitopes are on different antigens, e.g., the different proteins (or different subunits of a multimeric protein). In other embodiments, a bispecific antibody molecule comprises a heavy chain variable domain sequence and a light chain variable domain sequence which have binding specificity for a first epitope and a heavy chain variable domain sequence and a light chain variable domain sequence which have binding specificity for a second epitope. In other instances, a bispecific antibody molecule comprises a half antibody having binding specificity for a first epitope and a half antibody having binding specificity for a second epitope. In an additional embodiment, a bispecific antibody molecule comprises a half antibody, or fragment thereof, having binding specificity for a first epitope and a half antibody, or fragment thereof, having binding specificity for a second epitope. In an embodiment a bispecific antibody molecule comprises a single-chain variable fragment (scFv), or fragment thereof, have binding specificity for a first epitope and a scFv, or fragment thereof, have binding specificity for a second epitope.

In other configurations, an antibody molecule comprises a diabody, and a single-chain molecule, as well as an antigen-binding fragment of an antibody (e.g., Fab, F(ab')$_2$, and Fv). For example, an antibody molecule can include a heavy (H) chain variable domain sequence (abbreviated herein as VH), and a light (L) chain variable domain sequence (abbreviated herein as VL). In one embodiment, an antibody molecule comprises or consists of a heavy chain and a light chain (referred to herein as a half antibody). In another example, an antibody molecule includes two heavy (H) chain variable domain sequences and two light (L) chain variable domain sequence, thereby forming two antigen binding sites, such as Fab, Fab', F(ab')$_2$, Fc, Fd, Fd', Fv, single chain antibodies (scFv for example), single variable domain antibodies, diabodies (Dab) (bivalent and bispecific), and chimeric (e.g., humanized) antibodies, which may be produced by the modification of whole antibodies or those synthesized de novo using recombinant DNA technologies. Without wishing to be bound by any one configuration, these functional antibody fragments generally retain the ability to selectively bind with their respective antigen or receptor. Antibodies and antibody fragments can be from any class of antibodies including, but not limited to, IgG, IgA, IgM, IgD, and IgE, and from any subclass (e.g., IgG1, IgG2, IgG3, and IgG4) of antibodies. The preparation of antibody molecules can be monoclonal or polyclonal. An antibody molecule can also be a human, humanized, CDR-grafted, or in vitro generated antibody. The antibody can have a heavy chain constant region chosen from, e.g., IgG1, IgG2, IgG3, or IgG4. The antibody can also have a light chain chosen from, e.g., kappa or lambda. The term "immunoglobulin" (Ig) is used interchangeably with the term "antibody" herein.

Examples of antigen-binding fragments of an antibody molecule include: (i) a Fab fragment, a monovalent fragment consisting of the VL, VH, CL and CH1 domains; (ii) a F(ab')2 fragment, a bivalent fragment comprising two Fab fragments linked by a disulfide bridge at the hinge region; (iii) a Fd fragment consisting of the VH and CH1 domains; (iv) a Fv fragment consisting of the VL and VH domains of a single arm of an antibody, (v) a diabody (dAb) fragment, which consists of a VH domain; (vi) a camelid or camelized variable domain; (vii) a single chain Fv (scFv), see e.g., Bird et al. (1988) Science 242:423-426; and Huston et al. (1988) Proc. Natl. Acad. Sci. USA 85:5879-5883); (viii) a single domain antibody. These antibody fragments are obtained using conventional techniques known to those with skill in the art, and the fragments are screened for utility in the same manner as are intact antibodies.

In some examples, antibodies which can be used in the imaging methods and systems described herein can also be single domain antibodies. Single domain antibodies can include antibodies whose complementary determining regions are part of a single domain polypeptide. Examples include, but are not limited to, heavy chain antibodies, antibodies naturally devoid of light chains, single domain antibodies derived from conventional 4-chain antibodies, engineered antibodies and single domain scaffolds other than those derived from antibodies. Single domain antibodies may be any present in the art or any future single domain antibodies. Single domain antibodies may be derived from any species including, but not limited to mouse, human, primates, camel, llama, fish, shark, goat, rabbit, and bovine. A single domain antibody is a naturally occurring single domain antibody known as heavy chain antibody devoid of light chains. Such single domain antibodies are described, for example, in WO 94/04678. For clarity reasons, this variable domain derived from a heavy chain antibody naturally devoid of light chain is known herein as a VHH or nanobody to distinguish it from the conventional VH of four chain immunoglobulins. Such a VHH molecule can be derived from antibodies raised in Camelidae species, for example in camel, llama, dromedary, alpaca and guanaco. Other species besides Camelidae may produce heavy chain antibodies naturally devoid of light chain; such VHHs are within the scope of the invention.

In certain examples, the VH and VL regions can be subdivided into regions of hypervariability, termed "complementarity determining regions" (CDR), interspersed with regions that are more conserved, termed "framework regions" (FR or FW). The extent of the framework region and CDRs has been precisely defined by a number of methods (see, Kabat, E. A., et al. (1991) Sequences of Proteins of Immunological Interest, Fifth Edition, U.S. Department of Health and Human Services, NIH Publication No. 91-3242; Chothia, C. et al. (1987) J. Mol. Biol. 196: 901-917; and the AbM definition used by Oxford Molecular's AbM antibody modeling software. See, generally, e.g., Protein Sequence and Structure Analysis of Antibody Variable Domains. In: Antibody Engineering Lab Manual (Ed.: Duebel, S. and Kontermann, R., Springer-Verlag, Heidelberg). The terms "complementarity determining region," and "CDR," as used herein refer to the sequences of amino acids within antibody variable regions which confer antigen specificity and binding affinity. In general, there are three CDRs in each heavy chain variable region (HCDR1, HCDR2, HCDR3) and three CDRs in each light chain variable region (LCDR1, LCDR2, LCDR3). The precise amino acid sequence boundaries of a given CDR can be determined using any of a number of well-known schemes, including those described by Kabat et al. (1991), "Sequences of Proteins of Immunological Interest," 5th Ed. Public Health Service, National Institutes of Health, Bethesda, Md. ("Kabat" numbering scheme), AL-Lazikani et al., (1997) JMB 273, 927-948 ("Chothia" numbering scheme). As used herein, the CDRs defined according the "Chothia" number scheme are also sometimes referred to as "hypervariable loops."

For example, under Kabat, the CDR amino acid residues in the heavy chain variable domain (VH) are numbered 31-35 (HCDR1), 50-65 (HCDR2), and 95-102 (HCDR3); and the CDR amino acid residues in the light chain variable domain (VL) are numbered 24-34 (LCDR1), 50-56 (LCDR2), and 89-97 (LCDR3). Under Chothia the CDR amino acids in the VH are numbered 26-32 (HCDR1), 52-56 (HCDR2), and 95-102 (HCDR3); and the amino acid residues in VL are numbered 26-32 (LCDR1), 50-52 (LCDR2), and 91-96 (LCDR3). By combining the CDR definitions of both Kabat and Chothia, the CDRs consist of amino acid residues 26-35 (HCDR1), 50-65 (HCDR2), and 95-102 (HCDR3) in human VH and amino acid residues 24-34 (LCDR1), 50-56 (LCDR2), and 89-97 (LCDR3) in human VL. Unless specifically indicated, the antibody molecules can include any combination of one or more Kabat CDRs and/or Chothia hypervariable loops. Under all definitions, each VH and VL typically includes three CDRs and four FRs, arranged from amino-terminus to carboxy-terminus in the following order: FR1, CDR1, FR2, CDR2, FR3, CDR3, FR4. An immunoglobulin variable domain sequence refers to an amino acid sequence which can form the structure of an immunoglobulin variable domain. For example, the sequence may include all or part of the amino acid sequence of a naturally-occurring variable domain. For example, the sequence may or may not include one, two, or more N- or C-terminal amino acids, or may include other alterations that are compatible with formation of the protein structure.

In certain examples, the antibody generally comprises one or more antigen-binding sites or epitopes. The term antigen-binding site refers to the part of an antibody molecule that comprises determinants that form an interface that binds to the cell site, or an epitope thereof. With respect to proteins (or protein mimetics), the antigen-binding site typically includes one or more loops (of at least four amino acids or amino acid mimics) that form an interface that binds to a polypeptide of the cell. Typically, the antigen-binding site of an antibody molecule includes at least one or two CDRs and/or hypervariable loops, or more typically at least three, four, five or six CDRs and/or hypervariable loops.

In some examples, different antibodies may compete with each other to bind to a specific epitope or site of the cell. The terms "compete" or "cross-compete" are used interchangeably herein to refer to the ability of an antibody molecule to interfere with binding of another antibody molecule. The interference with binding can be direct or indirect (e.g., through an allosteric modulation of the antibody molecule or the target). The extent to which an antibody molecule is able to interfere with the binding of another antibody molecule to the target, and therefore whether it can be said to compete, can be determined using a competition binding assay, for example, a FACS assay, an ELISA or BIACORE assay. In some embodiments, a competition binding assay is a quantitative competition assay. In some embodiments, a first antibody molecule is said to compete for binding to the target with a second antibody molecule when the binding of the first antibody molecule to the target is reduced by 10% or more, e.g., 20% or more, 30% or more, 40% or more, 50% or more, 55% or more, 60% or more, 65% or more, 70% or more, 75% or more, 80% or more, 85% or more, 90% or more, 95% or more, 98% or more, 99% or more in a competition binding assay (e.g., a competition assay described herein). As used herein, the term "epitope" refers to the moieties of an antigen that specifically interact with an antibody molecule. Such moieties, referred to herein as epitopic determinants, typically comprise, or are part of, elements such as amino acid side chains or sugar side chains. An epitopic determinate can be defined by methods known in the art or disclosed herein, e.g., by crystallography or by hydrogen-deuterium exchange. At least one or some of the moieties on the antibody molecule, that specifically interact with an epitopic determinant, are typically located in a CDR(s). Typically an epitope has specific three dimensional structural characteristics. An epitope may also comprise specific charge characteristics. Some epitopes are linear epitopes while others are conformational epitopes.

In some examples, the antibodies that can be used in the imaging methods described herein may be monoclonal antibodies. The terms "monoclonal antibody" or "monoclonal antibody composition" as used herein refers to a preparation of antibody molecules of single molecular composition. A monoclonal antibody composition displays a single binding specificity and affinity for a particular epitope. A monoclonal antibody can be made by hybridoma technology or by methods that do not use hybridoma technology (e.g., recombinant methods).

In other examples, the antibody molecule can be a polyclonal or a monoclonal antibody. In other embodiments, the antibody can be recombinantly produced, e.g., produced by phage display or by combinatorial methods. For example, phage display and combinatorial methods for generating antibodies are known in the art (as described in, e.g., Ladner et al. U.S. Pat. No. 5,223,409; Kang et al. International Publication No. WO 92/18619; Dower et al. International Publication No. WO 91/17271; Winter et al. International Publication WO 92/20791; Markland et al. International Publication No. WO 92/15679; Breitling et al. International Publication WO 93/01288; McCafferty et al. International Publication No. WO 92/01047; Garrard et al. International Publication No. WO 92/09690; Ladner et al. International Publication No. WO 90/02809; Fuchs et al. (1991) Bio/Technology 9:1370-1372; Hay et al. (1992) Hum Antibod Hybridomas 3:81-85; Huse et al. (1989) Science 246:1275-1281; Griffiths et al. (1993) EMBO J 12:725-734; Hawkins et al. (1992) J Mol Biol 226:889-896; Clackson et al. (1991) Nature 352:624-628; Gram et al. (1992) PNAS 89:3576-3580; Garrad et al. (1991) Bio/Technology 9:1373-1377; Hoogenboom et al. (1991) Nuc Acid Res 19:4133-4137; and Barbas et al. (1991) PNAS 88:7978-7982, the contents of all of which are incorporated by reference herein).

In one embodiment, the antibody is a fully human antibody (e.g., an antibody made in a mouse which has been genetically engineered to produce an antibody from a human immunoglobulin sequence), or a non-human antibody, e.g., a rodent (mouse or rat), goat, primate (e.g., monkey), camel antibody. Preferably, the non-human antibody is a rodent (mouse or rat antibody). Methods of producing rodent antibodies are known in the art. Human monoclonal antibodies can be generated using transgenic mice carrying the human immunoglobulin genes rather than the mouse system. Splenocytes from these transgenic mice immunized with the antigen of interest are used to produce hybridomas that secrete human monoclonal antibodies (mAbs) with specific affinities for epitopes from a human protein (see, e.g., Wood et al. International Application WO 91/00906, Kucherlapati et al. PCT publication WO 91/10741; Lonberg et al. International Application WO 92/03918; Kay et al. International Application 92/03917; Lonberg, N. et al. 1994 Nature 368: 856-859; Green, L. L. et al. 1994 Nature Genet. 7:13-21; Morrison, S. L. et al. 1994 Proc. Natl. Acad. Sci. USA 81:6851-6855; Bruggeman et al. 1993 Year Immunol 7:33-40; Tuaillon et al. 1993 PNAS 90:3720-3724; Bruggeman et al. 1991 Eur J Immunol 21:1323-1326). An antibody can be one in which the variable region, or a portion thereof, e.g., the CDRs, are generated in a non-human organism, e.g., a rat or mouse. Chimeric, CDR-grafted, and humanized antibodies can be used. Antibodies generated in a non-human organism, e.g., a rat or mouse, and then modified, e.g., in the variable framework or constant region, to decrease antigenicity in a human. Chimeric antibodies can be produced by recombinant DNA techniques known in the art (see Robinson et al., International Patent Publication PCT/US86/02269; Akira, et al., European Patent Application 184,187; Taniguchi, M., European Patent Application 171,496; Morrison et al., European Patent Application 173,494; Neuberger et al., International Application WO 86/01533; Cabilly et al. U.S. Pat. No. 4,816,567; Cabilly et al., European Patent Application 125,023; Better et al. (1988 Science 240:1041-1043); Liu et al. (1987) PNAS 84:3439-3443; Liu et al., 1987, J. Immunol. 139:3521-3526; Sun et al. (1987) PNAS 84:214-218; Nishimura et al., 1987, Canc. Res. 47:999-1005; Wood et al. (1985) Nature 314:446-449; and Shaw et al., 1988, J. Natl Cancer Inst. 80:1553-1559).

In certain examples, a humanized or CDR-grafted antibody will have at least one or two but generally all three recipient CDRs (of heavy and or light immunoglobulin chains) replaced with a donor CDR. The antibody may be replaced with at least a portion of a non-human CDR or only some of the CDRs may be replaced with non-human CDRs. It may only be desirable to replace the number of CDRs required for binding of the humanized antibody to a particular epitope. Preferably, the donor will be a rodent antibody, e.g., a rat or mouse antibody, and the recipient will be a human framework or a human consensus framework. Typically, the immunoglobulin providing the CDRs is called the "donor" and the immunoglobulin providing the framework is called the "acceptor." In one embodiment, the donor immunoglobulin is a non-human (e.g., rodent). The acceptor framework is a naturally-occurring (e.g., a human) framework or a consensus framework, or a sequence about 85% or higher, preferably 90%, 95%, 99% or higher identical thereto. As used herein, the term "consensus sequence" refers to the sequence formed from the most frequently occurring amino acids (or nucleotides) in a family of related sequences (See e.g., Winnaker, From Genes to Clones (Verlagsgesellschaft, Weinheim, Germany 1987). In a family of proteins, each position in the consensus sequence is occupied by the amino acid occurring most frequently at that position in the family. If two amino acids occur equally frequently, either can be included in the consensus sequence. A "consensus framework" refers to the framework region in the consensus immunoglobulin sequence.

In some examples, an antibody can be humanized by methods known in the art (see e.g., Morrison, S. L., 1985, Science 229:1202-1207, by Oi et al., 1986, BioTechniques 4:214, and by Queen et al. U.S. Pat. Nos. 5,585,089, 5,693,761 and 5,693,762, the contents of all of which are hereby incorporated by reference). Humanized or CDR-grafted antibodies can be produced by CDR-grafting or CDR substitution, wherein one, two, or all CDRs of an immunoglobulin chain can be replaced. See e.g., U.S. Pat. No. 5,225,539; Jones et al. 1986 Nature 321:552-525; Verhoeyan et al. 1988 Science 239:1534; Beidler et al. 1988 J. Immunol. 141:4053-4060; Winter U.S. Pat. No. 5,225,539, the contents of all of which are hereby expressly incorporated by reference. Winter describes a CDR-grafting method which may be used to prepare humanized antibodies (UK Patent Application GB 2188638A, filed on Mar. 26, 1987; Winter U.S. Pat. No. 5,225,539), the contents of which is expressly incorporated by reference. Humanized antibodies in which specific amino acids have been substituted, deleted or added can also be used. Criteria for selecting amino acids from the donor are described, for example, in U.S. Pat. No. 5,585,089, e.g., columns 12-16 of U.S. Pat. No. 5,585,089, the e.g., columns 12-16 of U.S. Pat. No. 5,585,089, the contents of which are hereby incorporated by reference. Other techniques for humanizing antibodies are described in Padlan et al. EP 519596 A1, published on Dec. 23, 1992.

In some examples, the antibody molecule can be a single chain antibody. A single-chain antibody (scFV) may be engineered (see, for example, Colcher, D. et al. (1999) Ann N Y Acad Sci 880:263-80; and Reiter, Y. (1996) Clin Cancer Res 2:245-52). The single chain antibody can be dimerized or multimerized to generate multivalent antibodies having specificities for different epitopes of the same target protein. In yet other embodiments, the antibody molecule has a heavy chain constant region chosen from, e.g., the heavy chain constant regions of IgG1, IgG2, IgG3, IgG4, IgM, IgA1, IgA2, IgD, and IgE; particularly, chosen from, e.g., the (e.g., human) heavy chain constant regions of IgG1, IgG2, IgG3, and IgG4. In another embodiment, the antibody molecule has a light chain constant region chosen from, e.g., the (e.g., human) light chain constant regions of kappa or lambda. The constant region can be altered, e.g., mutated, to modify the properties of the antibody (e.g., to increase or decrease one or more of: Fc receptor binding, antibody glycosylation, the number of cysteine residues, effector cell function, and/or complement function). In one embodiment the antibody has: effector function; and can fix complement. In other embodiments the antibody does not; recruit effector cells; or fix complement. In another embodiment, the antibody has reduced or no ability to bind an Fc receptor. For example, it is an isotype or subtype, fragment or other mutant, which does not support binding to an Fc receptor, e.g., it has a mutagenized or deleted Fc receptor binding region.

Methods for altering an antibody constant region are known in the art. Antibodies with altered function, e.g., altered affinity for an effector ligand, such as FcR on a cell, or the C1 component of complement can be produced by replacing at least one amino acid residue in the constant portion of the antibody with a different residue (see e.g., EP 388,151 A1, U.S. Pat. Nos. 5,624,821 and 5,648,260, the contents of all of which are hereby incorporated by reference). Similar type of alterations could be described which if applied to the murine, or other species immunoglobulin would reduce or eliminate these functions.

In certain examples, an antibody can be derivatized or linked to another functional molecule (e.g., another peptide or protein) or conjugated to a label. As used herein, a "derivatized" antibody is one that has been modified. Methods of derivatization include but are not limited to the addition of a fluorophore, a phosphor, a light scattering moiety, light emitting moiety, complexed with a metal, a radionucleotide, a toxin, an enzyme or an affinity ligand such as biotin. The antibody can include derivatized and otherwise modified forms of the antibodies, including immunoadhesion molecules. For example, an antibody molecule can be functionally linked (by chemical coupling, genetic fusion, noncovalent association or otherwise) to one or more other molecular entities, such as another antibody (e.g., a bispecific antibody or a diabody), a detectable agent, one or more labels, a cytotoxic agent, a pharmaceutical agent, and/or a protein or peptide that can mediate association of the antibody or antibody portion with another molecule (such as a streptavidin core region or a polyhistidine tag). One type of derivatized antibody molecule is produced by crosslinking two or more antibodies (of the same type or of different types, e.g., to create bispecific antibodies). Suitable crosslinkers include those that are heterobifunctional, having two distinctly reactive groups separated by an appropriate spacer (e.g., m-maleimidobenzoyl-N-hydroxysuccinimide ester) or homobifunctional (e.g., disuccinimidyl suberate). Such linkers are available from Pierce Chemical Company, Rockford, Ill.

In some examples, the antibody may comprise a detectable label which is selected based on the particular excitation wavelength(s) that are provided by the imaging system. Useful detectable agents with which an antibody molecule may be derivatized (or labeled) include fluorescent compounds, various enzymes, prosthetic groups, luminescent materials, bioluminescent materials, fluorescent emitting metal atoms, e.g., europium (Eu), phosphorescent labels and phosphorescent emitting metal atoms, and transition metals, lanthanides, and radioactive materials (described below).

In certain embodiments, the cells or other objects imaged using the method and systems described herein can include a fluorescent label, e.g., internally or on an external surface or within a cell membrane, cell wall or organelle. Exemplary fluorescent labels include, but are not limited to, fluorescein, fluorescein isothiocyanate, rhodamine, 5-dimethylamine-1-napthalenesulfonyl chloride, phycoerythrin and the like. An antibody may also be derivatized with detectable enzymes, such as alkaline phosphatase, horseradish peroxidase, beta-galactosidase, acetylcholinesterase, glucose oxidase and the like. When an antibody is derivatized with a detectable enzyme, it is detected by adding additional reagents that the enzyme uses to produce a detectable reaction product. For example, when the detectable agent horseradish peroxidase is present, the addition of hydrogen peroxide and diaminobenzidine leads to a colored reaction product, which is detectable. An antibody molecule may also be derivatized with a prosthetic group (e.g., streptavidin/biotin and avidin/biotin). For example, an antibody may be derivatized with biotin, and detected through indirect measurement of avidin or streptavidin binding. Other examples of suitable fluorescent materials include umbelliferone, fluorescein, fluorescein isothiocyanate, rhodamine, dichlorotriazinylamine fluorescein, dansyl chloride or phycoerythrin; an example of a luminescent material includes luminol, and examples of bioluminescent materials include luciferase, luciferin, and aequorin.

Labeled antibody molecule can be used, for example, to characterize one or more phenotypes or biological responses of the cell. The antibody is typically used to detect the presence (or absence) of an antigen in order to evaluate the abundance and pattern of expression of the protein, to monitor protein levels in tissue as part of a clinical testing procedure, e.g., to determine the efficacy of a given treatment regimen or to otherwise differentiate certain cells in a cell population from each other. The imaging methods and systems described herein can be used to monitor real time changes in the cells by monitoring an increase or decrease in the signals from the label.

In certain embodiments, an antibody molecule may be conjugated to another molecular entity, typically a label or a therapeutic (e.g., a cytotoxic or cytostatic) agent or moiety.

Radioactive isotopes can be used in diagnostic or therapeutic applications and may also be measured using the imaging methods described herein. Radioactive isotopes that can be coupled to the antibodies include, but are not limited to alpha-, beta-, or gamma-emitters, or beta- and gamma-emitters. Such radioactive isotopes include, but are not limited to iodine ($^{131}$I or $^{125}$I), yttrium ($^{90}$Y), lutetium ($^{177}$Lu), actinium ($^{225}$Ac), praseodymium, astatine ($^{211}$At), rhenium ($^{186}$Re), bismuth ($^{212}$Bi $^{213}$Bi), indium ($^{111}$In), technetium ($^{99m}$Tc), phosphorus ($^{32}$P), rhodium ($^{188}$Rh), sulfur ($^{35}$S), carbon ($^{14}$C) tritium ($^{3}$H), chromium ($^{51}$Cr), chlorine ($^{36}$Cl), cobalt ($^{57}$Co or $^{58}$Co), iron ($^{59}$Fe), selenium ($^{75}$Se), or gallium ($^{67}$Ga). Radioisotopes useful as therapeutic agents include, but are not limited to, yttrium ($^{90}$Y), lutetium ($^{177}$Lu), actinium ($^{225}$Ac), praseodymium, astatine ($^{211}$At), rhenium ($^{186}$Re), bismuth ($^{212}$Bi or $^{213}$Bi), and rhodium ($^{188}$Rh). Radioisotopes useful as labels, e.g., for use in diagnostics, include iodine ($^{131}$I or $^{125}$I), indium ($^{111}$In), technetium ($^{99m}$Tc), phosphorus ($^{32}$P), carbon ($^{14}$C), and tritium ($^{3}$H), or one or more of the therapeutic isotopes listed above. The radioactive species can be imaged indirectly by monitoring an increase in fluorescence emission of an acceptor molecule that can receive energy from radioactive decay of the radioisotope. For example, the imaging systems and methods can be used to detect whether or not these radioisotopes have been taken up by a particular cell and how much of the radioisotope is present in each individual cell.

In some embodiments, the antibody molecule can also be conjugated to a therapeutic agent. Therapeutically active radioisotopes have already been mentioned. Examples of other therapeutic agents include taxol, cytochalasin B, gramicidin D, ethidium bromide, emetine, mitomycin, etoposide, tenoposide, vincristine, vinblastine, colchicine, doxorubicin, daunorubicin, dihydroxy anthracin dione, mitoxantrone, mithramycin, actinomycin D, 1-dehydrotestosterone, glucocorticoids, procaine, tetracaine, lidocaine, propranolol, puromycin, maytansinoids, e.g., maytansinol (see U.S. Pat. No. 5,208,020), CC-1065 (see U.S. Pat. Nos. 5,475,092, 5,585,499, 5,846, 545) and analogs or homologs thereof. Therapeutic agents include, but are not limited to, antimetabolites (e.g., methotrexate, 6-mercaptopurine, 6-thioguanine, cytarabine, 5-fluorouracil decarbazine), alkylating agents (e.g., mechlorethamine, thioepa chlorambucil, CC-1065, melphalan, carmustine (BSNU) and lomustine (CCNU), cyclothosphamide, busulfan, dibromomannitol, streptozotocin, mitomycin C, and cis-dichlorodiamine platinum (II) (DDP) cisplatin), anthracyclinies (e.g., daunorubicin (formerly daunomycin) and doxorubicin), antibiotics (e.g., dactinomycin (formerly actinomycin), bleomycin, mithramycin, and anthramycin (AMC)), and anti-mitotic agents (e.g., vincristine, vinblastine, taxol and maytansinoids). If desired, the antibody can be conjugated to both a therapeutic agent and a detectable label. Efficacy of treatment using the therapeutic conjugated antibody may be assessed using the imaging systems and methods described herein.

In certain embodiments, the antibody molecule is a multi-specific (e.g., a bispecific or a tri-specific) antibody molecule. Protocols for generating bispecific or heterodimeric antibody molecules are known in the art; including but not limited to, for example, the "knob in a hole" approach described in, e.g., U.S. Pat. No. 5,731,168; the electrostatic steering Fc pairing as described in, e.g., WO 09/089004, WO 06/106905 and WO 2010/129304; Strand Exchange Engineered Domains (SEED) heterodimer formation as described in, e.g., WO 07/110205; Fab arm exchange as described in, e.g., WO 08/119353, WO 2011/131746, and WO 2013/060867; double antibody conjugate, e.g., by antibody cross-linking to generate a bi-specific structure using a heterobifunctional reagent having an amine-reactive group and a sulfhydryl reactive group as described in, e.g., U.S. Pat. No. 4,433,059; bispecific antibody determinants generated by recombining half antibodies (heavy-light chain pairs or Fabs) from different antibodies through cycle of reduction and oxidation of disulfide bonds between the two heavy chains, as described in, e.g., U.S. Pat. No. 4,444,878; trifunctional antibodies, e.g., three Fab' fragments cross-linked through sulfhydryl reactive groups, as described in, e.g., U.S. Pat. No. 5,273,743; biosynthetic binding proteins, e.g., pair of scFvs cross-linked through C-terminal tails preferably through disulfide or amine-reactive chemical cross-linking, as described in, e.g., U.S. Pat. No. 5,534,254; bifunctional antibodies, e.g., Fab fragments with different binding specificities dimerized through leucine zippers (e.g., c-fos and c-jun) that have replaced the constant domain, as described in, e.g., U.S. Pat. No. 5,582,996; bispecific and oligospecific mono- and oligovalent receptors, e.g., VH-CH1 regions of two antibodies (two Fab fragments) linked through a polypeptide spacer between the CH1 region of one antibody and the VH region of the other antibody typically with associated light chains, as described in, e.g., U.S. Pat. No. 5,591,828; bispecific DNA-antibody conjugates, e.g., crosslinking of antibodies or Fab fragments through a double stranded piece of DNA, as described in, e.g., U.S. Pat. No. 5,635,602; bispecific fusion proteins, e.g., an expression construct containing two scFvs with a hydrophilic helical peptide linker between them and a full constant region, as described in, e.g., U.S. Pat. No. 5,637,481; multivalent and multi-specific binding proteins, e.g., dimer of polypeptides having first domain with binding region of Ig heavy chain variable region, and second domain with binding region of Ig light chain variable region, generally termed diabodies (higher order structures are also encompassed creating for bispecific, trispecific, or tetra-specific molecules, as described in, e.g., U.S. Pat. No. 5,837,242; minibody constructs with linked VL and VH chains further connected with peptide spacers to an antibody hinge region and CH3 region, which can be dimerized to form bispecific/multivalent molecules, as described in, e.g., U.S. Pat. No. 5,837,821; VH and VL domains linked with a short peptide linker (e.g., 5 or 10 amino acids) or no linker at all in either orientation, which can form dimers to form bispecific diabodies; trimers and tetramers, as described in, e.g., U.S. Pat. No. 5,844,094; String of VH domains (or VL domains in family members) connected by peptide linkages with cross-linkable groups at the C-terminus further associated with VL domains to form a series of FVs (or scFvs), as described in, e.g., U.S. Pat. No. 5,864,019; and single chain binding polypeptides with both a VH and a VL domain linked through a peptide linker are combined into multivalent structures through non-covalent or chemical crosslinking to form, e.g., homobivalent, heterobivalent, trivalent, and tetravalent structures using both scFV or diabody type format, as described in, e.g., U.S. Pat. No. 5,869,620. Additional exemplary multi-specific and bispecific molecules and methods of making the same are found, for example, in U.S. Pat. Nos. 5,910,573, 5,932,448, 5,959,083, 5,989,830, 6,005,079, 6,239,259, 6,294,353, 6,333,396, 6,476,198, 6,511,663, 6,670,453, 6,743,896, 6,809,185, 6,833,441, 7,129,330, 7,183,076, 7,521,056, 7,527,787, 7,534,866, 7,612,181, US2002004587A1, US2002076406A1, US2002103345A1, US2003207346A1, US2003211078A1, US2004219643A1, US2004220388A1, US2004242847A1, US2005003403A1, US2005004352A1, US2005069552A1, US2005079170A1, US2005100543A1, US2005136049A1, US2005136051A1, US2005163782A1, US2005266425A1, US2006083747A1, US2006120960A1, US2006204493A1, US2006263367A1, US2007004909A1, US2007087381A1, US2007128150A1, US2007141049A1, US2007154901A1, US2007274985A1, US2008050370A1, US2008069820A1, US2008152645A1, US2008171855A1, US2008241884A1, US2008254512A1, US2008260738A1, US2009130106A1, US2009148905A1, US2009155275A1, US2009162359A1, US2009162360A1, US2009175851A1, US2009175867A1, US2009232811A1, US2009234105A1, US2009263392A1, US2009274649A1, EP346087A2, WO0006605A2, WO02072635A2, WO04081051A1, WO06020258A2, WO2007044887A2, WO2007095338A2, WO2007137760A2, WO2008119353A1, WO2009021754A2, WO2009068630A1, WO9103493A1, WO9323537A1, WO9409131A1, WO9412625A2, WO9509917A1, WO9637621A2, WO9964460A1.

In other embodiments, the antibody molecule (e.g., a monospecific, bispecific, or multi-specific antibody molecule) is covalently linked, e.g., fused, to another partner e.g., a protein e.g., one, two or more cytokines, e.g., as a fusion molecule for example a fusion protein. In other embodiments, the fusion molecule comprises one or more proteins, e.g., one, two or more cytokines. In one embodiment, the cytokine is an interleukin (IL) chosen from one, two, three or more of IL-1, IL-2, IL-12, IL-15 or IL-21. In one embodiment, a bispecific antibody molecule has a first binding specificity to a first target, a second binding specificity to a second target, and is optionally linked to an interleukin (e.g., IL-12) domain e.g., full length IL-12 or a portion thereof. A "fusion protein" and a "fusion polypeptide" refer to a polypeptide having at least two portions covalently linked together, where each of the portions is a polypeptide having a different property. The property may be a biological property, such as activity in vitro or in vivo. The property can also be simple chemical or physical property, such as binding to a target molecule, catalysis of a reaction, etc. The two portions can be linked directly by a single peptide bond or through a peptide linker, but are in reading frame with each other. If desired the fusion protein may comprise a detectable label which can be detected.

While certain fluorophores are described above in connection with antibodies, other fluorophores or phosphors can be monitored using the imaging methods and systems described herein. For example, the excitation wavelength used in the imaging process is typically selected based on the particular fluorophore or phosphor present in the cell or object that is imaged. For example, excitation wavelengths in the ultraviolet, visible, and infrared ranges can be used to excite the fluorophores. Illustrative fluorophores include, but are not limited to, dyes such as, for example, acridine dyes (e.g., acridine orange), tetramethyl rhodamine, isothiocyanate derivatives (e.g., FITC, TRITC), phenanthridine derivatives (e.g., propidium iodide), 4',6-diamidino-2-phenylindole (DAPI) and bisbenzimide Hoechst dyes that are designated 33258, 33342, and 34580. In other instances, Alexa Fluor dyes such as the sulfonated rhodamine derivatives and reactive intermediates that include maleimide, succinimidyl ester, and hydrazide groups. In some examples, cyanine dyes such as, for example, Cy2, Cy3, Cy5, Cy7, and their derivatives, and other molecules with a partially saturated indole nitrogen heterocyclic nucleus with two aromatic units being connected via a polyalkene bridge of varying carbon number. In additional instances, the fluorophore may sequester or otherwise bind to a metal or metals such as calcium and can exhibit a varied emission wavelength in the presence and absence of binding to the metal species. Certain xanthene derivatives, Fura red, which is a multinuclear imidazole and benzofuran heterocycle, pyranine, BCECF, SNARF-1 and other materials can be used as fluorescent probes to monitor changes in metal species concentrations within a cell or a change in cellular pH. BODIPY and other species can be used, for example, to monitor changes in certain organelles such as mitochondria. If desired, quantum dots, nanoparticles, nanostructures or nanosystems that can emit light can also be used to monitor cellular activity during the imaging of the cells.

In certain embodiments, while the methods and systems described herein can be used to provide three-dimensional imaging of cells or other objects in a sample, the cells or other objects can be present on a two-dimensional surface. For example, two-dimensional (2D) cell culture often involves culturing cells on flat dishes made of plastics or other materials. The cells are adhered to the surface through one or more coatings or other materials. The coatings on the flat surfaces may intentionally be selected to have different heights so the cultured cells are not necessarily flat. The pre-scan steps described herein can be used to identify the differing heights and permit more rapid imaging of cells at different z-dimensions in a 2D cell culture. In some examples, cells in a 2D cell culture using a matrigel layer of material can be imaged using the methods and systems described herein. In other instances, 2D culture can be performed in a Transwell plate where a 2D cell layer is present at an arbitrary height above a plate bottom. For example, a Transwell insert can suspend the cells above a bottom surface of the plate or well. The pre-scan methods can be used to determine the x-y locations and z-height for each cell of the insert and the higher resolution scan can be used to image the cells. As long as the matrix is generally transparent for imaging at the particular wavelengths being used, cells grown in various different methods can be imaged using the methods and systems described herein.

Certain specific examples are described to illustrate further some of the novel and inventive aspects of the technology.

Example 1

Figure 16:
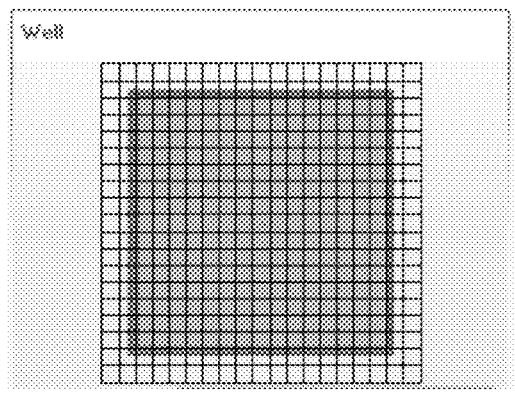
FIG. 16 is an illustration showing 225 fields of view when an entire 384 microwell plate is scanned, in accordance with some examples.

This example is intended to illustrate data volumes that can be obtained from a typical high power scan of a well comprising three-dimensional objects using a laser scanning confocal microscope. Referring to FIG. 16 an illustration is shown where each well of a plate is scanned using a high power scan. For example, a well of a 384 microwell plate with a hydrogel matrix of about 500 microns in height and objects with a z-width of about 30-50 microns can be scanned at high power (63×) using a liquid immersion objective. For 225 fields of view (FOV), around 1000 plane scans are needed to cover each well. This scanning generates around 1 terabyte of data per well or 384 terabytes of data per microwell plate. The volume of this data increases processing time and requires significant storage capabilities.

Example 2

Figure 17:
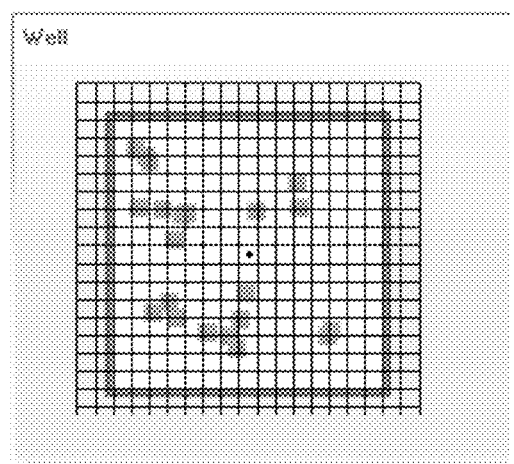
FIG. 17 is an illustration showing 25 fields of view that can be scanned after pre-scanning the 384 microwell plate, in accordance with some embodiments.

In comparison to Example 1, by using a pre-scan to identify the x-y coordinates and the z-height of the object followed by a higher power scan, the amount of obtained data can be reduced. Referring to FIG. 17, using the laser scanning confocal microscope, the pre-scan can be performed using a 10× air objective and allows the system to reduce the scanning to 25 fields of view. By only scanning the identified objects from the pre-scan at the higher power scan (e.g., using a 63× liquid immersion objective), data volume can be reduced to about 18 gigabytes per well or about 7 terabytes for the entire 384 microwell plate. The combination of a pre-scan and a higher power scan can reduce the data volumes to 54× less than the data volume obtained in Example 1.

Example 3

This example is intended to illustrate the scan time to scan an entire 384 microwell plate using a laser scanning confocal microscope. For purposes of this illustration it is assumed that the objects are spheroids randomly distributed in a gel matrix. The matrix height is 500 microns and the spheroid z-width is 40-60 microns. To scan a single well of the 384 microwell plate, it is estimated the total scan time is about 105 minutes with 481 planes being scanned with 1 micron plane spacing. 81 fields of view can be scanned over the 105 minute scan time.

Example 4

In comparison to Example 3, by using a pre-scan to identify the x-y coordinates and the z-height of the object followed by a higher power scan, the time it takes to scan the spheroid objects in a well of the 384 microwell plate using a laser scanning confocal microscope can be reduced greatly. Using a 10× air objective for a pre-scan followed, four fields of view used for the pre-scan step with 24 planes spread over 350 microns in the z-dimension. The results of the pre-scan can then be used to scan the identified images at higher power using a 40× liquid immersion objective. For example, at the higher power scan 81 planes spread over 80 microns in height (around 1 micron scan spacing in the z-direction) can be used. The total scan time to image the objects in a well (pre-scan+higher power scan) is estimated to be less than 6 minutes. Compared to Example 3, the pre-scan and scan steps permit imaging of the objects in the well about 19× faster.

Example 5

Figures 18A, 18B:
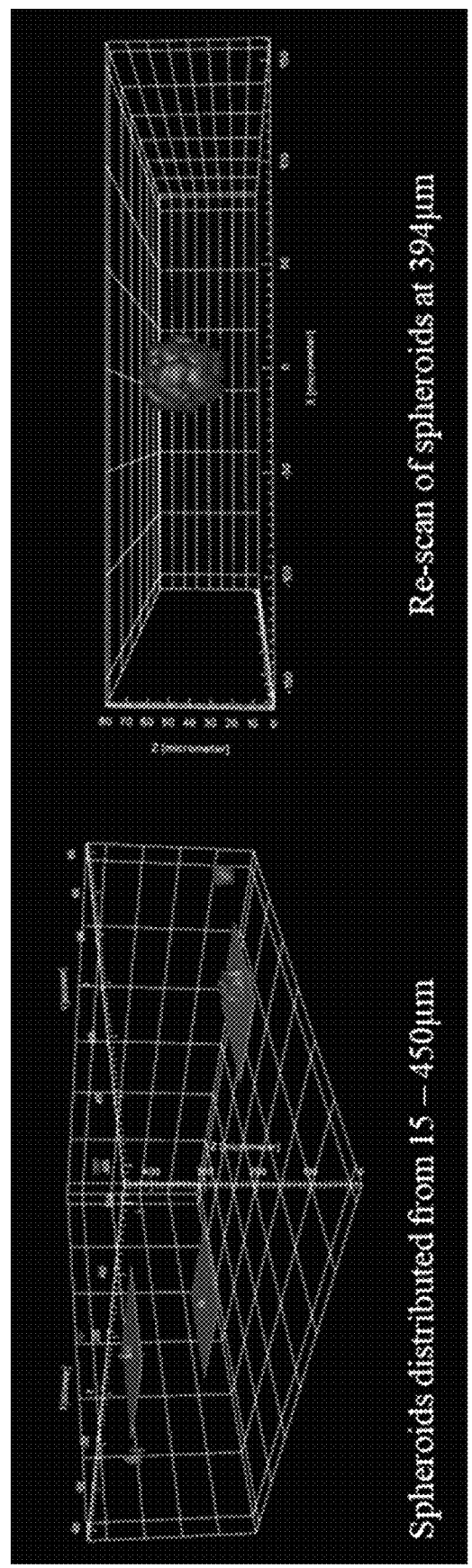
FIG. 18A shows a z-stack for pre-scan of spheroids.
FIG. 18B shows an image produced from scanning the spheroids using the pre-scan information, in accordance with some embodiments.

HeLa cell spheroids were grown in a Geltrex matrix and imaged using a combination of a pre-scan (10× air objective) and higher power scan (40× water immersion objective). The spheroids were distributed randomly throughout the matrix. For the pre-scan, a z-stack spanning 450 microns at 15 micron spacing in the z-dimension was used (see FIG. 18A). For the higher powered scan, a z-stack spanning 80 microns with 1 micron spacing in the z-dimension was used (see FIG. 18B). The combination of the pre-scan and scan steps reduce the amount of data by around 35× and the scan time by around 23×.

Example 6

Figure 19A:
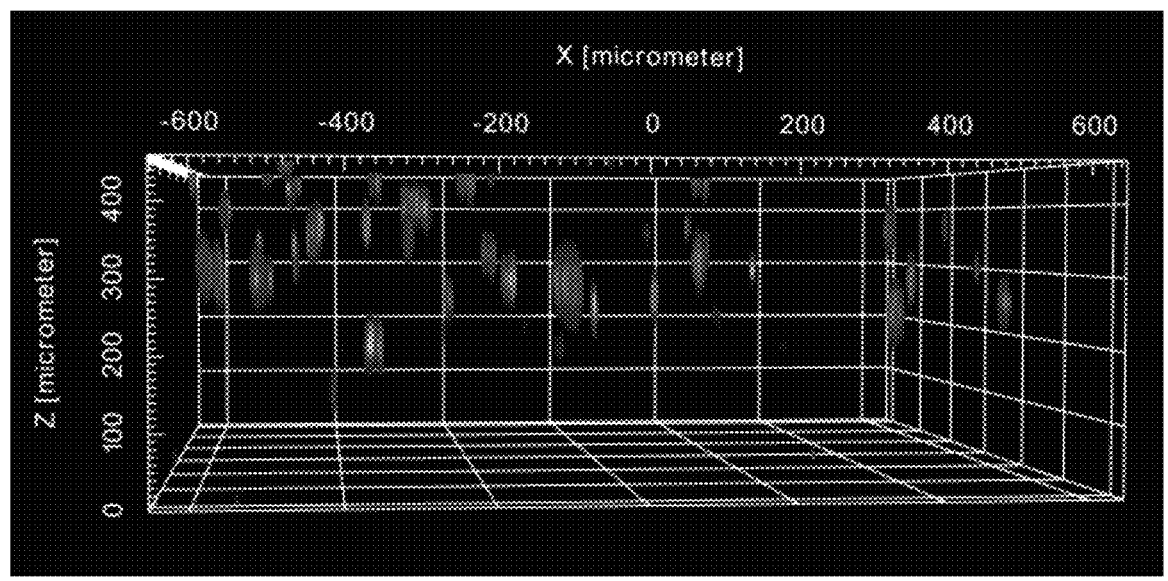
FIG. 19A shows a 3D visualization of a pre-scan acquired with a 10× air objective.
Figure 19B:
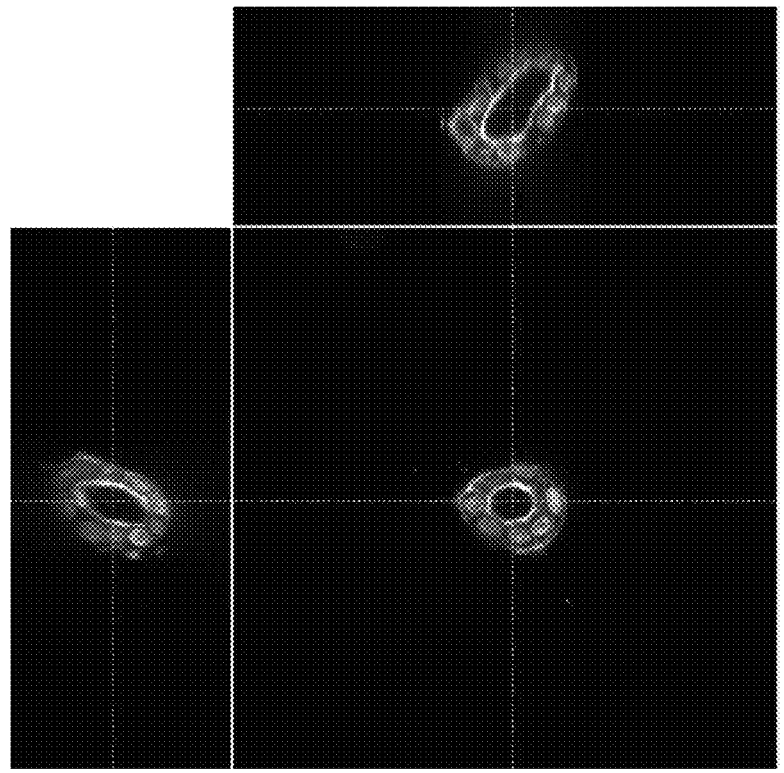
FIG. 19B shows a xyz view from a scan of the MDCK cysts.

MDCK cells were cultured in a 3-D Life hydrogel matrix (Cellendes, DE) and imaged using a combination of a lower power pre-scan and a higher power scan. The combination of a pre-scan and scan reduced the data by a factor of 54 and reduced scan time by a factor of 36. The gels had a height of 500 μm and the MDCK cells form 3D aggregates throughout the gel. The cells were imaged with a 63× water immersion objective at the higher power scan, and a 10× air objective at the lower power scan. A 3D visualization of pre-scan acquired with a 10× objective (24 planes, 15 μm step size) is shown in FIG. 19A. FIG. 19B shows an XYZ view of a MDCK cyst grown in the presence of RGD peptide (which promotes cyst formation) or a scrambled control peptide (scrambled peptide). The images were obtained using a 63× water immersion objective (160 planes, 0.5 µm step size).

Figure 19C:
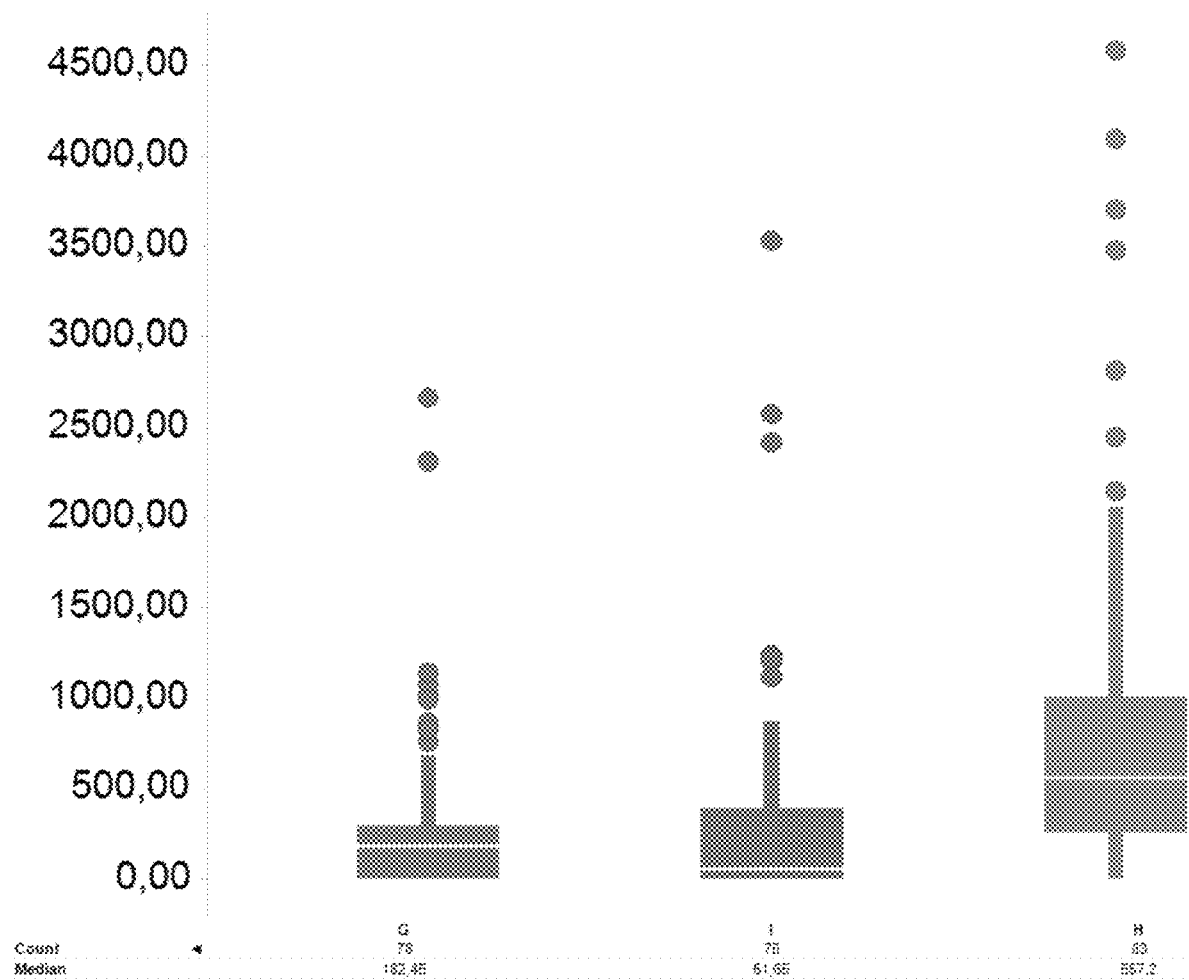
FIG. 19C shows box plots in accordance with certain examples.

Following acquisition, MDCK cyst morphology was analyzed using the Harmony 4.9 3D analysis tools, commercially available from PerkinElmer (Waltham, Mass.). The lumen of the MDCK cysts was segmented and the volume was calculated. The single cell results are shown as box plots in FIG. 19C. The left box plot represents the results using no added peptide, the center box plot represents the results using added scrambled control peptide and the right box plot represents the results using added RGD-peptide.

Example 7

The methods and systems described herein can also be used to identify cells inside a larger structure, e.g., inside a living organism. Tumor cells within zebrafish larvae were imaged. RFP positive tumor cells were segmented in a pre-scan using a 5× air objective and targeted for the higher power scan using a 20× water immersion objective. The identified tumor cells varied in z-height between 150 microns and 550 microns.

Figure 20A:
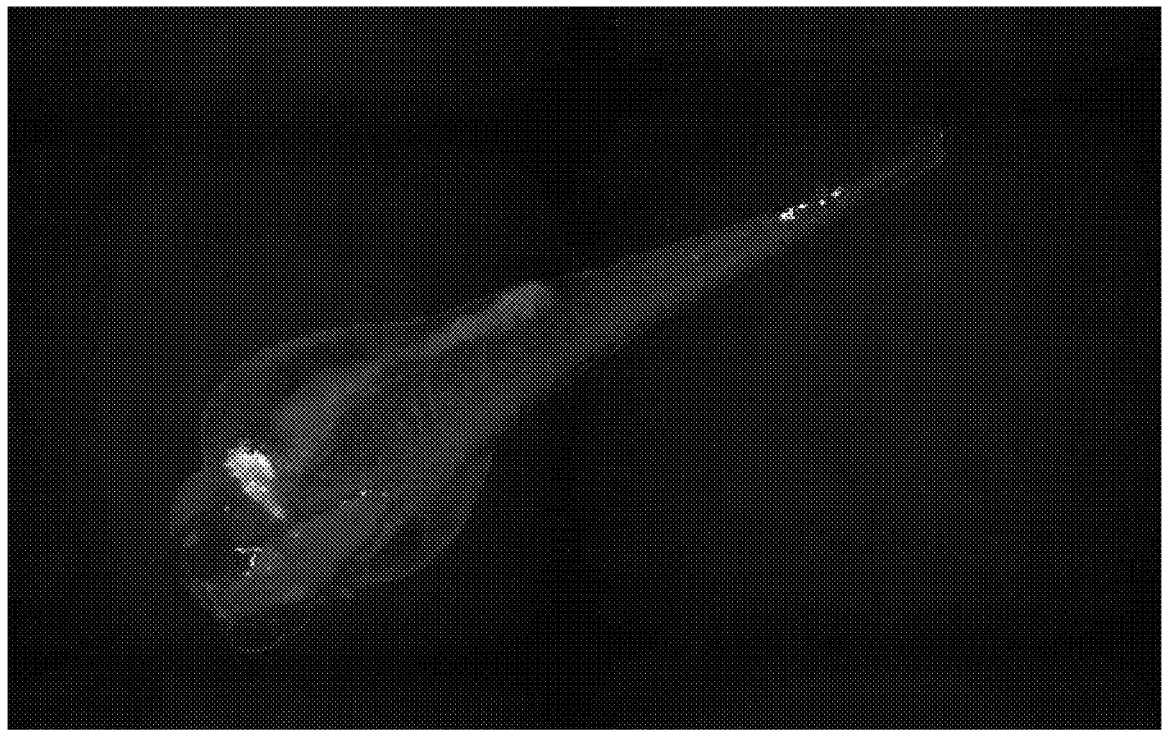
FIG. 20A shows a 5× air objective pre-scan.
Figure 20B:
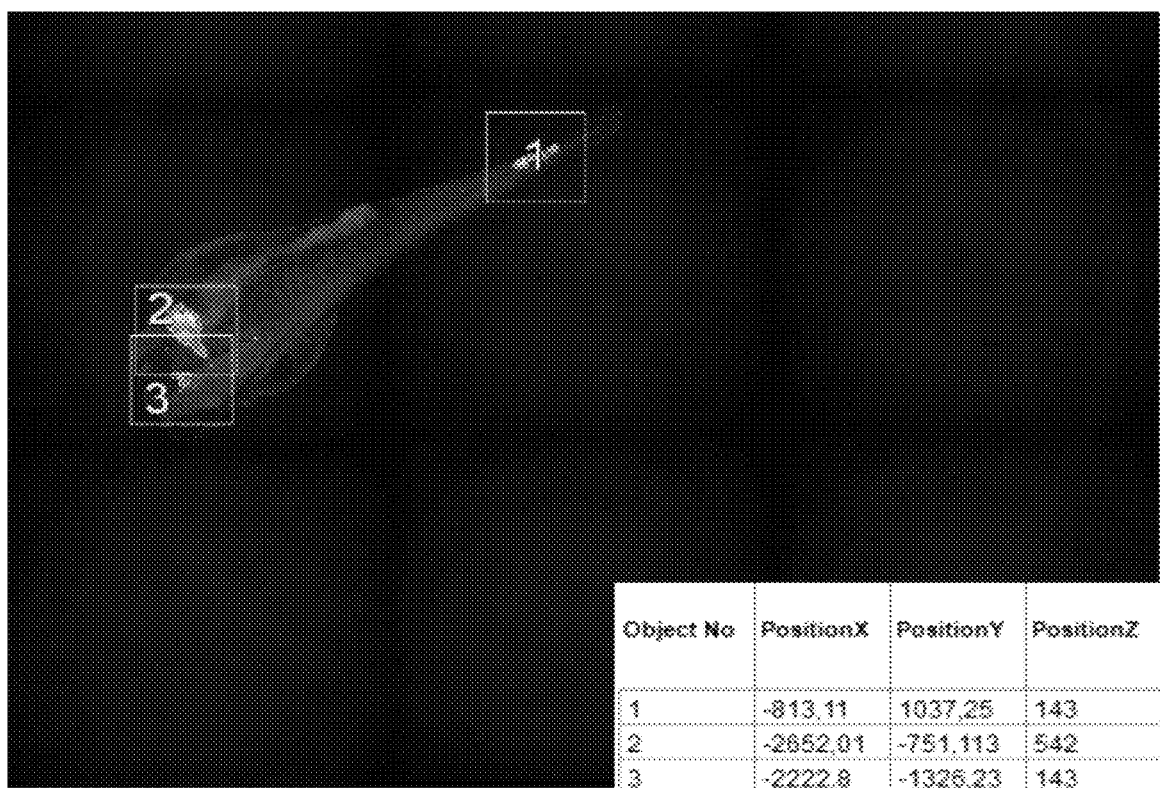
FIG. 20B shows segmented tumor cells on a global image with coordinates for a higher power scan.
Figure 20C:
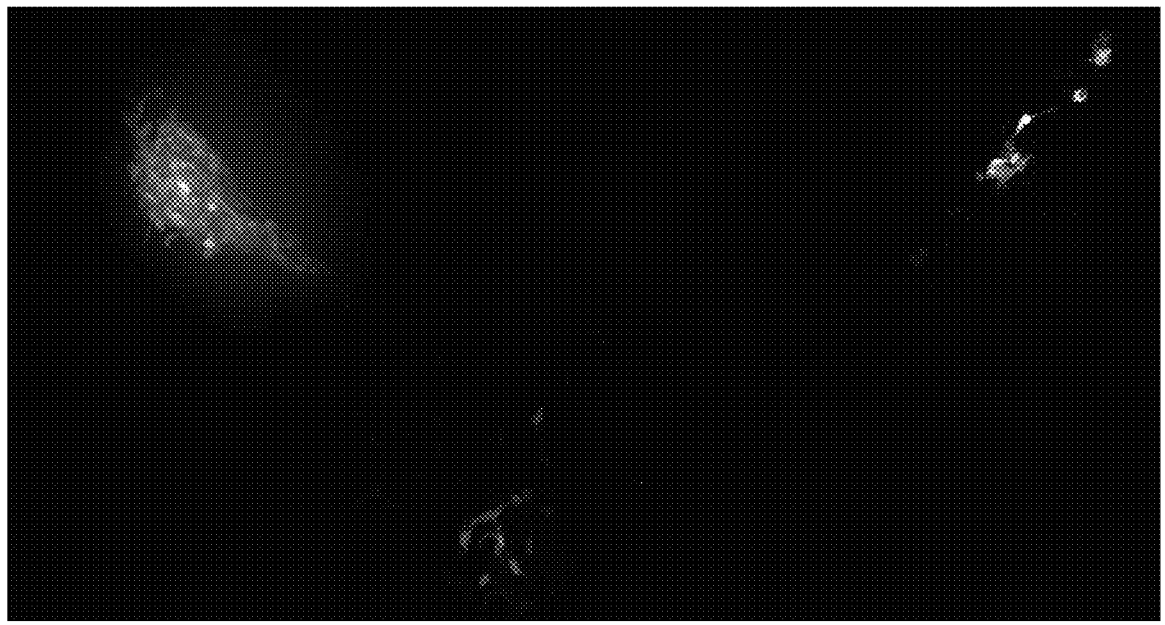
FIG. 20C shows a maximum intensity projection of a global image acquired with a 20× water immersion objective (280 planes, 1 micron step size), and each of FIGS. 20D, 20E and 20F shows a 3D view from the higher power scan with segmented tumor cells, in accordance with certain examples.
Figure 20D:
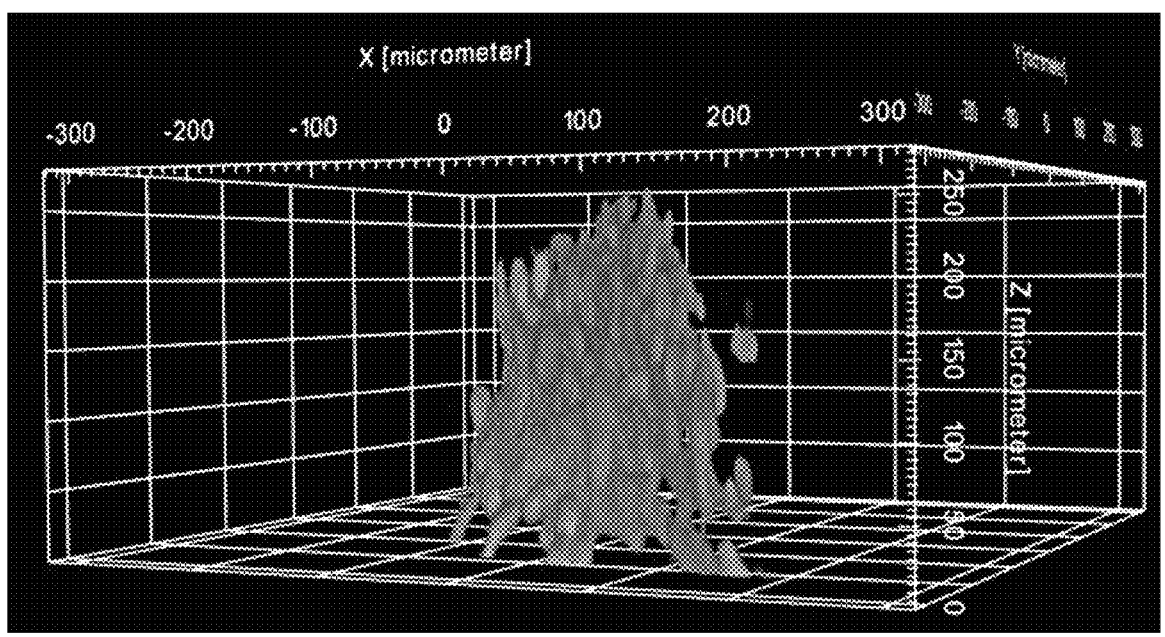
Figure 20E:
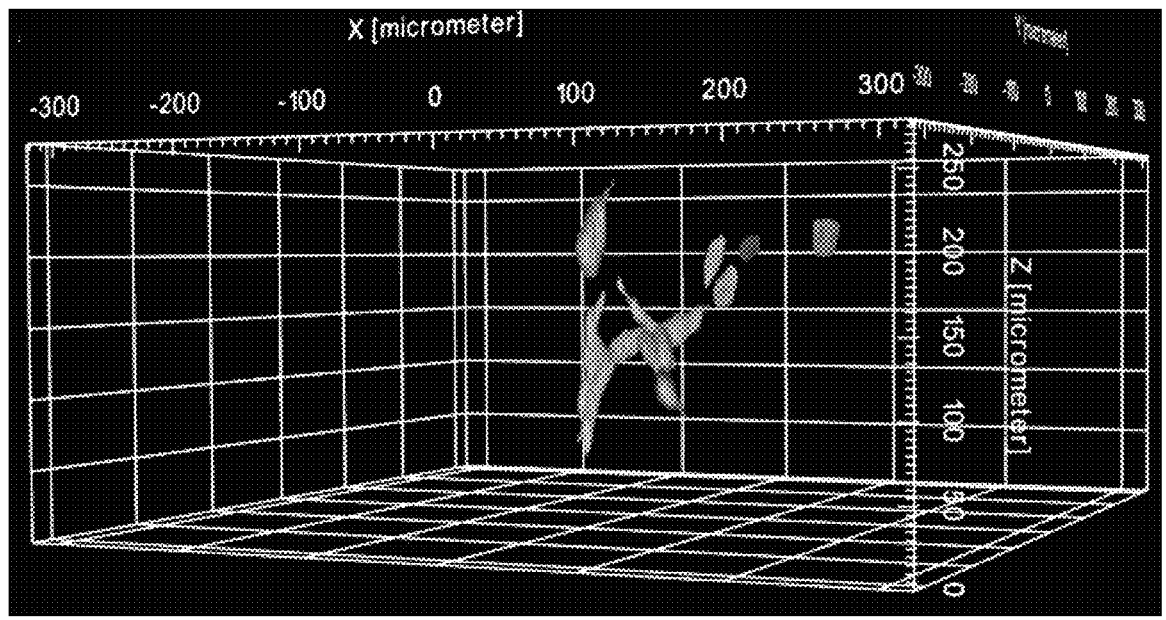
Figure 20F:
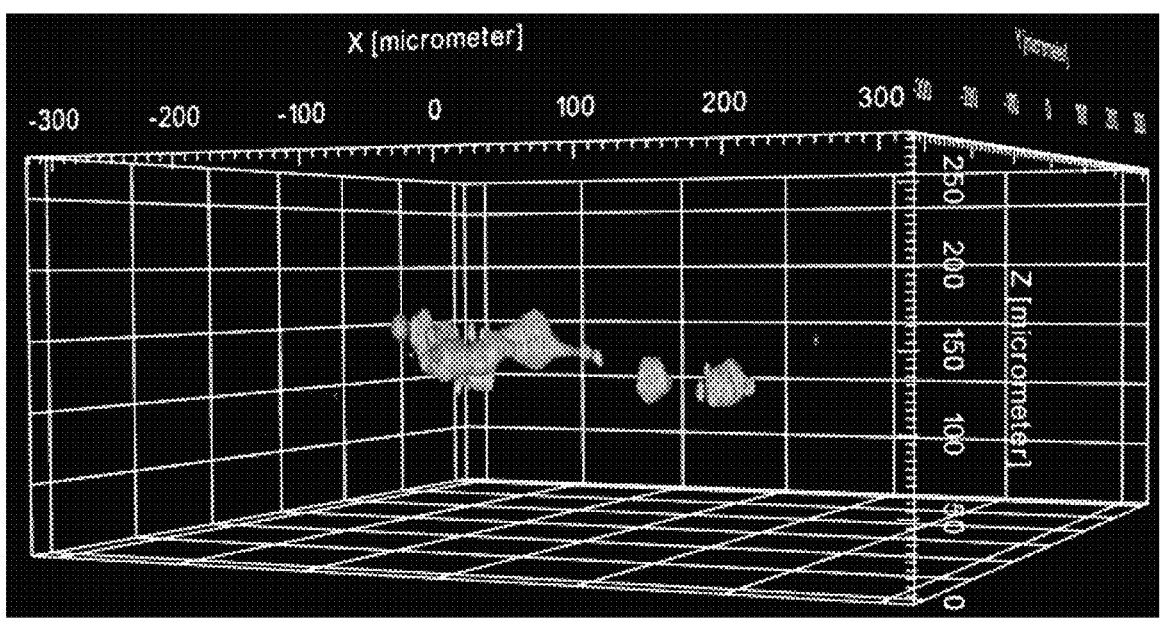

To cover the whole well of a 96 well CellCarrier Ultra plate, 9 fields were acquired with a z-stack of 25 planes at 30 micron steps. FIG. 20A shows a 5× pre-scan, maximum intensity projection of global image and individual images. FIG. 20B shows segmented tumor cells on a global image with coordinates for the higher power scan. FIG. 20C shows a maximum intensity projection of a global image acquired with a 20× water immersion objective (280 planes, 1 micron step size). Each of FIGS. 20D, 20E and 20F shows a 3D view from the higher power scan of one cluster of three identified clusters of segmented tumor cells.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A method of imaging a three-dimensional object present in a matrix using a laser confocal scanning microscope, the method comprising:
    pre-scanning the matrix using a first magnification objective to identify an x-y location of the three-dimensional object in the matrix and to identify a z-height for the three-dimensional object in the matrix and recording the identified x-y location and z-height as a first image set;
    correcting imaging abnormalities from the pre-scanning step to provide a corrected, first image set;
    scanning the identified three-dimensional object using a second magnification objective in a z-direction using a corrected z-height and corrected x-y locations from the corrected, first image set to provide a second image set;
    correcting imaging abnormalities from the scanning step to provide a corrected, second image set; and
    constructing an image of the three-dimensional object in the matrix using the corrected, second image set.

2. The method of claim 1, wherein correcting the imaging abnormalities from the pre-scanning step comprises:
    obtaining one or more images of a two-dimensional graphical pattern using a detector in a same fixed position(s) that was used to obtain the first image set, wherein the graphical pattern is a lattice comprising dots at vertices that define one or more types of geometric shapes, wherein the lattice of dots is non-periodic, and wherein absolute positions of the imaged dots can be determined; and
    automatically adjusting, by a processor, images of the first image set using the one or more images of the two-dimensional graphical pattern to correct geometric distortions in the images of the first image set.

3. The method of claim 2, further comprising automatically adjusting, by a processor, images of the second image set using the one or more images of the two-dimensional graphical pattern to correct geometric distortions in the images of the second image set.

4. The method of claim 1, wherein correcting the imaging abnormalities from the scanning step comprises:
    obtaining one or more images of a two-dimensional graphical pattern using a detector in a same fixed position(s) that was used to obtain the second image set, wherein the graphical pattern is a lattice comprising dots at vertices that define one or more types of geometric shapes, wherein the lattice of dots is non-periodic, and wherein absolute positions of the imaged dots can be determined; and
automatically adjusting, by a processor, images of the second image set using the one or more images of the two-dimensional graphical pattern to correct geometric distortions in the images of the second image set.

5. A microscope system configured to image a three-dimensional object in a three-dimensional matrix, the system comprising:
    a sample holder configured to receive a sample comprising the three-dimensional object in the three-dimensional matrix;
    a first light source optically coupled to the sample holder and configured to illuminate at least some portion of the three-dimensional object in the three dimensional matrix that is received by the sample holder, wherein an wavelength provided by the first light source is selected to excite at least one species present in the three-dimensional object;
    at least one objective optically coupled to the light source and configured to receive a light emission from the at least one excited species present in the three-dimensional object in the three-dimensional matrix;
    a detector optically coupled to the at least one objective and configured to receive the light emission from the objective;
    a processor electrically coupled to the detector, wherein the microscope system is configured to pre-scan the matrix using a first magnification objective to identify an x-y location of the three-dimensional object in the matrix and to identify a z-height for the three-dimensional object in the matrix and record the identified x-y location and z-height as a first image set, correct imaging abnormalities from the pre-scan to provide a corrected, first image set, scan the identified three-dimensional object using a second magnification objective in a z-direction using a corrected z-height and corrected x-y locations from the corrected, first image set to provide a second image set, and correct imaging abnormalities from the scan to provide a corrected, second image set.

6. The microscope system of claim 5, wherein the system comprises a first objective and a second objective, and wherein first objective is used as the first magnification objective and the second objective is used as the second magnification objective, and wherein the second objective is different than the first objective and provides a magnification greater than or equal to a magnification of the first objective.

7. The microscope system of claim 6, wherein the first objective is an air objective and the second objective is a water immersion objective.

8. The microscope system of claim 7, wherein the detector comprises at least one camera and the first light source comprises at least one laser, and wherein the system is configured to use the camera and the laser to perform laser scanning confocal microscopy during the pre-scan and scan of the three-dimensional object.

9. The microscope system of claim 8, wherein the processor is configured to execute instructions to construct a three-dimensional image of the three-dimensional object in the three-dimensional matrix from an image set obtained from the scan step.

10. The microscope system of claim 9, wherein the image correction is applied to the first image set using another image set obtained from one or more images of a two-dimensional graphical pattern using the detector in a same fixed position(s) that was used to obtain the image set, wherein the two-dimensional graphical pattern comprises dots in a lattice, wherein the dots are at vertices that define one or more types of geometric shapes, wherein the lattice of dots is non-periodic, and wherein absolute positions of the imaged dots can be determined, and wherein the correction is applied to images of the first image set using the one or more images of the two-dimensional graphical pattern to correct geometric distortions in the images of the first image set and provide the corrected, image set.

11. The microscope system of claim 10, wherein the system comprises at least two separate light sources configured to provide different wavelengths of light to the sample on the sample holder.

12. The microscope system of claim 11, further comprising a confocal unit optically coupled to each of the at least two separate light sources and positioned between the at least two separate light sources and the sample holder.

13. The microscope system of claim 12, wherein the system comprises at least two separate detectors configured to receive different wavelengths of light emitted by the sample on the sample holder.

14. The microscope system of claim 13, wherein each of the at least two separate detectors comprises a camera.

15. The microscope system of claim 14, wherein one of the at least two separate detectors is configured to detect light emissions during the pre-scan step and another of the at least two separate detectors is configured to detect light emission during the scan step.

16. The microscope system of claim 13, wherein the system is configured to use the first magnification objective of the microscope to identify an x-y location of each of a plurality of individual three-dimensional objects in the matrix and to identify a z-height for each of the identified plurality of three-dimensional objects in the matrix, and wherein the system is configured to scan each identified three-dimensional object using the second magnification objective in a z-direction using a respective identified z-height of each identified three-dimensional object to provide a three-dimensional image of at least some portion of each of the three-dimensional objects present in the matrix.

17. The microscope system of claim 12, wherein the system comprises four independent light sources each configured to provide a different wavelength of light to the sample on the sample holder and four independent cameras each configured to detect light emissions from the sample.

18. The microscope system of claim 5, wherein the system is further configured to identify a z-width of the identified three-dimensional object in the matrix and use the identified z-width to select a scan time or to select a data volume obtained from the scan of the three dimensional object in the matrix.

19. A non-transitory computer readable medium having instructions stored thereon, wherein the instructions, when executed by a processor, cause the processor to:
pre-scan a matrix using a first magnification objective to identify an x-y location of a three-dimensional object in the matrix and to identify a z-height for the three-dimensional object in the matrix and record the identified x-y location and z-height as a first image set,
correct imaging abnormalities from the pre-scan to provide a corrected, first image set,
scan the identified three-dimensional object using a second magnification objective in a z-direction using a corrected z-height and corrected x-y locations from the corrected, first image set to provide a second image set,
correct imaging abnormalities from the scan to provide a corrected, second image set, and construct an image of the three-dimensional object in the matrix using the corrected, second image set.

20. The non-transitory computer readable medium of claim 19, wherein the instructions further cause the processor to:
obtain one or more images of a two-dimensional graphical pattern using a detector in a same fixed position(s) that was used to obtain the first image set, wherein the graphical pattern is a lattice comprising dots at vertices that define one or more types of geometric shapes, wherein the lattice of dots is non-periodic, and wherein absolute positions of the imaged dots can be determined; and
automatically adjust images of the first image set using the one or more images of the two-dimensional graphical pattern to correct geometric distortions in the images of the first image set.

* * * * *